(12) United States Patent
Kondou et al.

(10) Patent No.: US 7,044,169 B2
(45) Date of Patent: May 16, 2006

(54) PIPE BODY AND FORMING METHOD OF THE SAME

(75) Inventors: Takafumi Kondou, Tokyo (JP); Keiji Ishino, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 19 days.

(21) Appl. No.: 10/748,092

(22) Filed: Dec. 29, 2003

(65) Prior Publication Data

US 2004/0140011 A1 Jul. 22, 2004

Related U.S. Application Data

(62) Division of application No. 09/776,118, filed on Feb. 2, 2001, now Pat. No. 6,745,448.

(30) Foreign Application Priority Data

| Feb. 4, 2000 | (JP) | ............................... 2000-27842 |
| Feb. 4, 2000 | (JP) | ............................... 2000-27845 |
| Feb. 4, 2000 | (JP) | ............................... 2000-27846 |
| Dec. 20, 2000 | (JP) | ............................... 2000-387031 |

(51) Int. Cl.
*F16L 9/00* (2006.01)

(52) U.S. Cl. .................. 138/167; 138/166; 138/168

(58) Field of Classification Search ................ 138/156, 138/166, 167, 169, 161, 162, 165; 228/146, 228/147; 72/51, 368, 379.2; 29/450, 451; 403/207
See application file for complete search history.

(56) References Cited

U.S. PATENT DOCUMENTS

| 578,800 | A | | 3/1897 | Wilmot |
| 578,801 | A | | 3/1897 | Wilmot |
| 1,016,584 | A | | 2/1912 | Shepherd et al. |
| 1,344,105 | A | * | 6/1920 | Vance .......................... 72/368 |
| 2,115,441 | A | * | 4/1938 | Biack .......................... 72/368 |
| 2,330,207 | A | * | 9/1943 | England et al. ................ 413/1 |
| 2,339,219 | A | | 1/1944 | Crowley |
| 2,544,266 | A | | 3/1951 | Kennedy |
| 2,855,252 | A | | 10/1958 | Budinger et al. |
| 3,043,003 | A | | 7/1962 | Lever |
| 3,273,601 | A | * | 9/1966 | De Gain ..................... 138/166 |

(Continued)

FOREIGN PATENT DOCUMENTS

DE 8536655 2/1986

(Continued)

*Primary Examiner*—James Hook
(74) *Attorney, Agent, or Firm*—Cooper & Dunham LLP

(57) ABSTRACT

The present invention provides a pipe body of which the edge sections contact with each other stably and which can be formed only by means of only a press processing without performing a welding in mass-producing, wherein separation-prevented engagement due to deformation of at least one of the engagement sections absorbs the spring back in the press processing. Also, the present invention provides a pipe body, a metal plate for the pipe body and a forming method of the pipe body using the sheet metal for the pipe body. The pipe body includes a pair of edge sections 1e, 1f forming closed end surface by means of contact with each other, wherein surroundings of each edge sections 1e, 1f form a plane 1a jointly when each edge sections 1e, 1f are in contact with each other, and at the same time, engagement sections consisting of female engagement section 1g and male engagement section 1h engaged with each other are formed in the edge sections 1e, 1f and the edge sections 1e, 1f get in contact with each other closely by means of separation-prevented engagement due to deformation of at least one of the female and male engagement sections 1g, 1h.

4 Claims, 54 Drawing Sheets

U.S. PATENT DOCUMENTS

| | | | |
|---|---|---|---|
| 4,301,348 A | 11/1981 | Nakazima | |
| 4,311,348 A | 1/1982 | Olschewski et al. | |
| 4,543,297 A * | 9/1985 | Saurenman | 428/582 |
| 4,550,479 A | 11/1985 | Walter et al. | |
| 4,907,626 A * | 3/1990 | Mori | 138/156 |
| 5,104,026 A | 4/1992 | Sturrus et al. | |
| 5,845,526 A | 12/1998 | Kadoma et al. | |
| 6,216,514 B1 | 4/2001 | Bradbury et al. | |
| 6,289,708 B1 | 9/2001 | Keinanen | |
| 6,391,414 B1 * | 5/2002 | Hjertman et al. | 428/36.9 |
| 6,601,427 B1 | 8/2003 | Kondou et al. | |
| 6,634,076 B1 * | 10/2003 | Hjertman et al. | 29/521 |

FOREIGN PATENT DOCUMENTS

| | | |
|---|---|---|
| DE | 8714280 | 12/1987 |
| DE | 4420070 | 9/1995 |
| JP | 5084532 | 4/1993 |
| JP | 11290940 | 10/1999 |

* cited by examiner

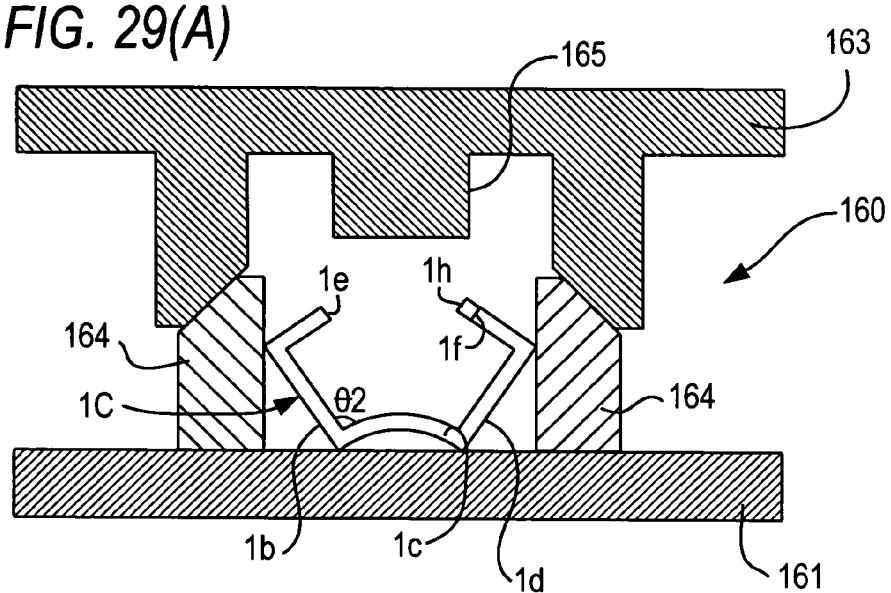
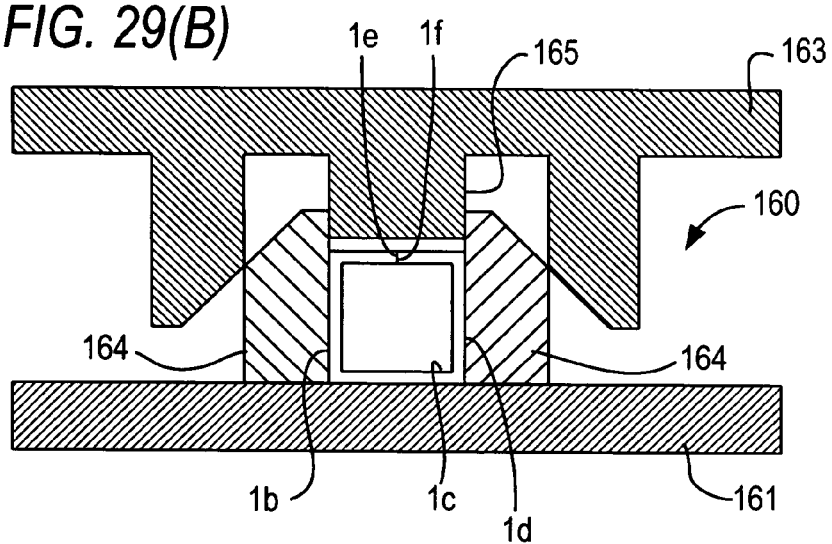
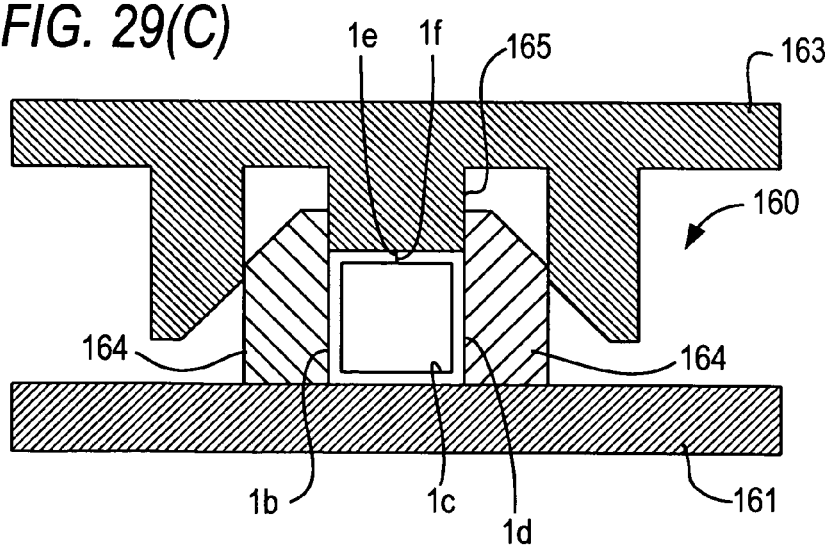

*FIG. 45(A)*
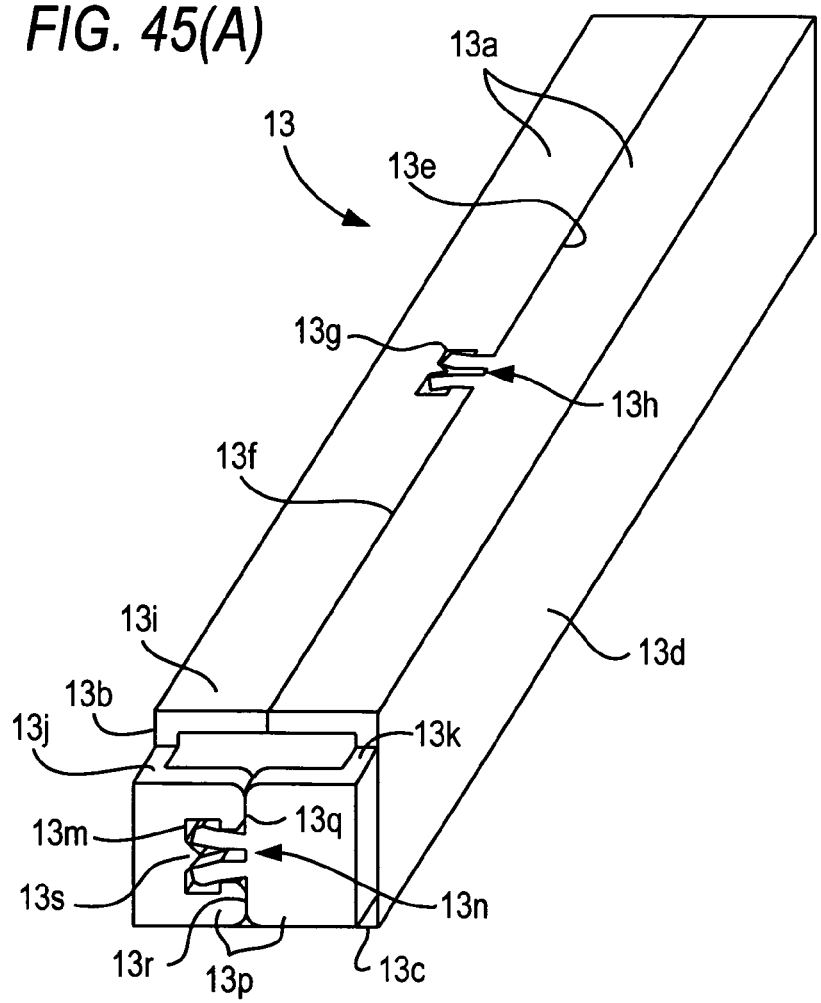
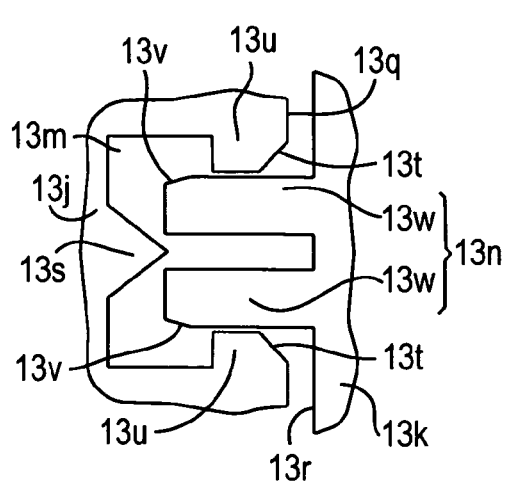
*FIG. 45(B)*
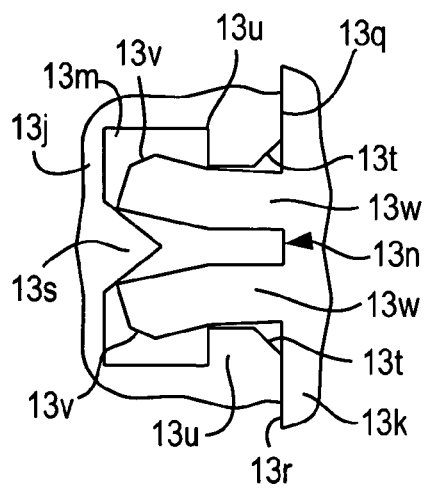
*FIG. 45(C)*

PIPE BODY AND FORMING METHOD OF THE SAME

CROSS REFERENCE TO RELATED APPLICATION

This application is a division of U.S. patent application Ser. No. 09/776,118 filed Feb. 2, 2001, now U.S. Pat. No. 6,745,448.

TECHNICAL FIELD

The present invention relates to a pipe body having pair of edge sections which form closed end surface by means of contact with each other, wherein parts surrounding each edge section form a plane jointly in a state where each edge section is in contact with each other and a forming method of the pipe body.

BACKGROUND OF THE INVENTION

Conventionally, a technique forming a pipe body, for example, a prism pipe body by means of a bending process of a metal plate is disclosed in Japanese Patent Laid-Open No. Hei 11-290940.

According to the description disclosed in the gazette, a prism pipe body is formed of a metal plate of a rectangular shape by means of a press processing consisting of a plurality of processes.

That is, the processing method of the prism pipe body comprises a first bending step of bending end parts of width direction of the metal plate along a length direction at the right angle to form a first processed piece having a bottom part connecting the opposite flange parts to each other, a second bending step of forming a recessed curve surface of a predetermined width along the length direction at the bottom part of the first processed piece, and at the same time, bending both ends of the recessed curve surface toward the inside at the almost right angle to form a second processed piece of a U shape having a pair of sidewall parts facing each other, and a re-striking step of pressing the pair of sidewall parts of the second processed piece toward each other to make the end surfaces of a pair of flange parts contact with each other.

According to the processing method of the prism pipe body, the recessed curve surface formed at the bottom part of the second processed piece plays a role of suppressing spring back force generated by pressing the pair of sidewall parts toward each other in forming the second processed piece, and therefore, the prism pipe body of which a cross-section is a square shape and in which both end surfaces of the flange parts are closed to each other can be manufactured by means of only the press forming, without welding both end surfaces of the flange parts.

However, in the conventional processing method of the prism pipe body, even if the recessed curve surface formed at the bottom part of the second processed piece plays a role of suppressing spring back force generated by pressing the pair of sidewall parts toward each other in forming the second processed piece, the spring back force which serves to unfold the pair of sidewall parts remains in the pair of sidewall parts, and thus, it was difficult to manufacture the prism pipe body in which both end surfaces of the flange parts are closed to each other, stably without deviation in mass-producing.

That is, when inspecting whether both end surfaces of the flange parts in the prism pipe body manufactured by the processing method are closed to each other, there are pipe bodies in which both end surfaces of the flange parts are closed to each other, while there are pipe bodies in which a gap is generated between both end surfaces of the flange parts by the spring back force. Also, the gaps are not constant.

SUMMARY OF THE INVENTION

The present invention is made in order to solve the aforementioned problems.

An object of the present invention is to provide a pipe body in which both edge sections to be in close contact with each other are closed stably to each other by means of only a press forming without welding in mass-producing, a metal plate for the pipe body and a forming method of the pipe body using the sheet metal for the pipe body.

In order to accomplish the above object, according to an aspect of the present invention, a method of forming a metal pipe by way of bending a flat metal plate, the method is carried out in steps of forming male section on a first end of said metal plate and female section on a second end parallel to said first end, respectively; bending said metal plate so that said male section and said female section can be engaged with each other, and coupling said male section and said female section to be engaged with each other, is provided.

According to another aspect of the present invention, a method of forming a metal pipe by way of bending a flat metal plate, the method being carried out in steps of: previously forming male section on a first end of said metal plate and female section on a second end parallel to said first end, respectively; preliminarily bending said metal plate along an axis of said metal pipe which is a final forming body, at a position distant by an approximately half length of a predetermined side from both end of said metal plate to form a predetermined angle with said metal pipe; further bending said metal plate at predetermined positions to form predetermined angles with said preliminary bent position; and coupling said male section and said female section to be engaged with each other so as to form a plane, is provided.

According to another aspect of the present invention, a method of forming a metal pipe, wherein said both end surfaces are preliminary bent, sides of a plane opposite to a plane formed by way of close contact of said ends are bent more over said predetermined angle, and in this state, both ends of said opposite plane are further bent to form predetermined angles to be coupled, is provided.

According to another aspect of the present invention, a method of forming a metal pipe, wherein said plane opposite to said closely contacting plane is bent to be a concave plane toward a center of axis of said final metal pipe, is provided.

According to another aspect of the present invention, a method of forming a metal pipe having a desired angle by way of bending a flat metal plate, the method being carried out in steps of: previously forming male section at a first end of said metal plate and female section at a second end parallel to said first end, respectively; sequentially bending said metal plate in a desired angle at positions along sides of the final metal pipe from one of said both ends; and coupling said male section and said female section at said both ends to be engaged with each other, is provided.

In the methods of forming a metal pipe according to the above aspects of the present invention, both edge sections can be in close contact with each other stably with only a press forming without welding in mass-producing, by means of separation-prevented engagement due to deformation of at least one of said female engagement section and said male engagement section.

According to another aspect of the present invention, a pipe body having pair of edge sections that form closed end surface by way of contact with each other, in which surroundings of said edge sections form a plane jointly when said edge sections are in contact with each other, wherein male engagement section and female engagement section engaged with each other are formed at said edge sections, respectively, and at the same time, said edge sections get in close contact with each other by means of separation-prevented engagement due to deformation of at least one of said female engagement section and said male engagement section.

In a pipe body according to the above aspect of the present invention, both edge sections can be in close contact with each other stably with only a press forming without welding in mass-producing, for separation-prevented engagement due to deformation of at least one of said female engagement section and said male engagement section absorbs the spring back in press forming.

According to another aspect of the present invention, a pipe body formed with closed end surface by means of joint consisting of end surface of one edge section and a back surface of the other edge section in planes crossing each other, wherein male engagement section projected from said end surface of said one edge section engages with female engagement section formed at said other edge section, and at the same time, said edge sections get in close contact with each other in a state that separation of said male engagement section from said female engagement section is prevented engagement section.

In the pipe body according to this aspect of the present invention, separation-prevented engagement due to deformation of the male engagement sections absorbs the spring back in press forming so that the edge sections can be in close contact with each other.

According to another aspect of the present invention, a pipe body formed with closed end surface by means of joint constructed between a pair of edge sections parallel to each other, wherein female engagement section and male engagement section provided at an edge section crossing with said pair of edge sections parallel to each other are engaged with each other, and at the same time, a supporting plane is formed at an end of the pipe body by means of separation-prevented engagement due to deformation of at least one of said female engagement section and said male engagement section.

In the pipe body according to this aspect of the present invention, separation-prevented engagement due to deformation of at least one of the female and male engagement sections absorbs the spring back in press forming so that the joint can be prevented from being separated, and in addition, the pipe body in which the supporting plane provided at one end of the pipe body enables a close contact with another member can be provided.

According to another aspect of the present invention, a pipe body formed with closed end surface by means of joint constructed between a pair of edge sections parallel to each other, wherein a female engagement section and a male engagement section provided at an edge section crossing with said pair of edge sections parallel to each other are engaged with each other, a second female engagement section and a second male engagement section provided at said pair of edge sections parallel to each other are engaged with each other, and at the same time, a supporting plane is formed at an end of the pipe body by means of separation-prevented engagement due to deformation of at least one of said female engagement section and said male engagement section.

In the pipe body according to this aspect of the present invention, the supporting plane provided at one end of the pipe body enables a close contact with another member, and in addition, separation-prevented engagement due to deformation of at least one of the engagement sections absorbs the spring back in press forming, so that the joint can be prevented from being separated. Also, the distortion of the pipe body can be prevented by means of the second engagement sections.

According to another aspect of the present invention, a pipe body formed with closed end surface by means of joint constructed between a pair of edge sections parallel to each other, wherein a female engagement section and a male engagement section provided at an edge section crossing with said pair of edge sections parallel to each other are engaged with each other, a second female engagement section and a second male engagement section provided at said pair of edge sections parallel to each other are engaged with each other, and at the same time, a supporting plane is formed at an end of the pipe body by means of separation-prevented engagement due to deformation of at least one of said female engagement section and said male engagement section, and said pair of edge sections are in close contact with each other by means of separation-prevented engagement due to deformation of at least one of said second female engagement section and said second male engagement section.

In the pipe body according to this aspect of the present invention, the supporting plane provided at one end of the pipe body enables a close contact with another member, and in addition, separation-prevented engagement due to deformation of at least one of the engagement sections absorbs the spring back in press forming of the pipe body, so that the joint can be prevented from being separated. Also, the distortion of the pipe body can be prevented by means of the second engagement sections.

According to another aspect of the present invention, a pipe body in which a pair of edge sections parallel to each other get in contact with each other to construct a joint surface thereof, thereby forming closed end surface, wherein a female engagement section and a male engagement section provided at an edge section crossing with said pair of edge sections parallel to each other are engaged with each other by means of contact thereof, a second female engagement section and a second male engagement section provided at said pair of edge sections parallel to each other are engaged with each other by means of contact thereof, and at the same time, a supporting plane is formed at an end of the pipe body jointly with the surroundings thereof, by means of separation-prevented engagement due to deformation of at least one of said female engagement section and said male engagement section, and said pair of edge sections parallel to each other are in close contact with each other by means of separation-prevented engagement due to deformation of at least one of said second female engagement section and said second male engagement section.

In the pipe body according to this aspect of the present invention, the supporting plane provided at one end of the pipe body enables a close contact with another member, and in addition, separation-prevented engagement due to deformation of at least one of the engagement sections absorbs the spring back in press forming of the pipe body, so that the joint can be prevented from being separated. Also, the distortion of the pipe body and the separation of the joint can be further prevented by means of the second engagement sections, and the contact of said edge sections parallel to each other and the contact of the engagement sections can be carried out at the same time.

According to another aspect of the present invention, a pipe body in which closed end surface is formed by way of constructing a joint between a pair of edge sections parallel to each other, and at the same time, said closed end surface is maintained by means of separation-prevented engagement due to deformation of at least one of female engagement section and male engagement section.

According to another aspect of the present invention, a pipe body having pair of edge sections that form closed end surface by way of contact with each other, in which surroundings of said pair of edge sections form a plane jointly when said pair of edge sections are in contact with each other, wherein male engagement section and female engagement section engaged with each other are formed at said pair of edge sections, respectively, and at the same time, said pair of edge sections get in close contact with each other by means of separation-prevented engagement due to deformation of at least one of said female engagement section and said male engagement section.

In the pipe body according to this aspect of the present invention, separation-prevented engagement due to deformation of at least one of said engagement sections absorbs the spring back in press forming so that the edge sections can be in close contact with each other.

According to another aspect of the present invention, a pipe body having pair of edge sections that form closed end surface by way of contact with each other, in which surroundings of said pair of edge sections form a plane jointly when said pair of edge sections are in contact with each other, wherein uneven engagement sections engaged with each other are formed at said pair of edge sections, respectively, and at the same time, said pair of edge sections get in close contact with each other by means of separation-prevented engagement due to deformation of at least one of male engagement section and female engagement section provided at said uneven engagement section.

In the pipe body according to the present invention, double engagement of the female and male engagement sections and the uneven engagement sections enables a strong engagement and projected parts from the edge section of the male engagement section are absorbed by the concave engagement section. Therefore, even in a pipe body of which the width crossing the edge sections of a jointly formed plane is small, the female engagement section and the male engagement section can be engaged with each other, in which the male engagement section is not inserted into the female engagement section side.

According to another aspect of the present invention, a pipe body having pair of edge sections that form closed end surface by way of contact with each other, in which surroundings of said pair of edge sections form a plane jointly when said pair of edge sections are in contact with each other, wherein uneven engagement sections engaged with each other are formed at said pair of edge sections, respectively, and at the same time, a first deformation of at least one of said uneven engagement sections due to engagement of male engagement section and female engagement section provided at said uneven engagement section causes a second deformation of at least one of said uneven engagement sections, so that said edge sections get in close contact with each other in a state of separation-prevented engagement of said engagement sections.

In the pipe body according to the present invention, engagements are sequentially carried out by means of deformation of the uneven engagement sections according to deformation of the female and male engagement sections, and thus, the deformation and the engagement can be secured safely.

According to another aspect of the present invention, a method of forming a pipe body, comprising: a first step of obtaining a first processed piece, wherein a metal plate of which female engagement section and male engagement section are provided at a pair of edge sections and at least one of said female engagement section and said male engagement section is deformable, is bent in the same direction along said pair of edge sections at parts surrounding said pair of edge sections to form closed end surface by means of contact thereof; a second step of obtaining a second processed piece of a polygonal prism shape, wherein said first processed piece is further bent along said pair of edge sections at inside portions of the bent portions of said first processed piece such that said pair of edge sections are opposite to each other in separated state; and a third step of obtaining said pipe body, wherein said pair of edge sections contact with each other, and at the same time, said engagement sections are engaged with each other to be deformed so that said edge sections are in close contact with each other.

In the method of forming a pipe body according to this aspect of the present invention, the pipe body having the edge sections closely contact with each other can be formed only by means of a simple press processing, and also, the engagement of a pair of the female engagement section and the male engagement section due to deformation of at least one engagement section thereof can be carried out in the press processing.

BRIEF DESCRIPTION OF THE DRAWINGS

The various embodiments of the present invention will be explained with reference to the accompanying drawings, in which:

FIG. 1 shows a pipe body according to a first aspect of the present invention.

FIG. 3 shows a modified example of the main part of the pipe body according to the first aspect of the present invention.

FIG. 4 shows a pipe body according to a second aspect of the present invention.

FIG. 6 shows a pipe body according to a third aspect of the present invention.

FIG. 8 shows engagement sections of the pipe body according to the third aspect of the present invention.

FIG. 10 shows a first modified example of the engagement sections of the present invention.

FIG. 11 shows a second modified example of the engagement sections of the present invention.

FIG. 12 shows a third modified example of the engagement sections of the present invention.

FIG. 13 shows a fourth modified example of the engagement sections of the present invention.

FIG. 14 shows a fifth modified example of the engagement sections of the present invention.

FIG. 15 shows a sixth modified example of the engagement sections of the present invention.

FIG. 20 illustrates the time series of the processed piece according to a forming method 1 of the present invention.

FIG. 21 illustrates the time series according to the forming method 1 of the present invention, FIG. 21(B) is a cross-sectional view of the press machine when the forming process of the pipe body is completed;

FIG. 22 illustrates the times series according to a modified example of the forming method 1 of the present invention.

FIG. 23 illustrates the times series of the processed piece according to a forming method 2 of the present invention.

FIG. 24 illustrates the times series according to the forming method 2 of the present invention.

FIG. 25 illustrates the times series of the processed piece according to a forming method 3 of the present invention.

FIG. 26 illustrates the time series of the processed piece according to the forming method 3 of the present invention.

FIG. 27 illustrates the times series according to a modified example of the forming method 3 of the present invention.

FIG. 28 illustrates the times series of the processed piece according to a forming method 4 of the present invention.

FIG. 29 illustrates the times series according to the forming method 4 of the present invention, FIG. 29(A) is a cross-sectional view of a press machine when the second processed piece is set, FIG. 29(B) is a cross-sectional view of the press machine when the third processed piece is formed, and FIG. 29(C) is a cross-sectional view of the press machine when the forming process of the pipe body is completed;

FIG. 30 illustrates the times series of the processed piece according to a forming method 5 of the present invention.

FIG. 31 illustrates the time series according to the forming method 5 of the present invention.

FIG. 32 illustrates a pipe body of a prism shape other than the rectangular prism according to the present invention.

FIG. 34 illustrates the time series of the prism pipe body other than the rectangular prism according to the present invention.

FIG. 35 shows a cylinder pipe body of the present invention.

FIG. 37 illustrate the time series of the cylinder pipe body of the present invention.

FIG. 38 shows a pipe body according to a fourth aspect of the present invention.

FIG. 40 illustrates the time series of a forming method of the pipe body according to the fourth aspect of the present invention.

FIG. 41 illustrates a joint structure of the pipe body according to the fourth aspect of the present invention.

FIG. 42 illustrates a pipe body according to a fifth aspect of the present invention.

FIG. 44 illustrates the time series of a forming method of the pipe body according to the fifth aspect of the present invention.

FIG. 45 illustrates a pipe body according to a sixth aspect of the present invention, FIG. 45(A) is a perspective view of the exterior of the pipe body, FIG. 45(B) is an enlarged view of a main part before completing forming the pipe body, and FIG. 45(C) is an enlarged view of the main part when completing forming the pipe body;

Figure 48A:
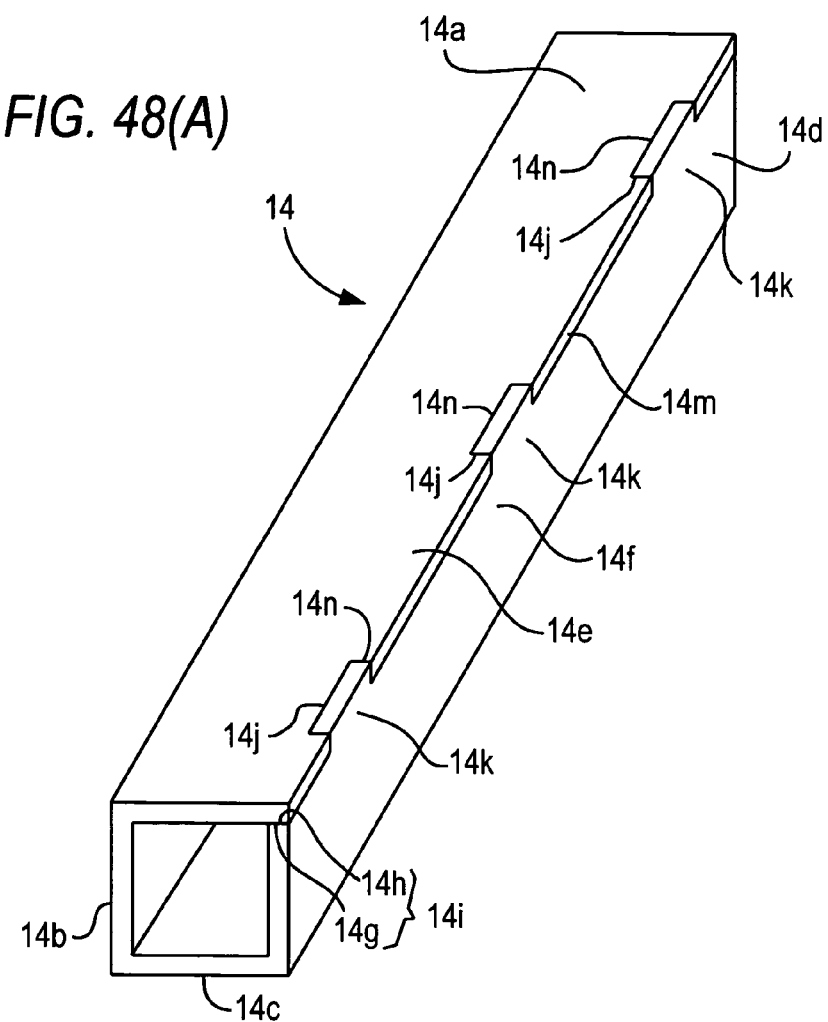
Figure 48B:
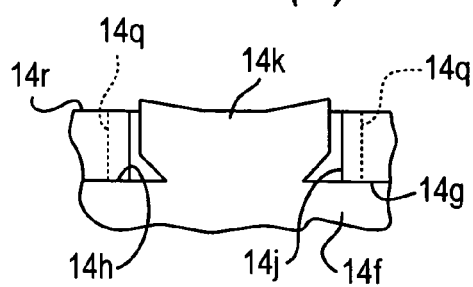
Figure 48D:
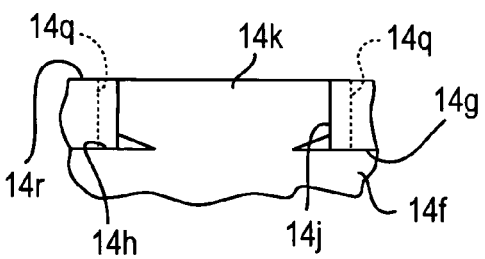
Figure 48C:
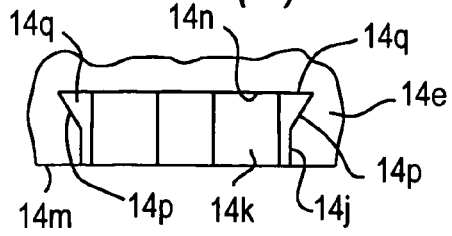
Figure 50A:
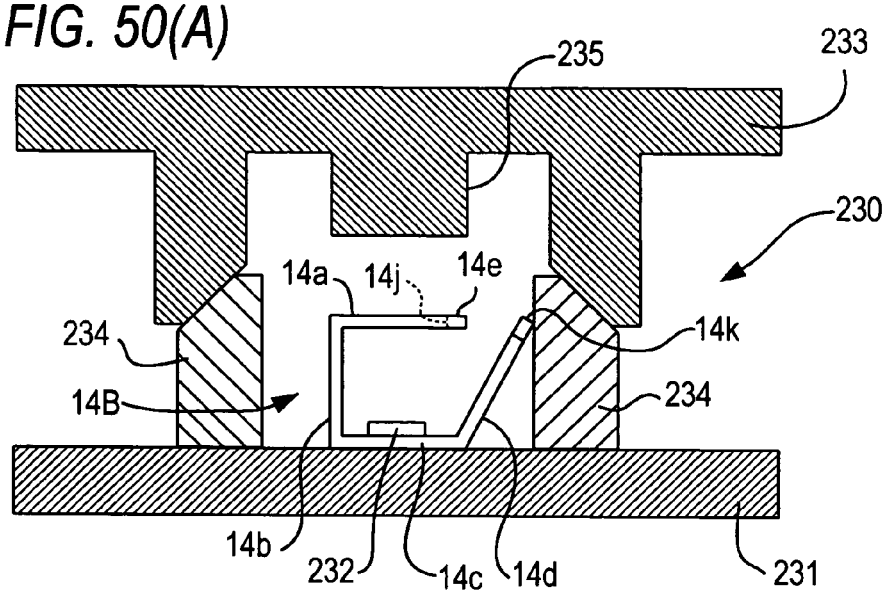
Figure 50B:
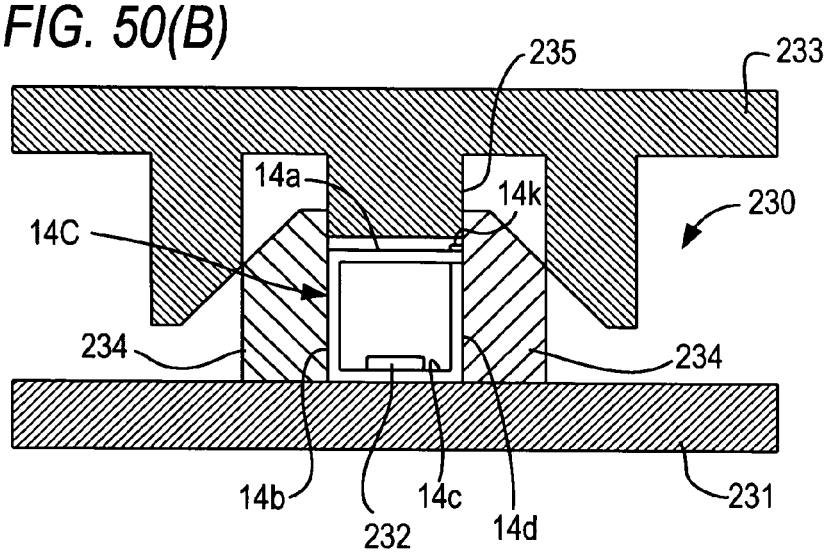
Figure 50C:
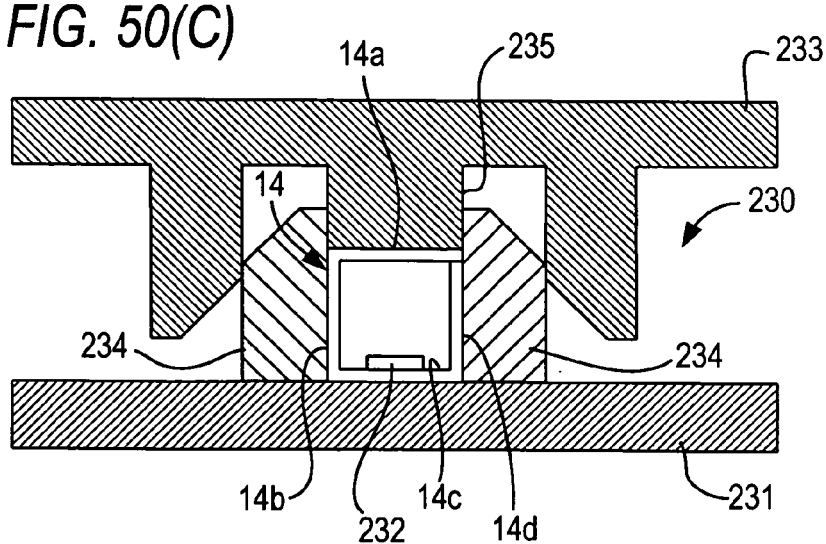
Figure 51A:
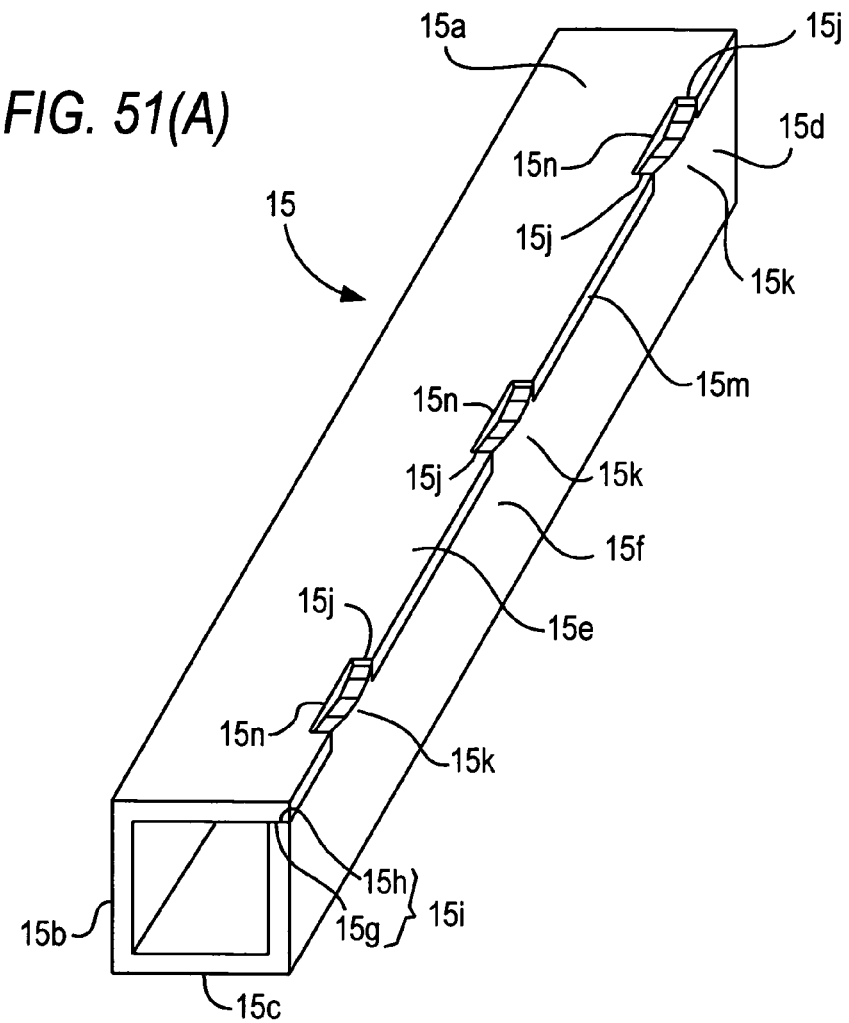
Figure 51B:
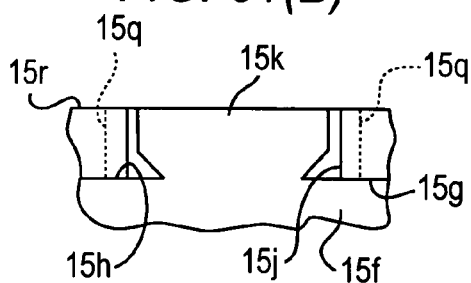
Figure 51D:
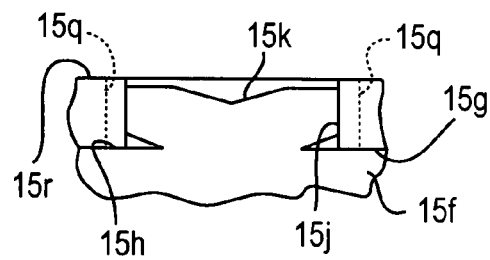
Figure 51C:
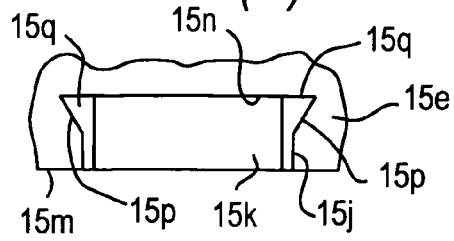
Figure 53A:
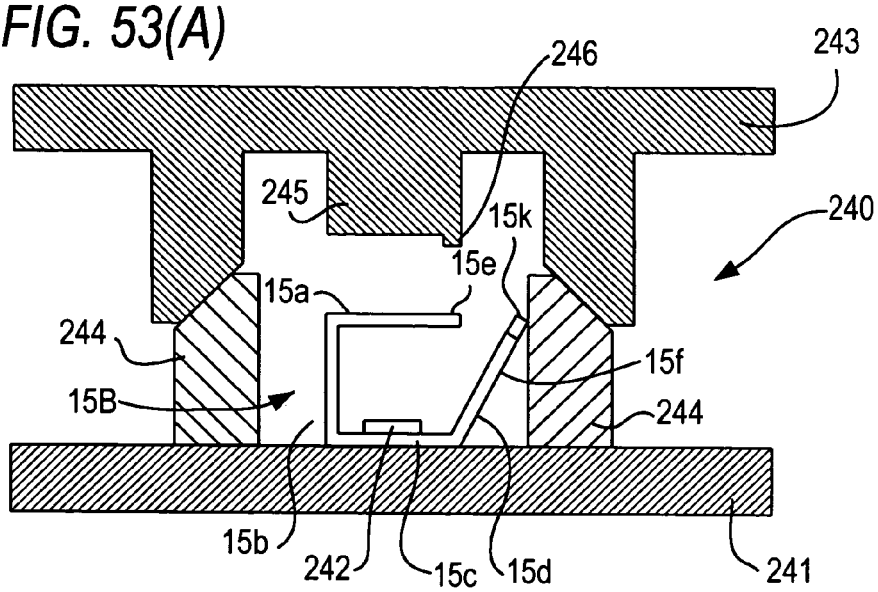
Figure 53B:
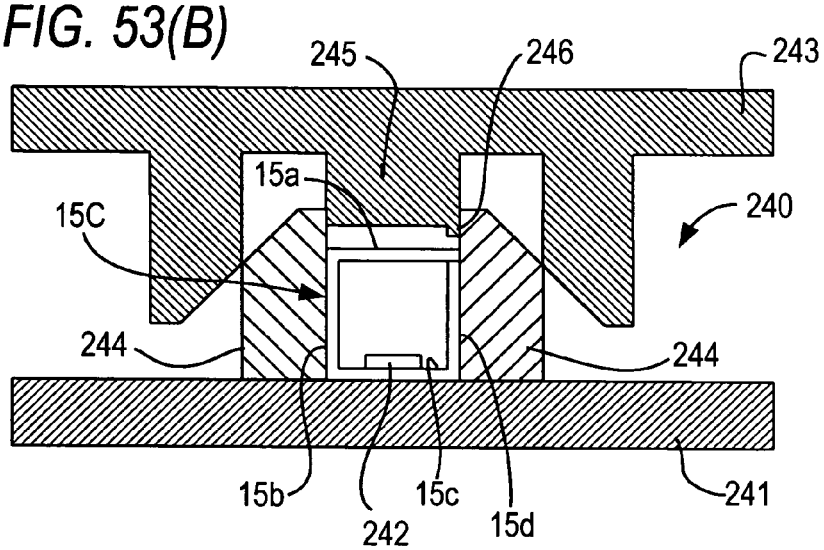
Figure 53C:
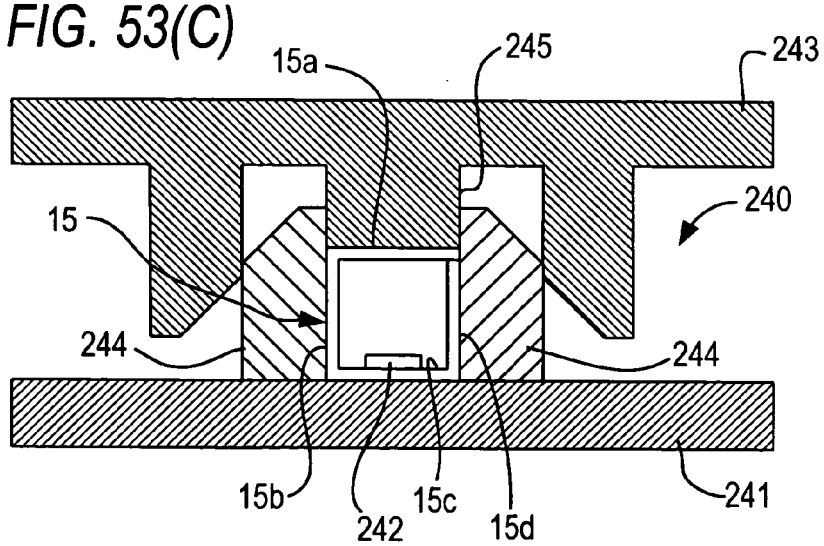
Figure 54:
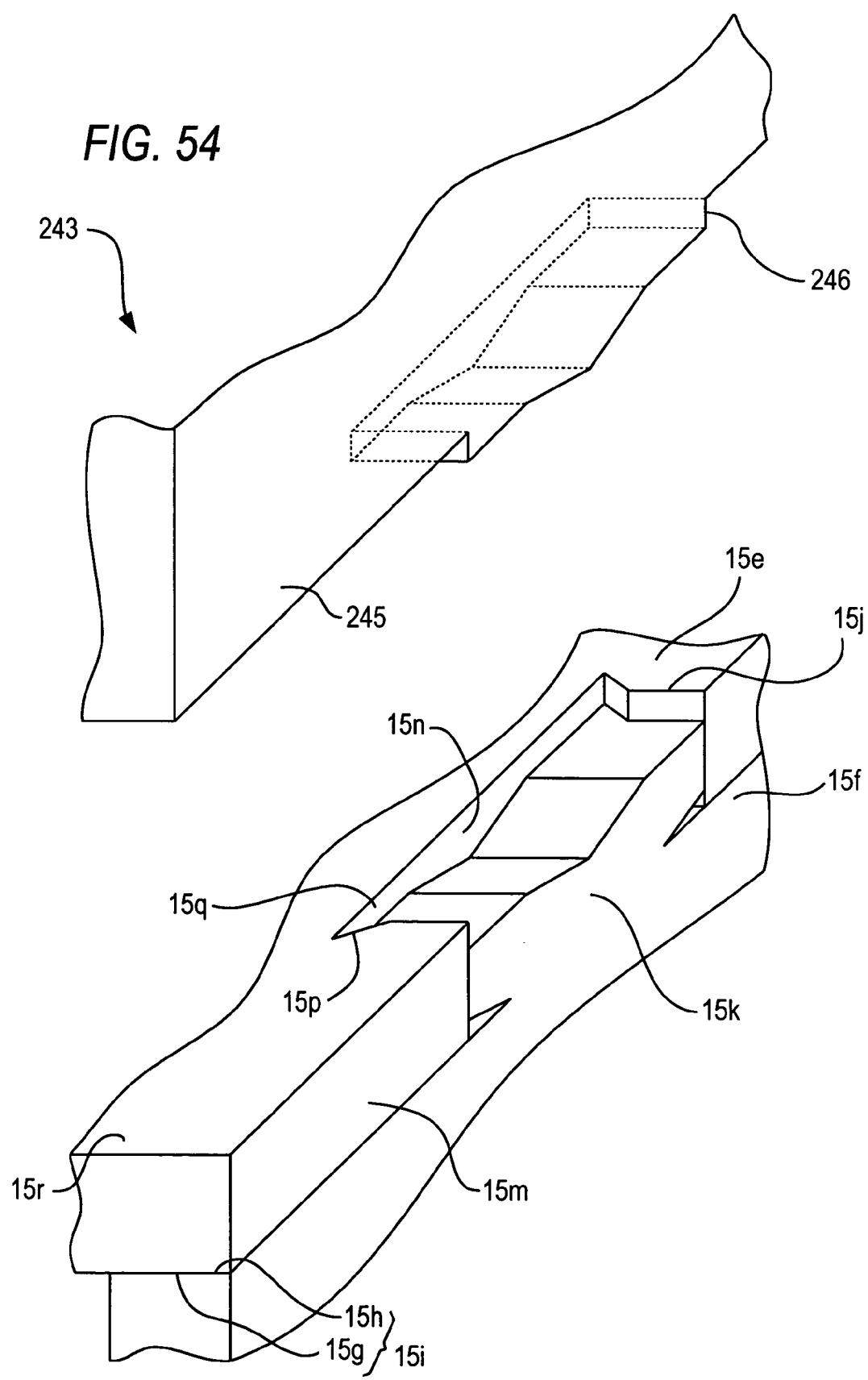

is a cross-sectional view of the press machine when the forming process of the pipe body is completed;

FIG. 48 illustrates a pipe body according to a seventh aspect of the present invention, FIG. 48(A) is a perspective view of the exterior of the pipe body, FIG. 48(B) is an enlarged view of a main part before completing forming the pipe body, and FIG. 48(C) is an enlarged view of the main part when completing forming the pipe body;

FIG. 49 is a plan view of a metal plate according to the seventh aspect of the present invention;

FIG. 50 illustrates the time series according to the seventh aspect of the present invention, FIG. 50(A) is a cross-sectional view of a press machine when a first processed piece is set, FIG. 50(B) is a cross-sectional view of the press machine when a second processed piece is formed, and FIG. 50(C) is a cross-sectional view of the press machine when the forming process of the pipe body is completed;

FIG. 51 illustrates a pipe body according to an eighth aspect of the present invention, FIG. 51(A) is a perspective view of the exterior of the pipe body, FIG. 51(B) is an enlarged view of a main part before completing forming the pipe body, and FIG. 51(C) is an enlarged view of the main part when completing forming the pipe body;

FIG. 52 is a plan view of a metal plate according to the eighth aspect of the present invention;

FIG. 53 illustrates the time series according to the eighth aspect of the present invention, FIG. 53(A) is a cross-sectional view of a press machine when a first processed piece is set, FIG. 53(B) is a cross-sectional view of the press machine when a second processed piece is formed, and FIG. 53(C) is a cross-sectional view of the press machine when the forming process of the pipe body is completed; and FIG. 54 is a partially enlarged view of a mold used in forming the pipe body according to the eighth aspect of the present invention.

DETAILED DESCRIPTION OF THE INVENTION

The above objects, other objects, features and advantages of the present invention will be better understood from the following description taken in conjunction with the attached drawings.

Now, following articles will be explained with reference to the corresponding drawings:

FIRST EMBODIMENT OF ENDS-CONTACT TYPE PIPE BODY

First aspect of the pipe body (FIG. 1–FIG. 3)
Second aspect of the pipe body (FIG. 4, FIG. 5)
Third aspect of the pipe body (FIG. 6–FIG. 9)
Modified example 1 of the engagement section (FIG. 10)
Modified example 2 of the engagement section (FIG. 11)
Modified example 3 of the engagement section (FIG. 12)
Modified example 4 of the engagement section (FIG. 13)
Modified example 5 of the engagement section (FIG. 14)
Modified example 6 of the engagement section (FIG. 15)

<Sheet Metal for the Ends-Contact Type Pipe Body>
Sheet metals for pipe bodies other than the above aspects (FIG. 16–FIG. 19)

Figure 35A:
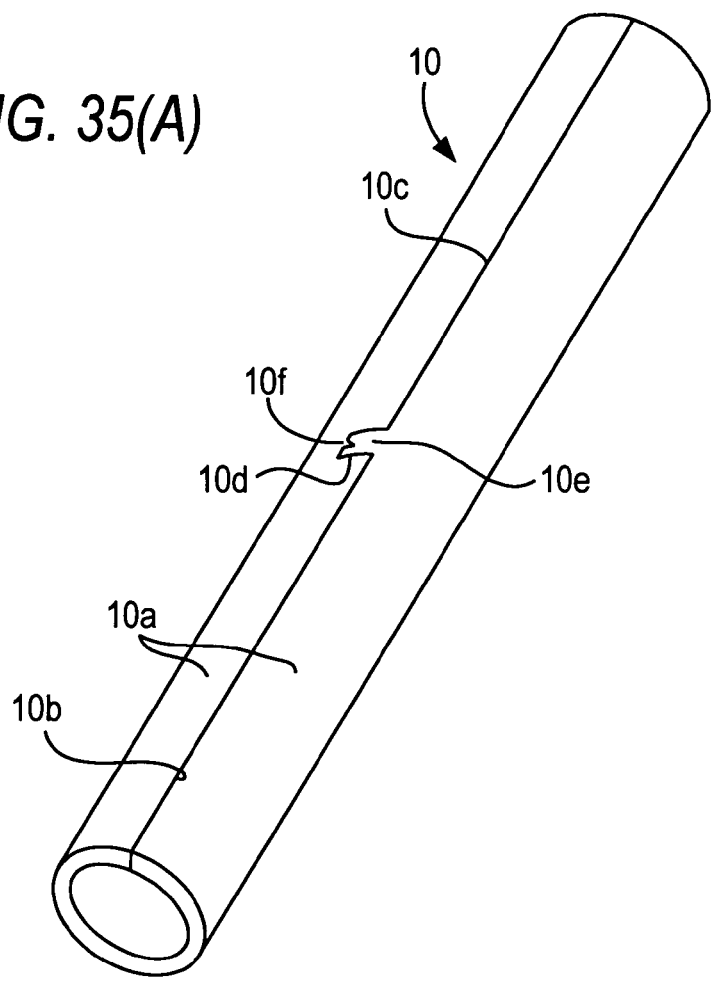
FIG. 35(A) is a perspective view of the exterior of the pipe body.
Figure 35B:
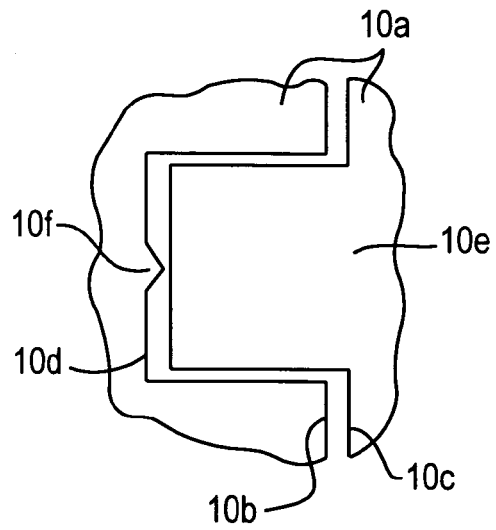
FIG. 35(B) is an enlarged view of a main part of the pipe body before completing forming the pipe body.
Figure 35C:
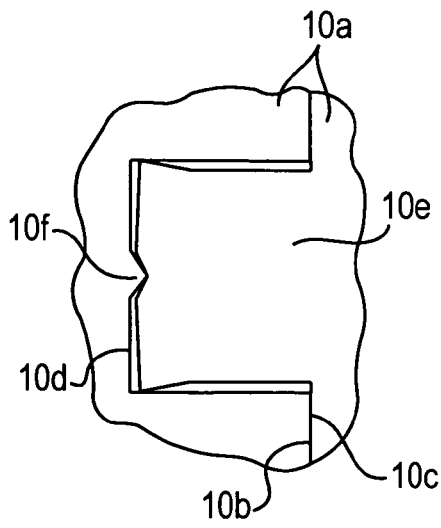
FIG. 35(C) is an enlarged view of the main part of the pipe body when completing forming the pipe body.
Figure 36:
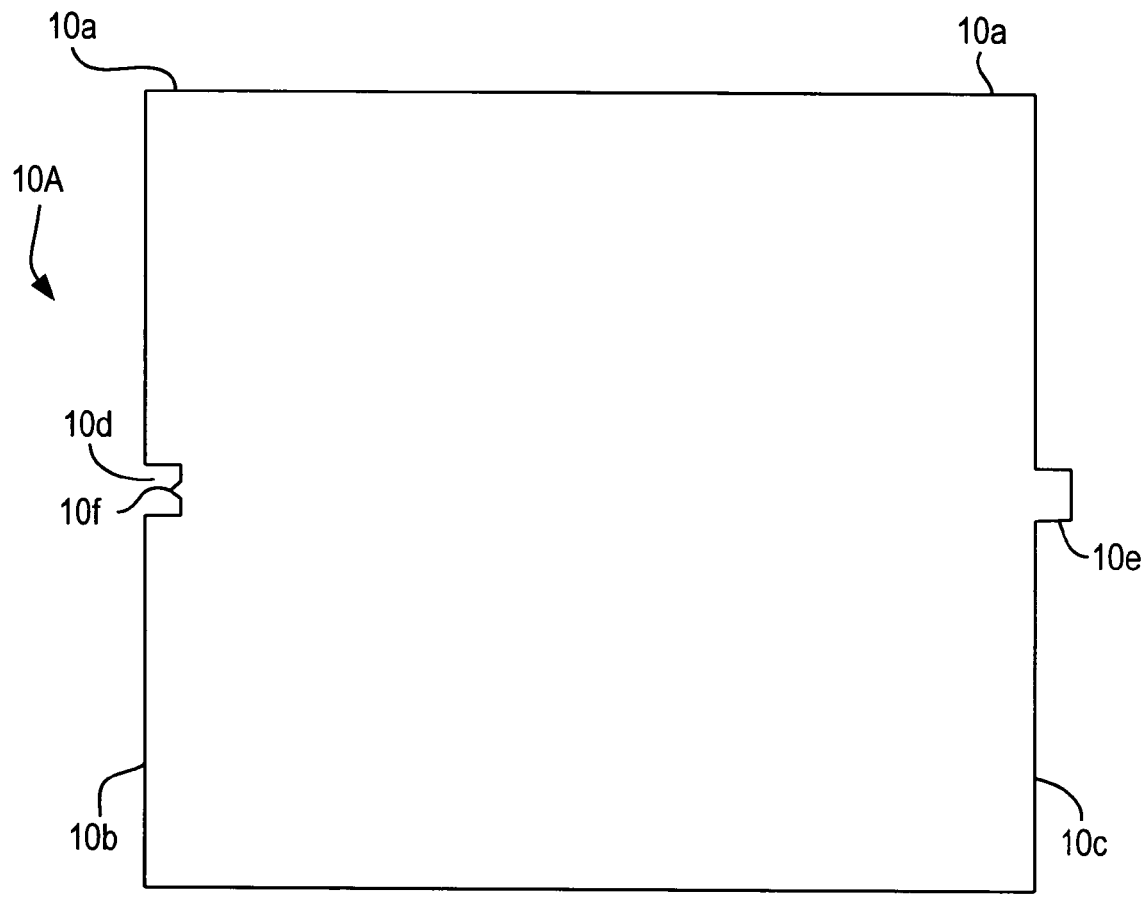
FIG. 36 is a plan view of a metal plate for the cylinder pipe body of the present invention.
Figure 37A:
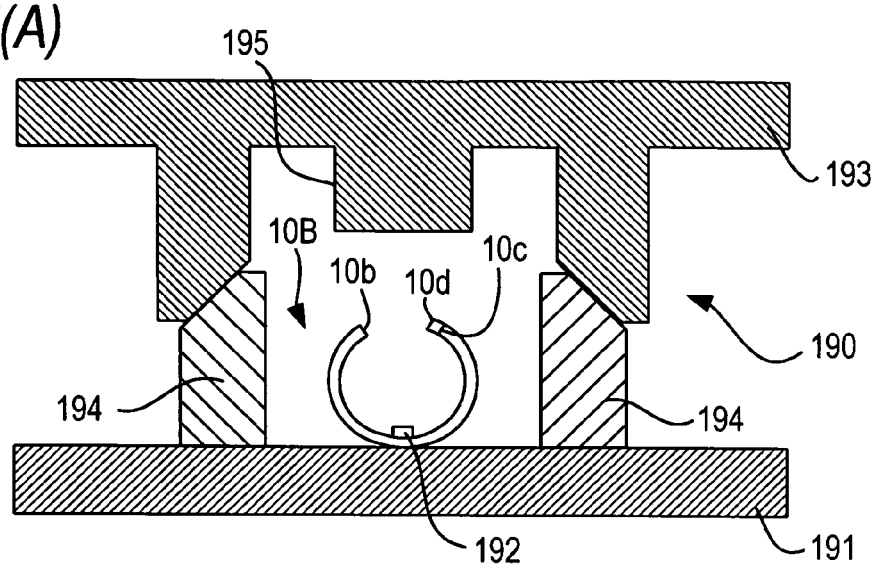
FIG. 37(A) is a cross-sectional view of a press machine when the second processed piece is set.
Figure 37B:
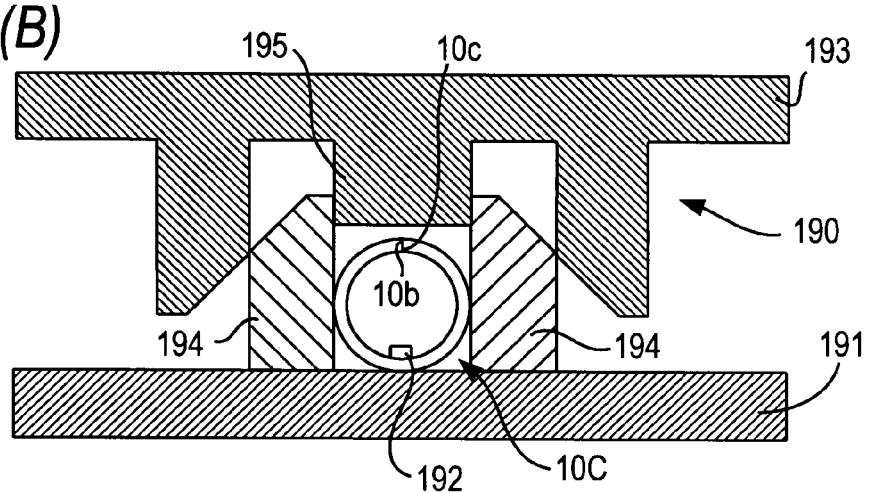
FIG. 37(B) is a cross-sectional view of the press machine when the third processed piece is formed.
Figure 37C:
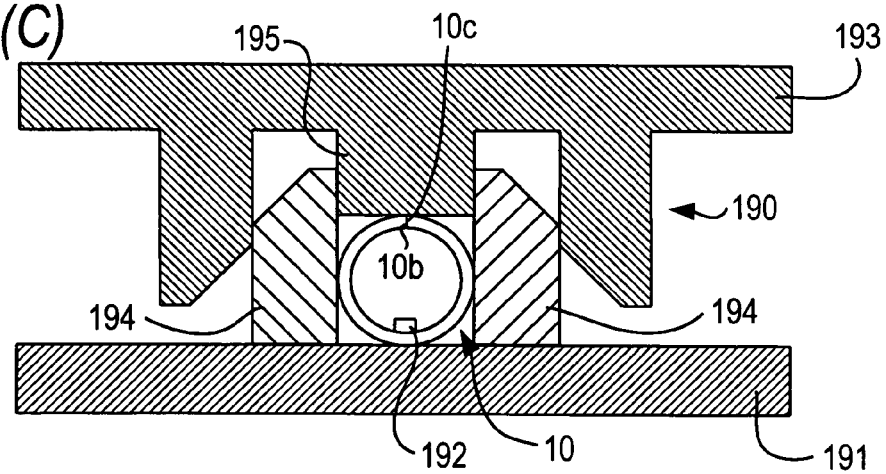
FIG. 37(C) is a cross-sectional view of the press machine when the forming process of the pipe body is completed.

<Forming Method of the Ends-Contact Type Pipe Body>
Forming method 1 (FIG. 20, FIG. 21)
Modified example of the forming method 1 (FIG. 22)
Forming method 2 (FIG. 23, FIG. 24)
Forming method 3 (FIG. 25, FIG. 26)
Modified example of the forming method 3 (FIG. 27)
Forming method 4 (FIG. 28, FIG. 29)
Forming method 5 (FIG. 30, FIG. 31)
Aspects of prism pipe bodies other than rectangular prism (FIG. 32–FIG. 34)
Aspects of cylinder pipe body (FIG. 35–FIG. 37)

SECOND EMBODIMENT OF ENDS-CONTACT TYPE PIPE BODY

Figure 46:
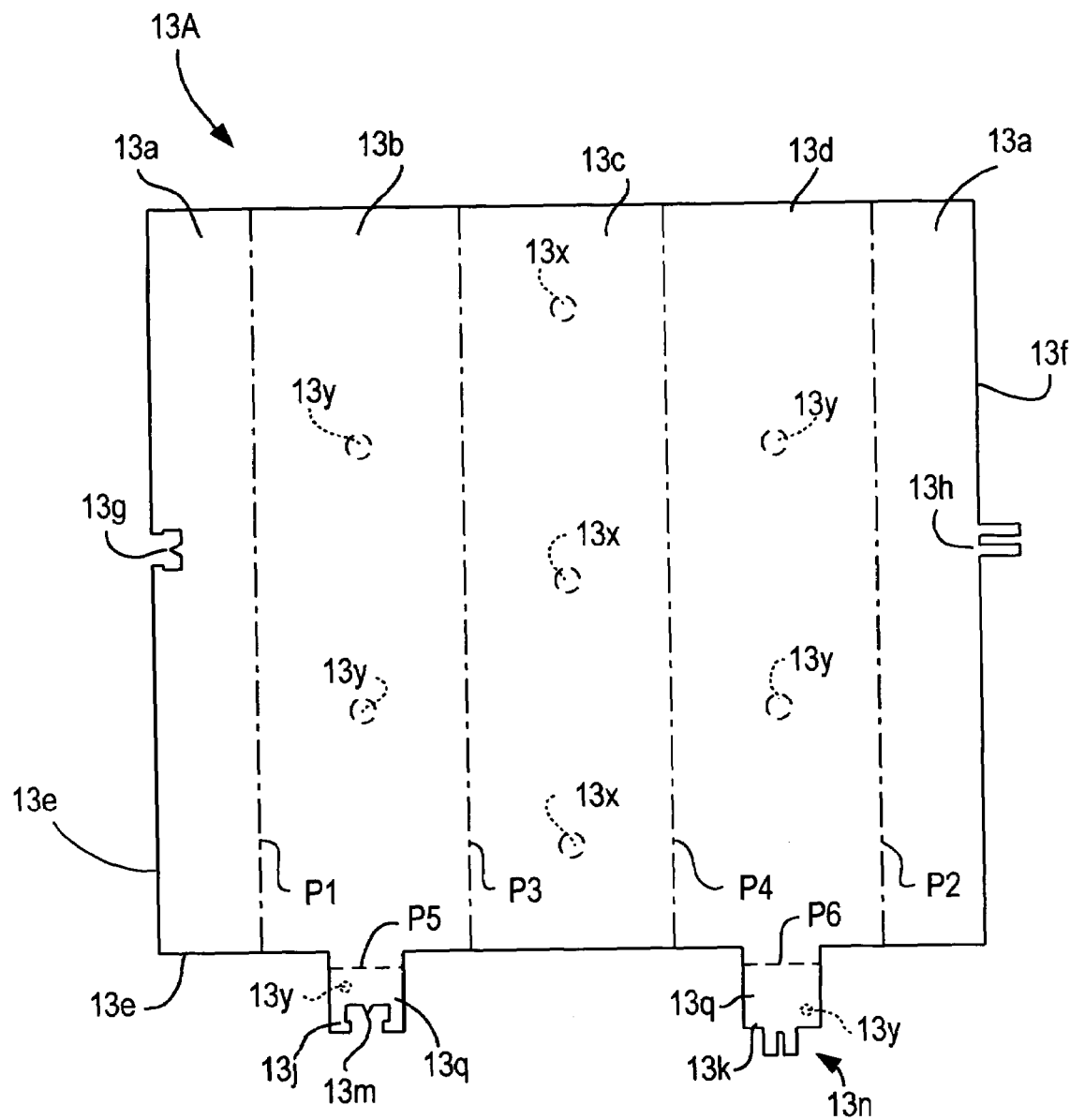
FIG. 46 is a plan view of a metal plate according to the sixth aspect of the present invention.

Fourth aspect of the pipe body (FIG. 38–FIG. 41)
Fifth aspect of the pipe body (FIG. 42–FIG. 44)
Sixth aspect of the pipe body (FIG. 45–FIG. 47)

<Folded Type Pipe Body>
Seventh aspect of the pipe body (FIG. 48–FIG. 49)
Eighth aspect of the pipe body (FIG. 50–FIG. 53)

FIRST EMBODIMENT OF ENDS-CONTACT TYPE PIPE BODY (First Aspect of the Pipe Body)

Figure 1A:
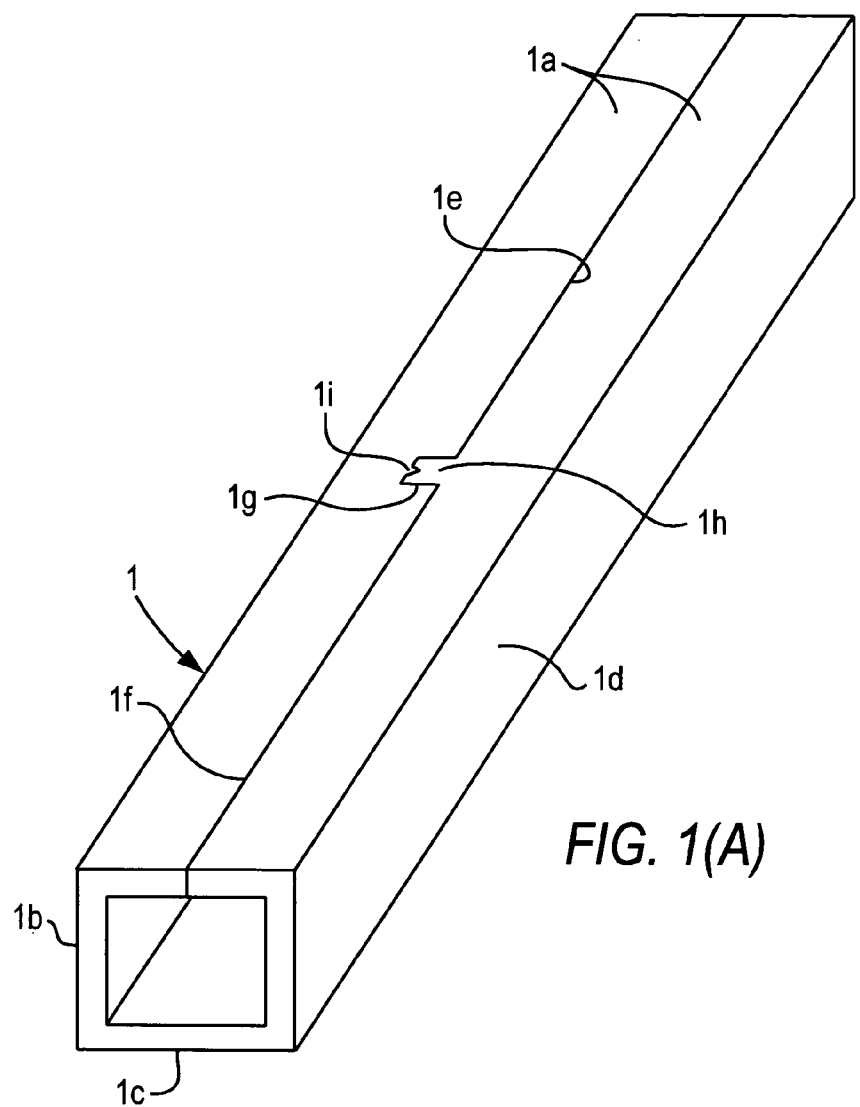
FIG. 1(A) is a perspective view of the exterior of the pipe body.

In FIG. 1(A), 1 is a pipe body of the present invention. The pipe body 1 has a rectangular prism shape consisting of four planes 1a, 1b, 1c, and 1d. The plane 1a is formed jointly with the surroundings, by way of contact of the opposite edge sections 1e, 1f.

Figure 1B:
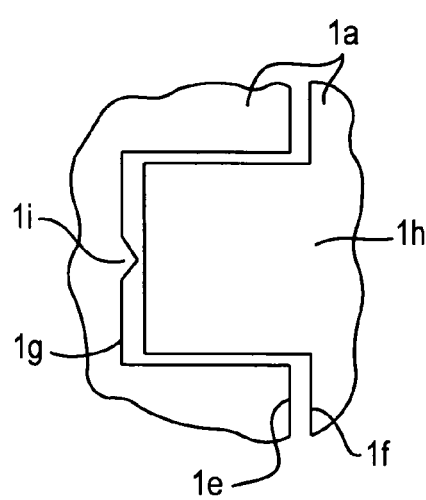
FIG. 1(B) is an enlarged view of a main part of the pipe body before completing forming the pipe body.

As shown in FIG. 1(B) which is an enlarged view of a main part before completing forming the pipe body 1, female engagement section 1g and male engagement section 1h engaged with each other in the facing state are formed in the edge sections 1e, 1f, respectively. Also, at the center of the bottom edge section of the female engagement section 1g, a projection 1i having a mountain shape which is projected toward an open end is formed.

Figure 1C:
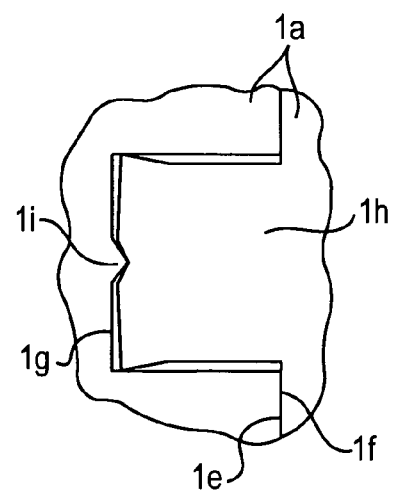
FIG. 1(C) is an enlarged view of the main part of the pipe body when completing forming the pipe body.

The projection 1i deforms a front end of the male engagement section 1h of a projecting shape toward both ends of the female engagement section 1g, as shown in FIG. 1(C) which is an enlarged view of the main part when completing forming the pipe body 1. Such deformation makes parts of the male engagement section 1h contacting with both edge sections of the female engagement section 1g, and thus, the female engagement section 1g and the male engagement section 1h are engaged with each other so that the edge sections 1e, 1f contact with each other closely.

Figure 2:
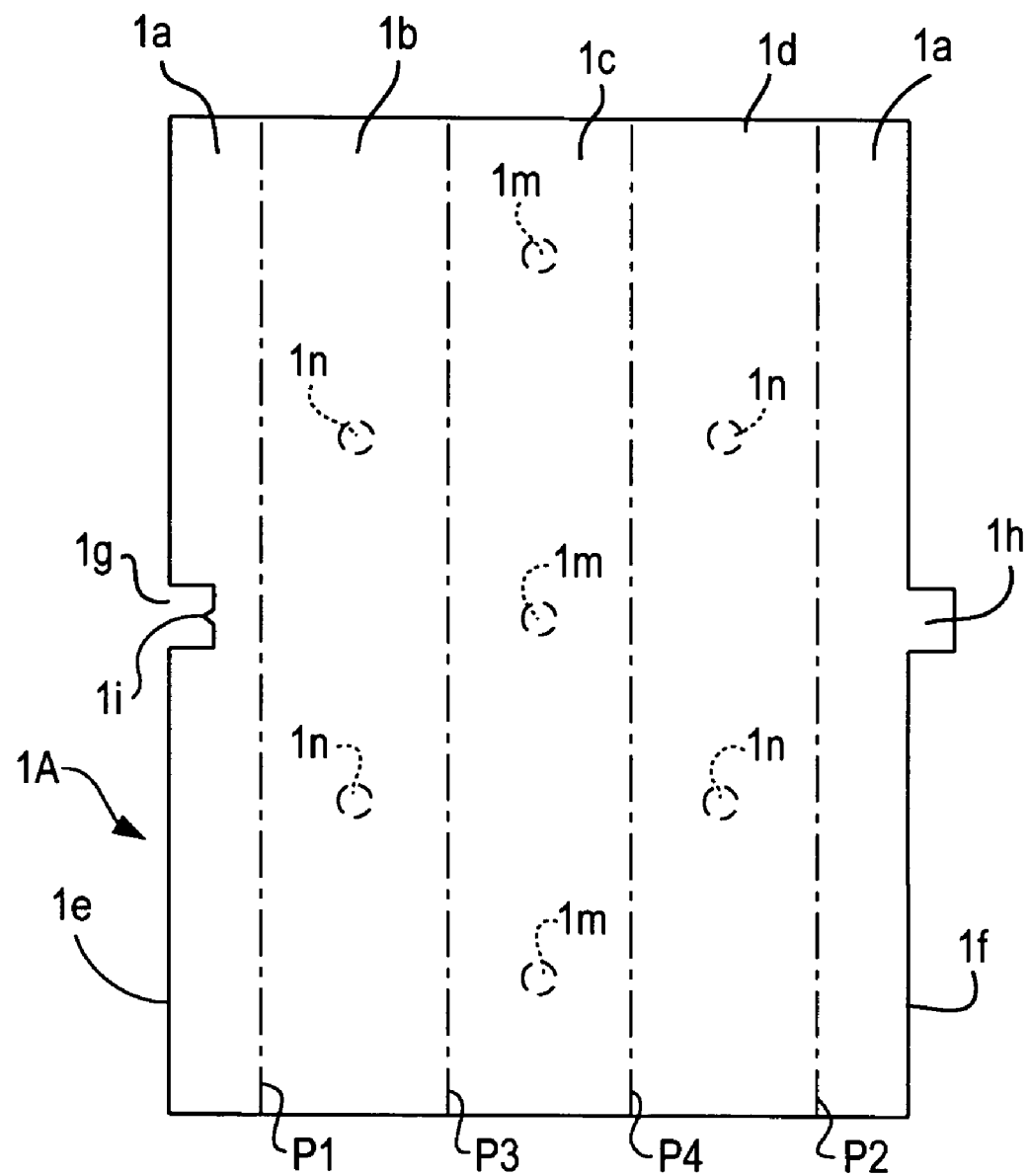
FIG. 2 is a plan view of a metal plate according to the first aspect of the present invention.

FIG. 2 shows a metal plate 1A for forming such pipe body 1. The sheet metal 1A is formed using a sheet shape of metal material as a source material by way of punching thereof. In FIG. 2, the same reference numerals given to elements of the pipe body 1 after forming are given to the corresponding elements, and explanation thereof will be omitted. Also, P1, P2, P3, P4 in FIG. 2 are lines representing positions to be bent by a press machine. The positions to be bent at the lines P1, P2, P3, P4 are designed in consideration of the amount of the sheet metal 1A to be expanded during the press forming.

Figure 3A:
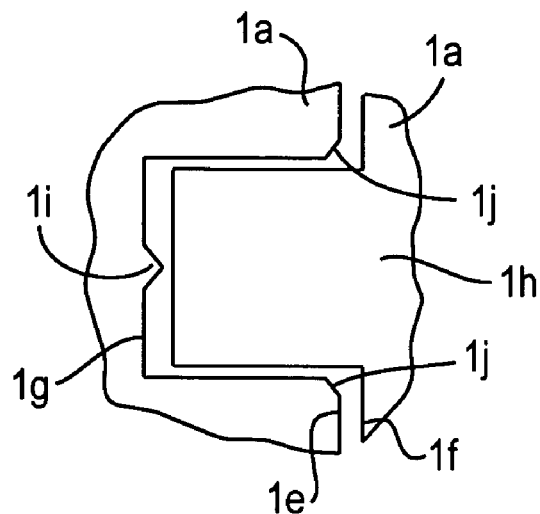
FIG. 3(A) is an enlarged view of the main part of the pipe body when completing forming the pipe body, in which a guide section is formed in female engagement section.
Figure 3B:
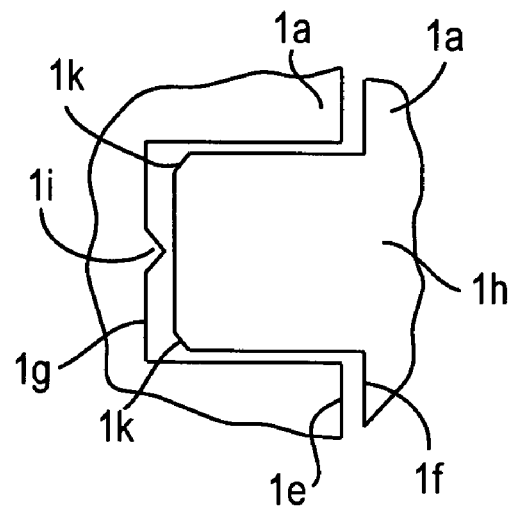
FIG. 3(B) is an enlarged view of the main part of the pipe body when completing forming the pipe body, in which a guide section is formed in male engagement section.
Figure 3C:
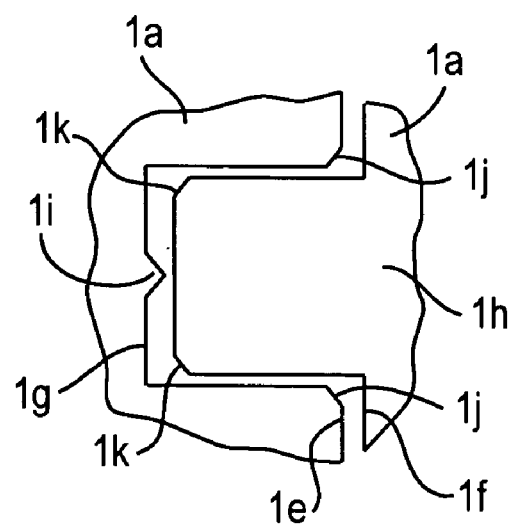
FIG. 3(C) is an enlarged view of the main part of the pipe body when completing forming the pipe body, in which guide sections are formed in female engagement section and male engagement section.

At the open ends of the female engagement 1g, as shown in FIG. 3(A), guide section 1j can be formed to broaden toward the open ends, so that the male engagement section 1h can be easily inserted into the female engagement section 1g. On the other hand, as shown in FIG. 3(B), guide section 1k tapering off toward the end can be formed at the front end of the male engagement section 1h, so that the same advantage can be obtained. As shown in FIG. 3(C), both guide sections 1j, 1k may be formed at the female engagement section 1g and the male engagement section 1h, respectively.

(Second Aspect of the Pipe Body)

Figure 4A:
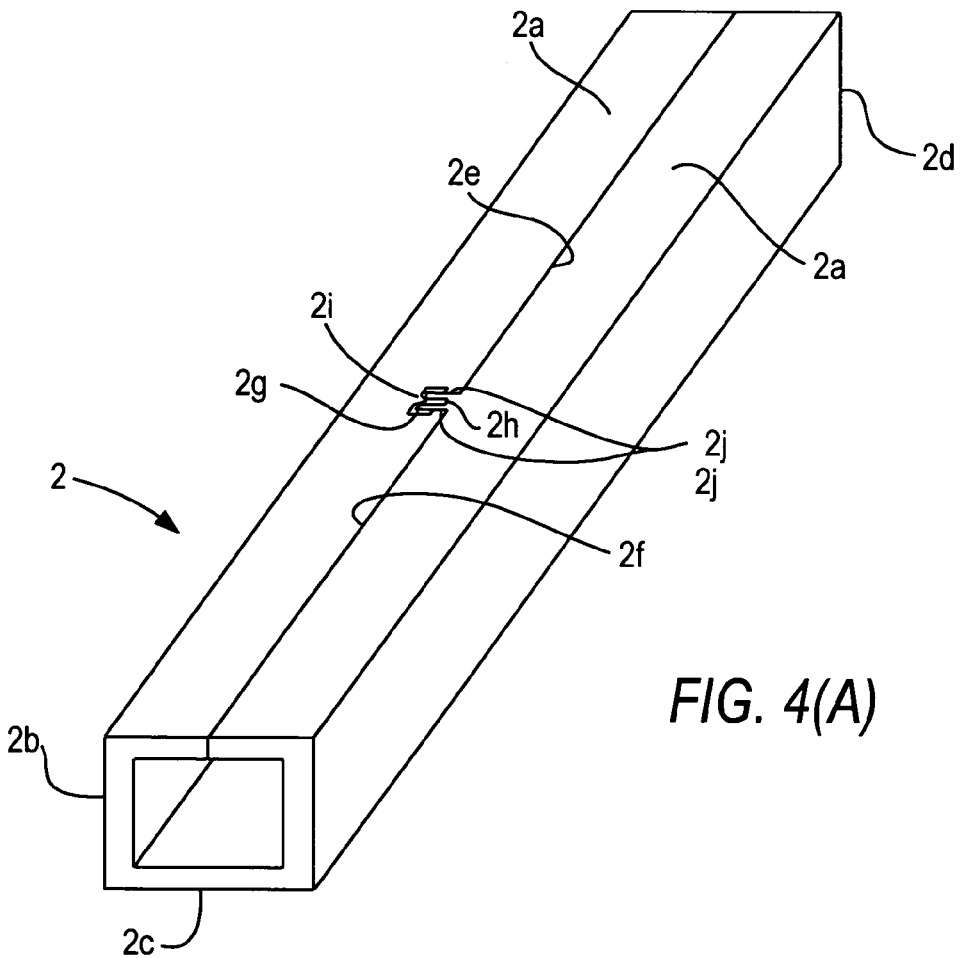
FIG. 4(A) is a perspective view of the exterior of the pipe body.

In FIG. 4(A), 2 is a pipe body of the present invention. The pipe body 2 has a rectangular prism shape consisting of four planes 2a, 2b, 2c, 2d. The plane 2a is formed jointly with the surroundings of the edge sections 2e, 2f by way of contact of the opposite edge sections 2e, 2f.

Figure 4B:
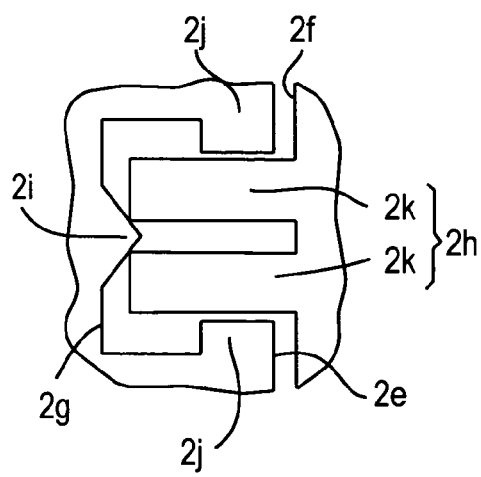
FIG. 4(B) is an enlarged view of a main part of the pipe body before completing forming the pipe body.

As shown in FIG. 4(B) which is an enlarged view of a main part before completing forming the pipe body 2, female engagement section 2g and male engagement section 2h engaged with each other in the facing state are formed in the edge sections 2e, 2f, respectively.

At the center of the bottom edge section of the female engagement section 2g, a projection 2i having a mountain shape which is projected toward the vicinity of the open end is formed. In the female engagement section 2g, engaging walls 2j projected toward each other are formed, so that a diameter of the opening at the vicinity of the open end is smaller than that of the vicinity of the opening at the bottom edge section.

Figure 4C:
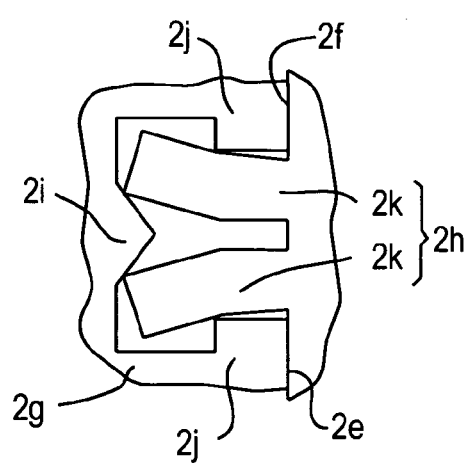
FIG. 4(C) is an enlarged view of the main part of the pipe body when completing forming the pipe body.

The male engagement section 2h consists of a pair of divided pieces 2k of which the projected ends are divided to be guided by the projection 2i and to be bending-deformed in a direction distant from each other, as shown in FIG. 4(C) which is an enlarged view of the main part when completing forming the pipe body 2. The bending-deformation of the divided pieces 2k make parts thereof be in contact with the engaging walls 2j and thus, the female engagement section 2g and the male engagement section 2h are engaged with each other so that the edge sections 2e, 2f contact with each other closely, and at the same time, separation of the engagement sections is prevented.

Figure 5:
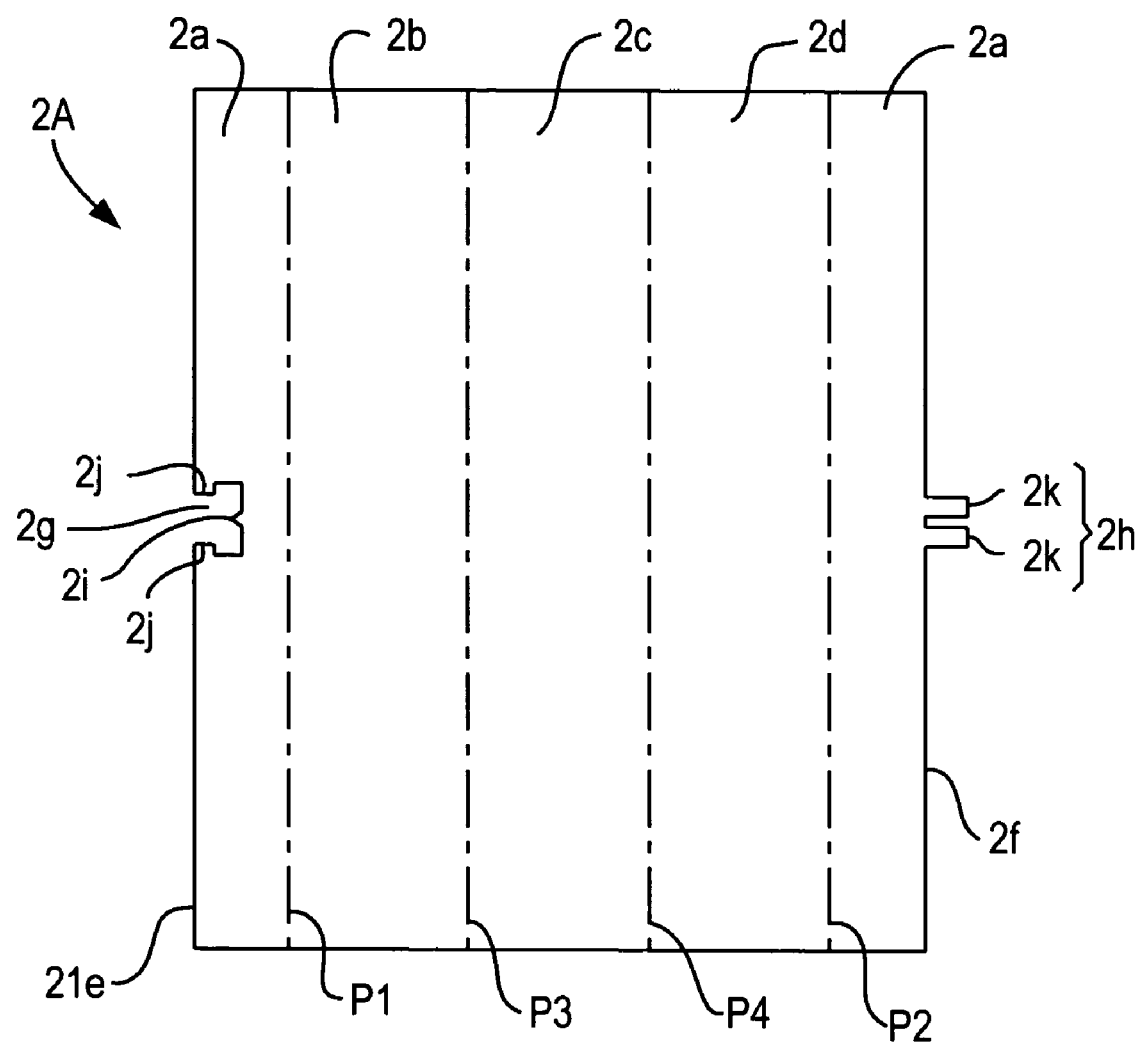
FIG. 5 is a plan view of a metal plate according to the second aspect of the present invention.

FIG. 5 shows a metal plate 2A for forming such pipe body 2. The sheet metal 2A is formed using a sheet shape of metal material as a source material by way of punching thereof. In FIG. 5, the same reference numerals given to elements of the pipe body 2 after forming are given to the corresponding elements, and explanation thereof will be omitted. Also, P1, P2, P3, P4 in FIG. 5 are lines representing positions to be bent by a press machine. The positions to be bent at the lines P1, P2, P3, P4 are designed in consideration of the amount of the sheet metal 2A to be expanded during press forming.

(Third Aspect of the Pipe Body)

Figure 6A:
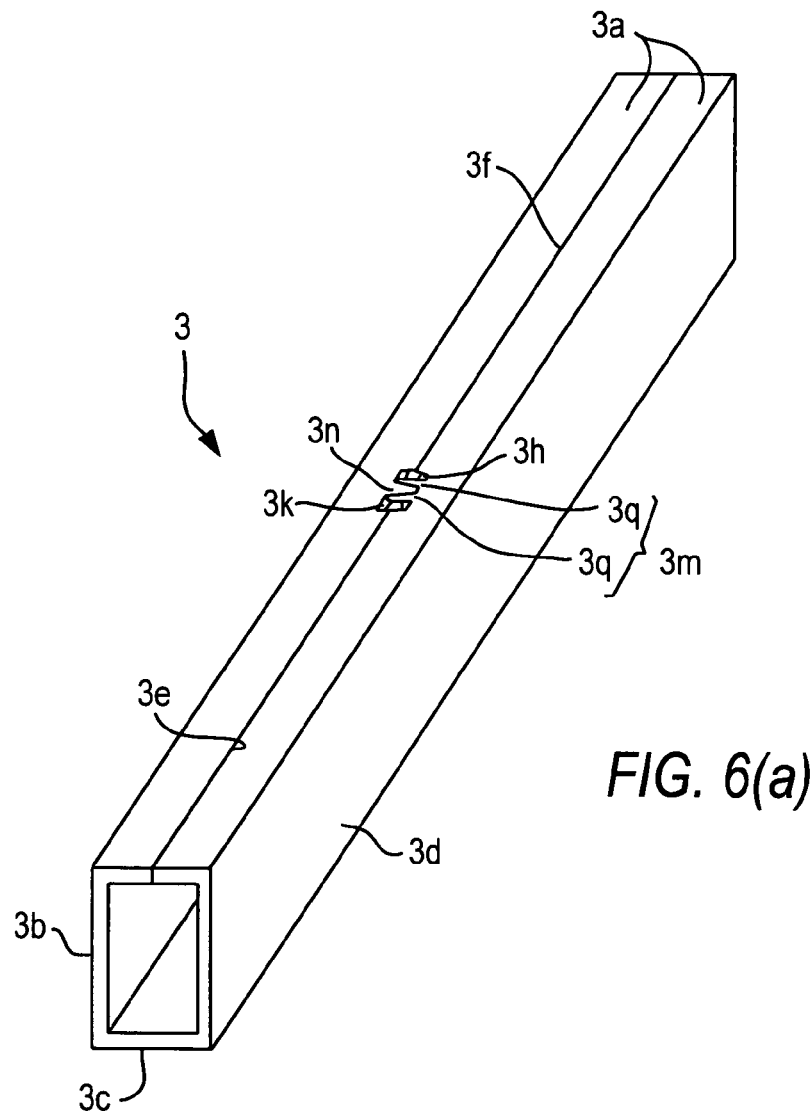
FIG. 6(A) is a perspective view of the exterior of the pipe body.

In FIG. 6(A), 3 is a pipe body of the present invention. The pipe body 3 has a rectangular prism shape consisting of four planes 3a, 3b, 3c, 3d and the plane 3a is formed jointly with the surroundings, by way of contact of the opposite edge sections 3e, 3f.

Figures 6B, 6C:
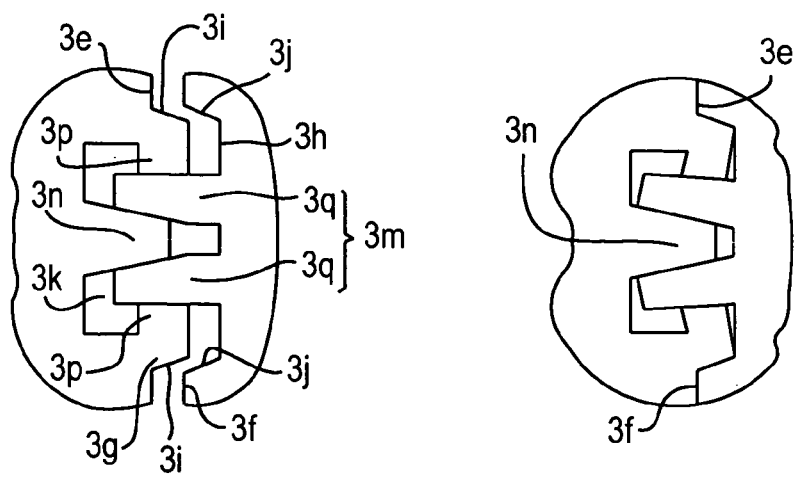
FIG. 6(B) is an enlarged view of a main part of the pipe body before completing forming the pipe body.
FIG. 6(C) is an enlarged view of the main part of the pipe body when completing forming the pipe body.

At the edge section 3e, convex engagement section 3g projected from the edge section 3e is formed. At the edge section 3f concave engagement section 3h engaged with the convex engagement section 3g in the facing state are formed, as shown in FIG. 6(B) which is an enlarged view of a main part of the pipe body before completing forming the pipe body 3. At the convex engagement sections 3g, sloped sides 3i are formed so that the width of the convex engagement section gets smaller toward the projected end. At the concave engagement section 3h, sloped sides 3j are formed so that the diameter of the opening gets greater toward the open end.

At the uneven engagement sections 3g, 3h, female engagement section 3k and male engagement section 3m engaged with each other in the facing state each other are formed, respectively.

At the center of the bottom edge section of the female engagement section 3k, a projection 3n having a mountain shape projected toward the vicinity of the open end is formed. At the female engagement section 3k, engaging walls 3p projected toward each other are formed so that a diameter of the opening at the vicinity of the open end is smaller than that of the opening of the vicinity of the bottom edge section.

Figure 7:
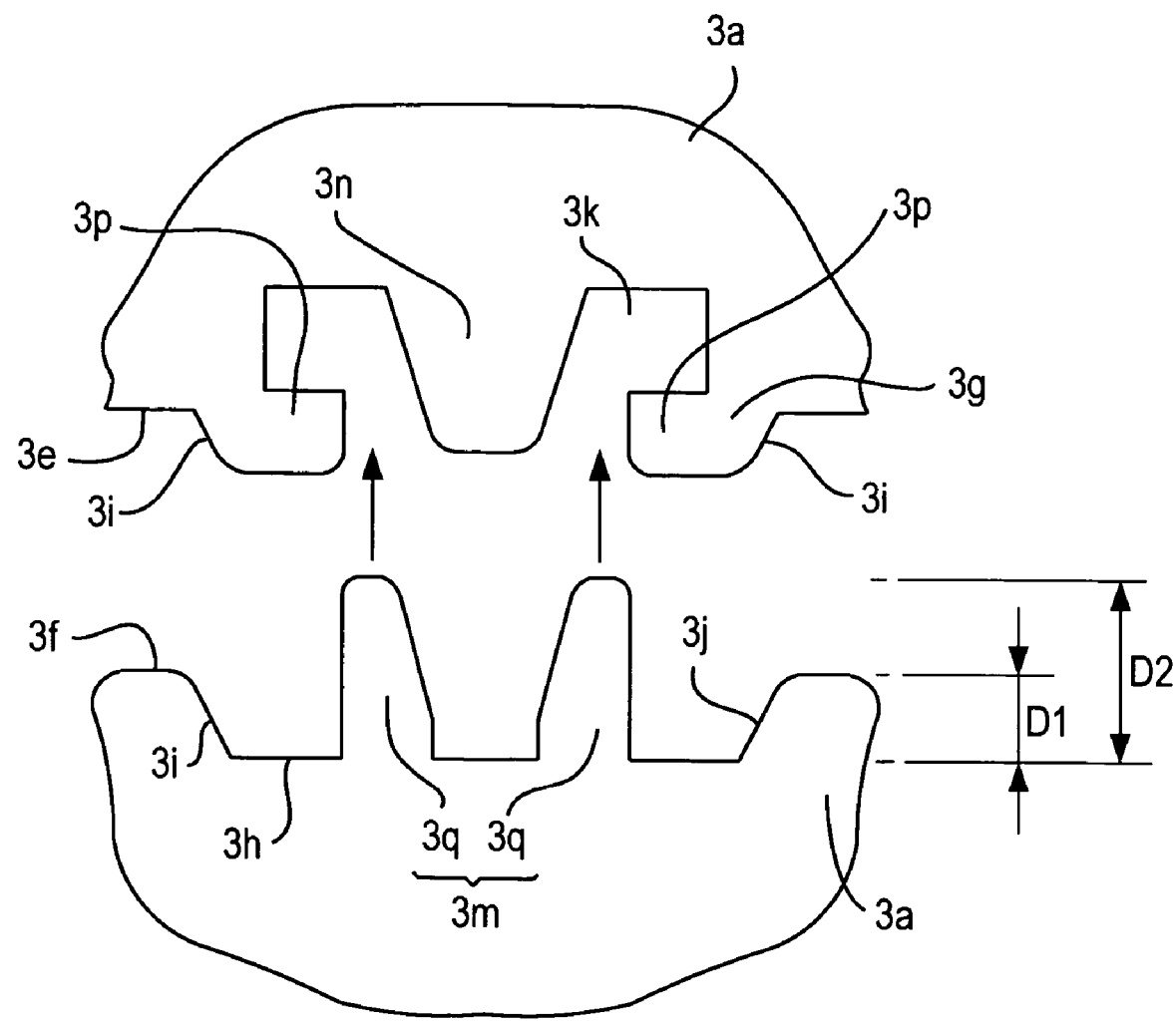
FIG. 7 illustrates a relationship between female engagement section and male engagement section of the pipe body and uneven engagement sections according to the third aspect of the present invention before engaging with each other.

The male engagement section 3m, as shown in FIG. 6(C) which is an enlarged view of the main part of the pipe body when completing forming the pipe body 3, consists of a pair of divided pieces 3q of which the projected ends are divided to be guided by the projection 3n and to be deformed in a direction far from each other. As shown in FIG. 7, the length D1 of the pair of divided pieces 3q projected from the bottom of the concave engagement section 3h is set to be greater than the depth D2 of the concave engagement section 3h, and thus, the front end of the divided pieces 3q are projected from the edge section 3f. Therefore, the projected length D1–D2 of the divided pieces 3q from the edge section 3f can be maintained small, and the length D1 of the divided pieces 3q can be maintained as great as the length of the divided pieces 2k in the second aspect of the present invention. Also, in even a pipe body in which a width D3 of a direction crossing the edge sections 3e, 3f is small as shown in FIG. 6(A), the divided pieces 3q can be deformed without the front ends of the divided pieces 3q contacting with the bottom side of the female engagement section 3k.

Figure 8A:
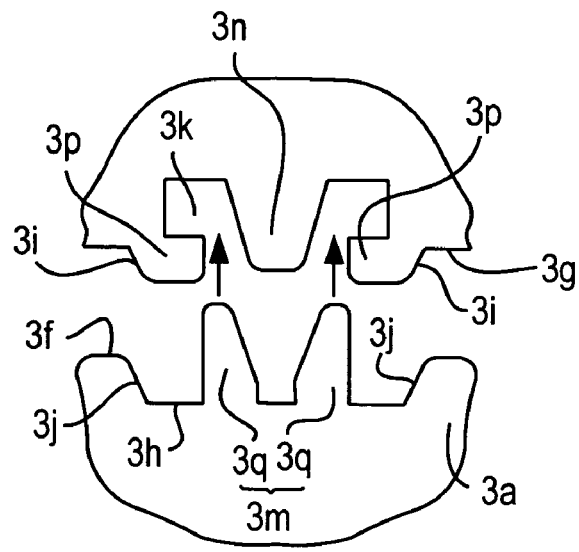
FIG. 8(A) is an enlarged view of a main part of the pipe body before the male and female engagement sections and the uneven engagement sections are engaged with each other.
Figure 8B:
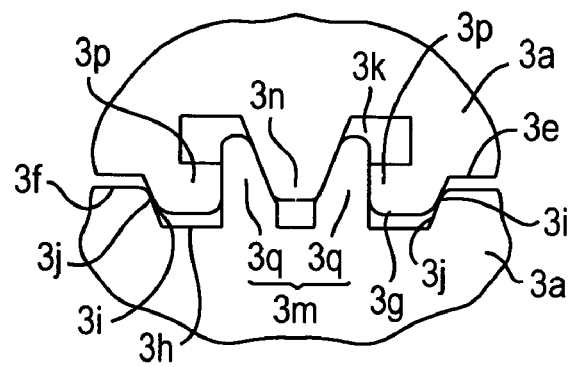
FIG. 8(B) is an enlarged view of the main part of the pipe body when the female and male engagement sections begin to be engaged with each other (a first deformation)
Figure 8C:
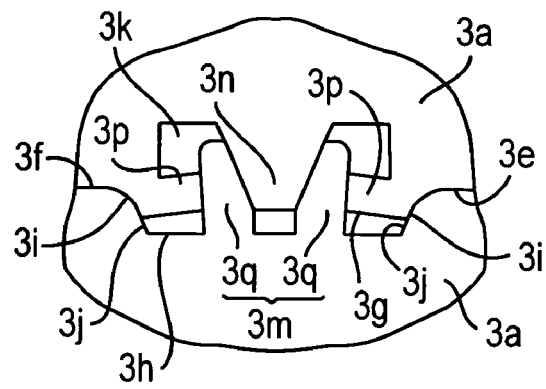
FIG. 8(C) is an enlarged view of the main part of the pipe body when the female and male engagement sections and the uneven engagement sections complete being engaged with each other (a second deformation)

Therefore, as shown in FIG. 8(A), when the edge sections 3e, 3f get in contact with each other by a press machine, first, the front ends of the divided pieces 3q are inserted between the engaging walls 3p and the projection 3n as shown in FIG. 8(B), and then enter inside of the convex engagement sections 3g, the front ends of the engaging walls 3p are bent toward the female engagement section 3k by means of the slope of the sloped sides 3i, 3j as shown in FIG. 8(C), and the divided pieces 3q are inserted and supported between the engaging walls 3p and the projection 3n. If the female engagement section 3k and the male engagement section 3m are engaged with each other to be in contact with each other in a state that the edge sections 3e, 3f is closed, separation thereof is prevented.

Therefore, the slope angles of the sloped side 3i and the sloped side 3j are set to be nearly equal to each other. Or, the slope angles are set to be a relative angle such that the front end of the engaging walls 3p are bent to enter inside of the female engagement section 3k by the sloped side 3j. Also, by forming the uneven engagement sections 3g, 3h and at the same time, projecting the divided pieces 3q from the edge section 3f, part of all members associated with the engagement are positioned on the contact line of the edge sections 3e, 3f without a gap, so that a strength for the engagement sections can be secured.

Figure 9:
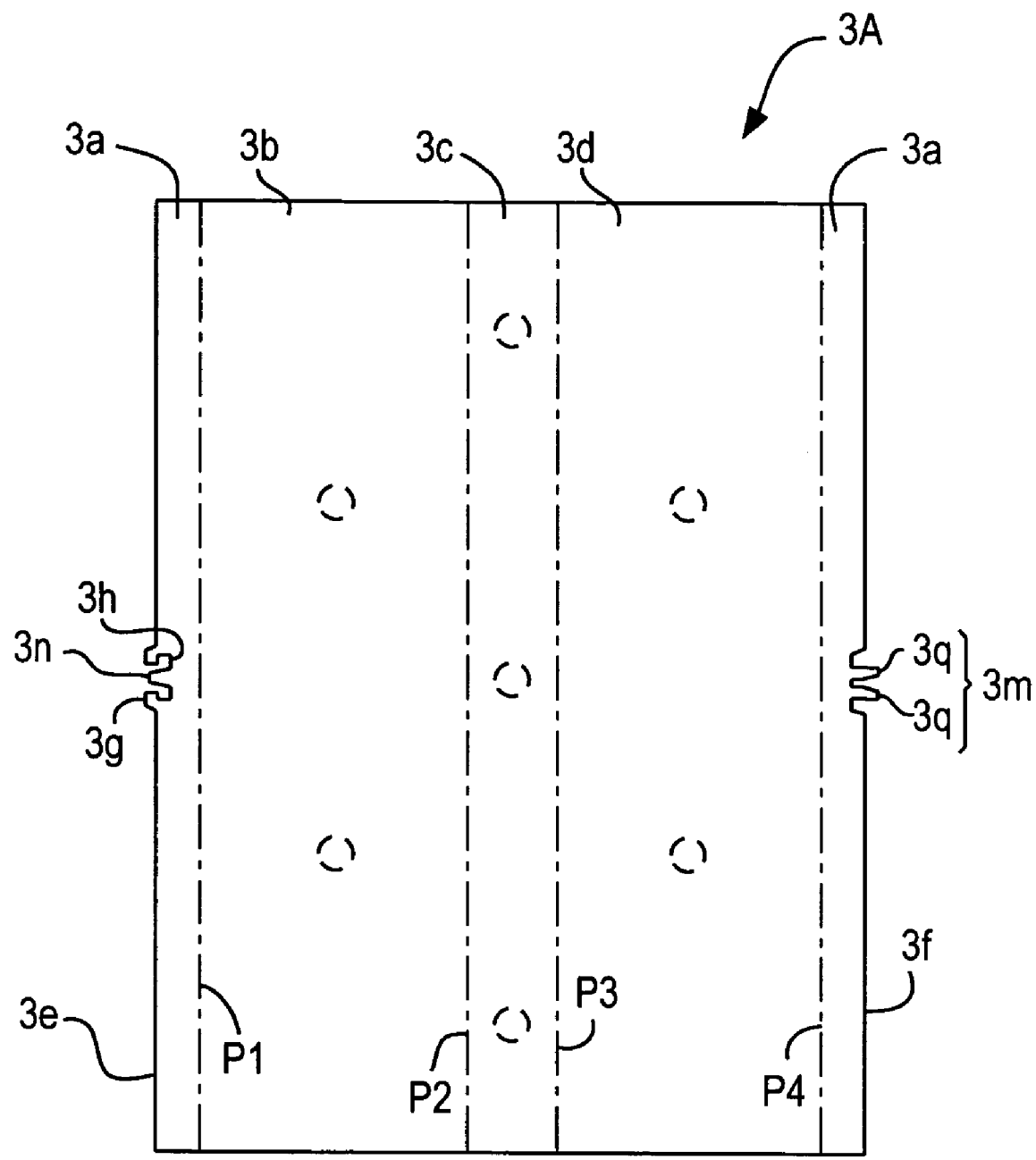
FIG. 9 is a plan view of the sheet metal according to the third aspect of the present invention.

FIG. 9 shows a metal plate 3A for forming such pipe body 3. The sheet metal 3A is formed using a sheet shape of metal material as a source material by way of punching thereof. In FIG. 9, the same reference numerals given to elements of the pipe body 3 after forming are given to the corresponding elements, and explanation thereof will be omitted. Also, P1, P2, P3, P4 in FIG. 9 are lines representing positions to be bent by a press machine. The positions to be bent at the lines P1, P2, P3, P4 are designed in consideration of the amount of the sheet metal 3A to be expanded during press forming.

(Modified Example 1 of the Engagement Section)

Figure 10A:
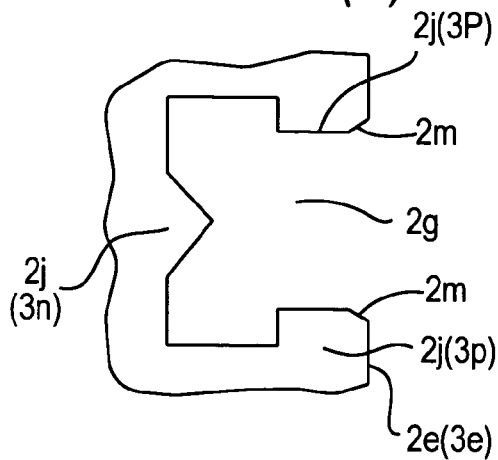
FIG. 10(A) is an enlarged view of the female engagement section in which guide sections are formed.
Figure 10B:
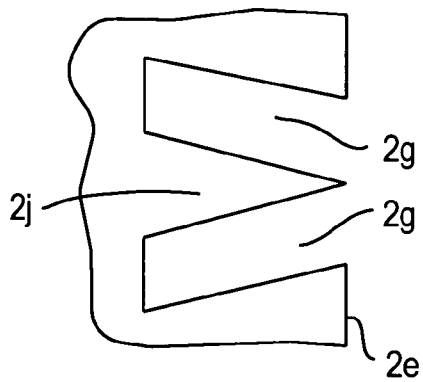
FIG. 10(B) is an enlarged view of the female engagement section consisting of a pair of female engagement sections.

At the open end of the engaging walls 2j(3p), as shown in FIG. 10(A), guide sections 2m in which the opening of the engaging walls broadens toward the open end are formed, so that the male engagement section 2h(3m) can be easily inserted into the female engagement section 2g. Also, as shown in FIG. 10(B), the front end of the projection 2i' can be projected to the neighborhood of the edge section 2e, thereby forming a pair of female engagement sections 2g' divided by the projection 2i'.

Figure 10C:
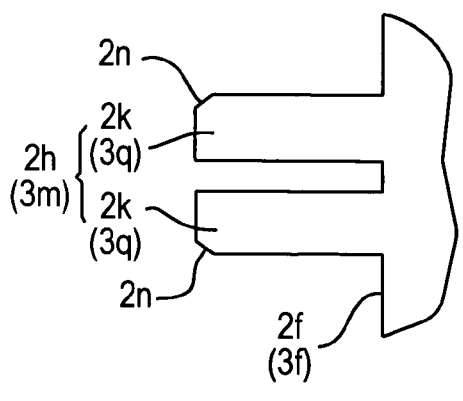
FIG. 10(C) is an enlarged view of the male engagement section in which guide sections are formed.
Figure 10D:
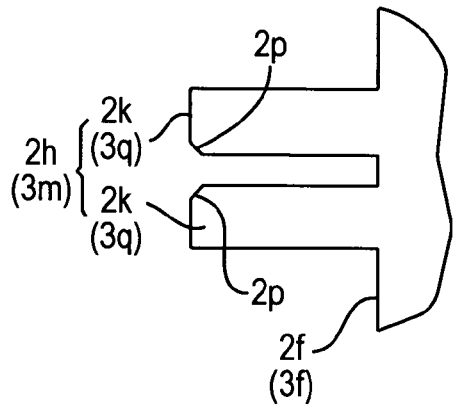
FIG. 10(D) is an enlarged view of the female engagement section in which guide sections for sliding contact are formed.

On the other hand, as shown in FIG. 10(C), guide sections 2n in which the width of the male engagement section narrows toward the end are formed at the front end of the male engagement section 2h(3m), so that the same advantages can be obtained. As shown in FIG. 10(D), sliding-contact guide sections 2p which broadens away each other are formed at the front ends of the opposite sides of the divided pieces 2k(3q), so that the divided pieces 2k(3q) can be easily bending-guided in the estranging direction thereof.

Figure 10E:
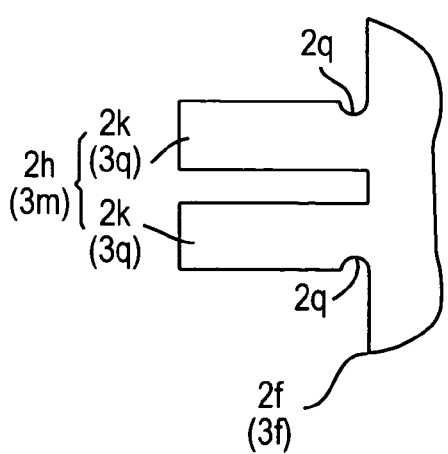
FIG. 10(E) is an enlarged view of the female engagement section in which recessed guide sections are formed.
Figure 10F:
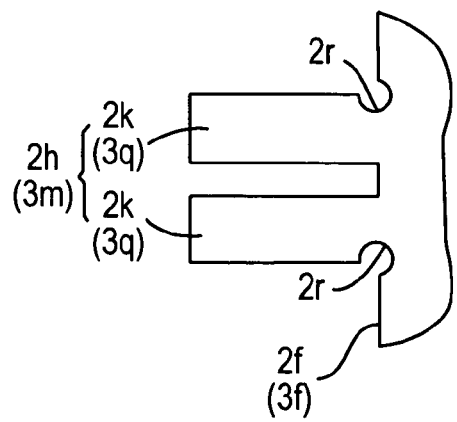
FIG. 10(F) is an enlarged view of the female engagement section in which another recessed guide sections are formed.

At that time, if the sloped angles of the projection 2i(3n) and the sliding-contact guide sections 2p are almost matched, the divided pieces 2k(3q) can be prevented from digging into the projection 2i(3n), as well as the initial contact area of the projection 2i(3n) and the divided pieces 2k(3q) when contacted can be secured to be great. Therefore, more stable engagement can be realized. Also, as shown in FIG. 10(E), recessed guide section 2q is formed at the base of the male engagement section 2h(3m), or, as shown in FIG. 10(F), recessed guide sections 2r reached from the base of the male engagement section 2h(3m) to the edge section 2f(3f) are formed, so that the divided pieces 2k can be easily bending-deformed over the whole. The guide sections 2m, 2n, 2p, 2q, 2r can be combined appropriately.

(Modified Example 2 of the Engagement Section)

Figure 11A:
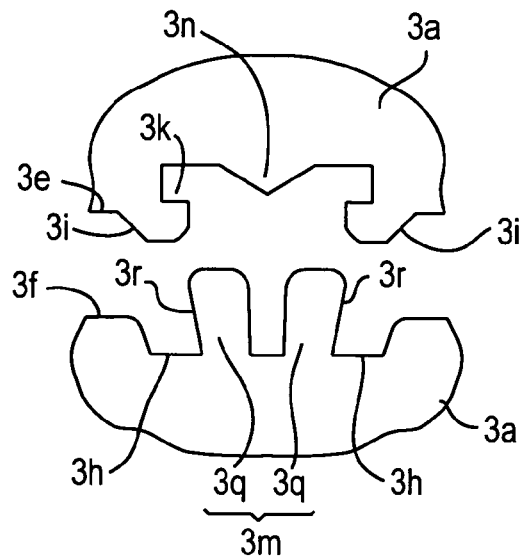
FIG. 11(A) is an enlarged view of a main part of the pipe body before the female and male engagement sections and the uneven engagement sections are engaged with each other.
Figure 11B:
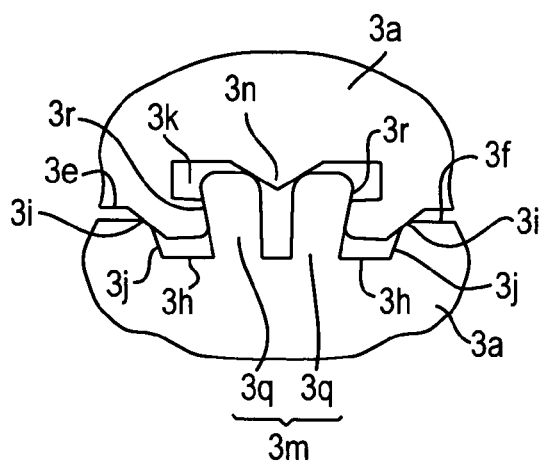
FIG. 11(B) is an enlarged view of the main part of the pipe body when the female and male engagement sections begin to be engaged with each other (a first deformation)
Figure 11C:
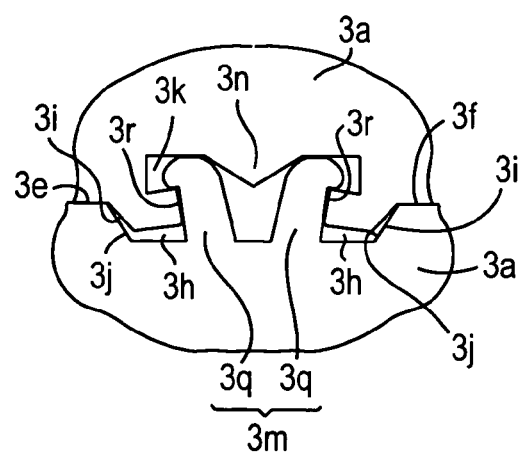
FIG. 11(C) is an enlarged view of the main part of the pipe body when the female and male engagement sections and the uneven engagement sections complete being engaged with each other (a second deformation)

As shown in FIG. 11(A), the height of the projection 3n is set as small as that of the projection 2i in the second aspect, and at the same time, the outer sides of the divided pieces 3q are formed to be the sloped sides 3r, so that the width of the whole male engagement section 3m narrows toward the base thereof. Therefore, as shown in FIG. 11(B) and FIG. 11(C), the engaging walls 3p can easily enter inside of the female engagement section 3k, and at the same time, the engagement of the female and male engagement sections 3k, 3m can be more secured by way of bending-deformation of the front ends of the divided pieces 3q within the female engagement section 3k.

(Modified Example 3 of the Engagement Section)

Figure 12A:
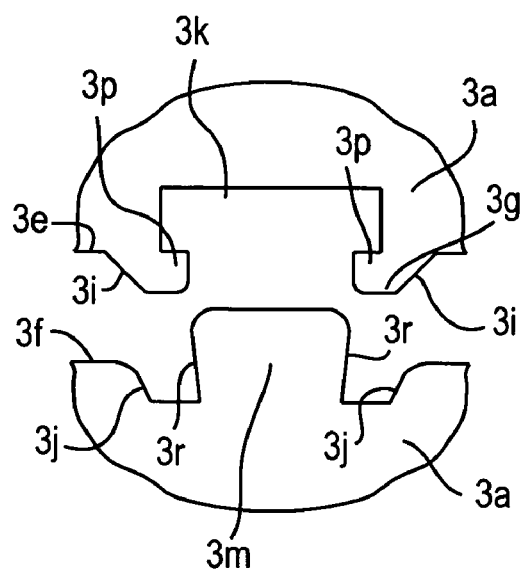
FIG. 12(A) is an enlarged view of a main part of the pipe body before the female and male engagement sections and the uneven engagement sections are engaged with each other.
Figure 12B:
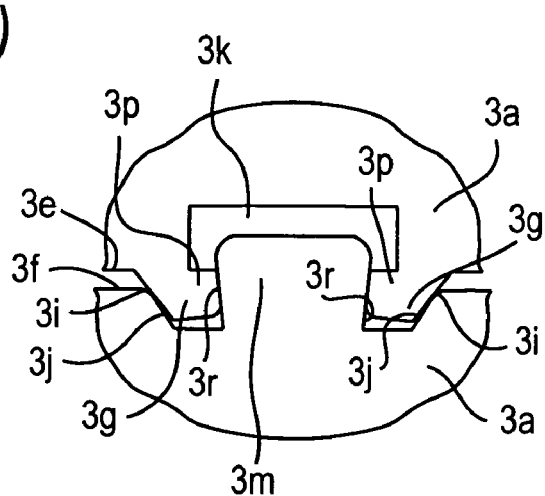
FIG. 12(B) is an enlarged view of the main part of the pipe body when the male and female engagement sections begin to be engaged with each other (a first deformation)
Figure 12C:
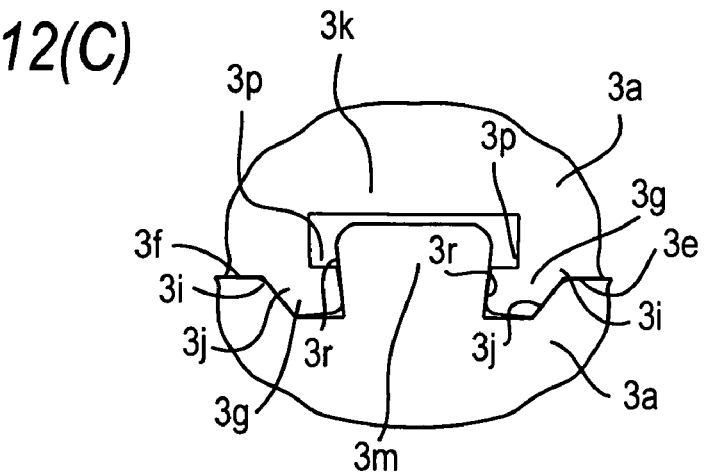
FIG. 12(C) is an enlarged view of the main part of the pipe body when the female and male engagement sections and the uneven engagement sections complete being engaged with each other (a second deformation)

As shown in FIG. 12(A), even if the projection 3n and the divided pieces of the male engagement 3m are omitted and both outer sides of the male engagement 3m, like the modified example 2, are formed to be the sloped sides 3r, the engaging walls 3p can easily enter inside of the female engagement section 3k, and at the same time, the engagement of the female and male engagement sections 3k, 3m can be more secured, as shown in FIG. 12(B) and FIG. 12(C).

(Modified Example 4 of the Engagement Section)

Figure 13A:
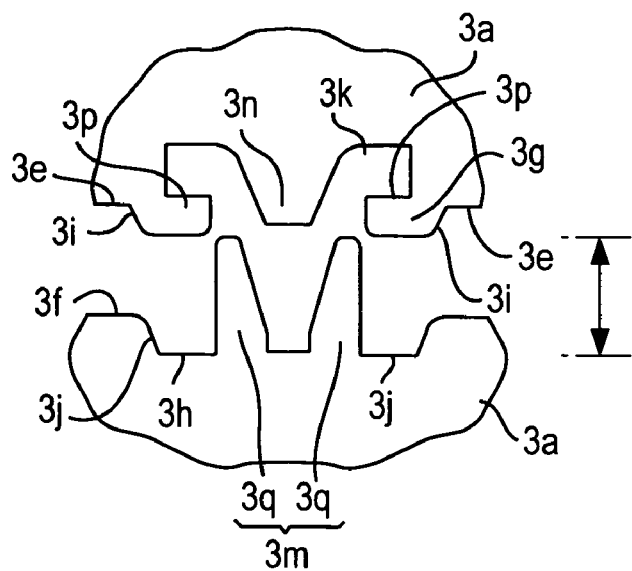
FIG. 13(A) is an enlarged view of a main part of the pipe body before the female and male engagement sections and the uneven engagement sections are engaged with each other.
Figure 13B:
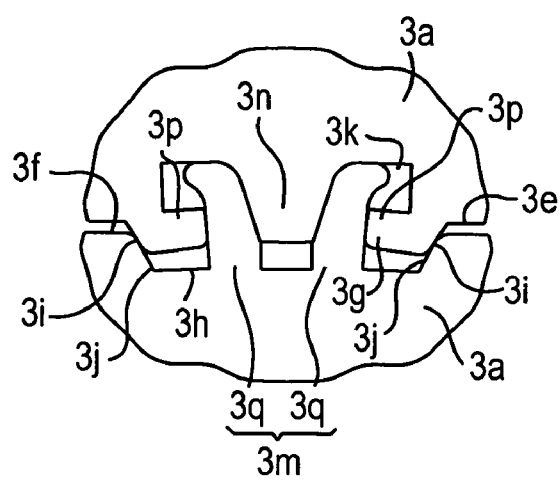
FIG. 13(B) is an enlarged view of the main part of the pipe body when the female and male engagement sections begin to be engaged with each other (a first deformation)
Figure 13C:
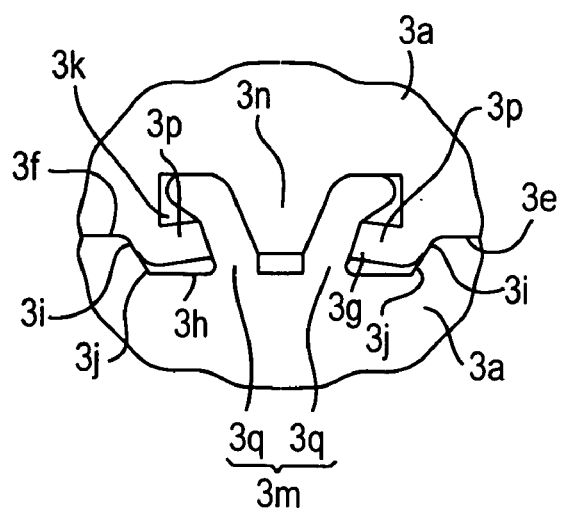
FIG. 13(C) is an enlarged view of the main part of the pipe body when the female and male engagement sections and the uneven engagement sections complete being engaged with each other (a second deformation)

Even if, as shown in FIG. 13(A), the projected length D3 of the divided pieces 3q is set to be greater than the above projected length D1, the engagement of the female and male engagement sections 3k, 3m can be more secured by way of bending-deformation of the front end of the divided pieces 3q within the female engagement section 3k, as shown in FIG. 13(B) and FIG. 13(C).

(Modified Example 5 of the Engagement Section)

Figure 14A:
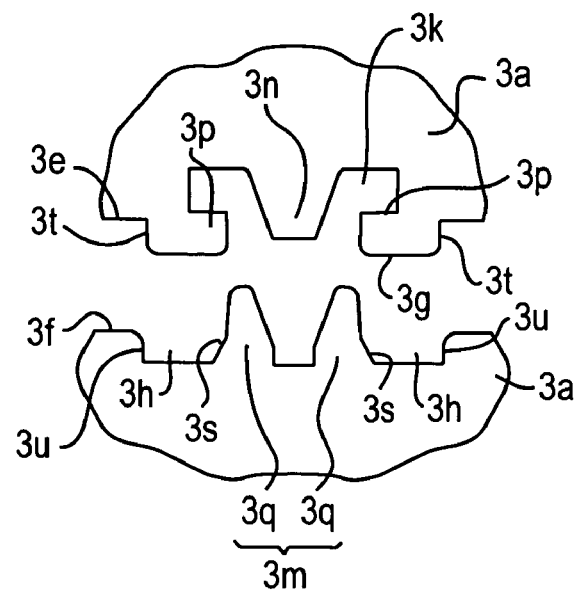
FIG. 14(A) is an enlarged view of a main part of the pipe body before the female and male engagement sections and the uneven engagement sections are engaged with each other.
Figure 14B:
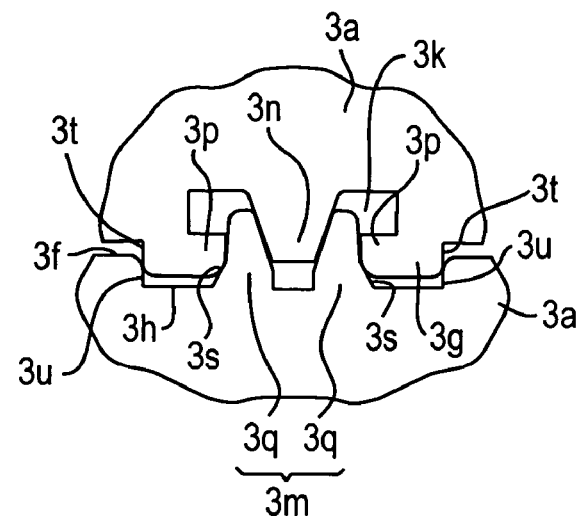
FIG. 14(B) is an enlarged view of the main part of the pipe body when the female and male engagement sections begin to be engaged with each other (a first deformation)
Figure 14C:
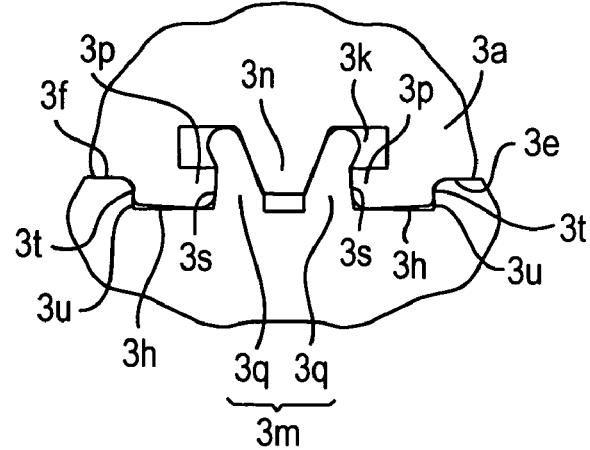
FIG. 14(C) is an enlarged view of the main part of the pipe body when the male and female engagement sections and the uneven engagement sections complete being engaged with each other (a second deformation)

As shown in FIG. 14(A), the outer sides of the divided pieces 3q are formed to be the sloped sides 3s such that the whole width of the male engagement section 3m narrows toward the front end thereof, and at the same time, the sloped direction of the sloped sides 3t, 3u is set to be the opposite direction of the sloped sides 3i, 3j. As shown in FIG. 14(B) and FIG. 14(C), the divided pieces 3q can easily enter inside of the female engagement section 3k, so that the sloped sides 3s open the engaging walls 3p and the sloped sides 3t and the sloped sides 3u are engaged with each other. Therefore, the uneven engagement sections 3h, 3g can be engaged with each other.

(Modified Example 6 of the Engagement Section)

Figure 15A:
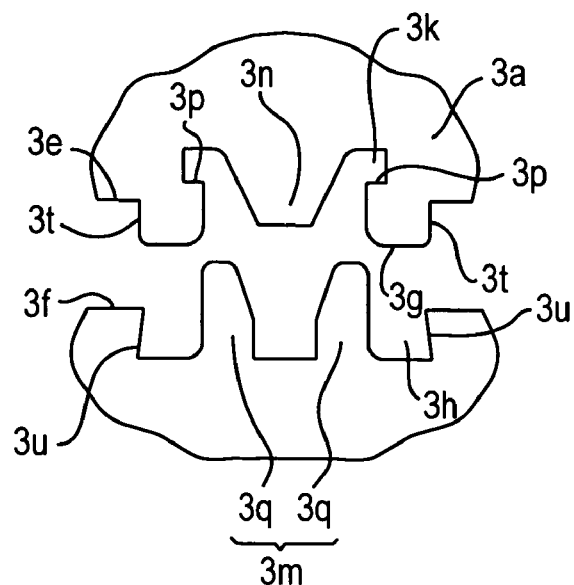
FIG. 15(A) is an enlarged view of a main part of the pipe body before the female and male engagement sections and the unevenness sections are engaged with each other.
Figure 15B:
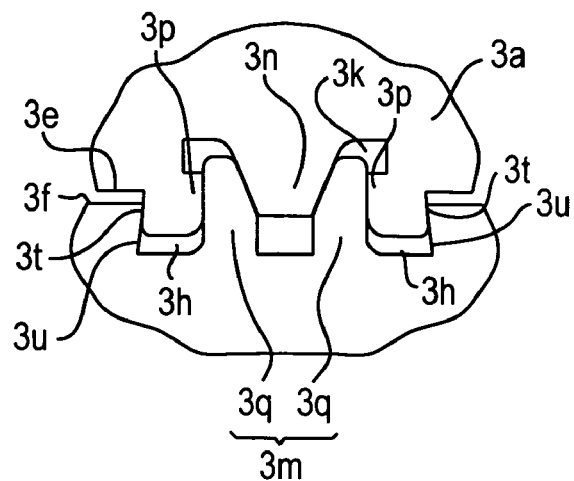
FIG. 15(B) is an enlarged view of the main part of the pipe body when the male and female engagement sections begin to be engaged with each other (a first deformation)
Figure 15C:
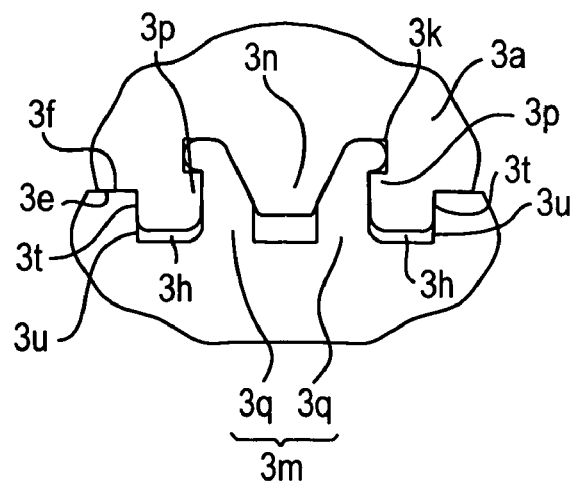
FIG. 15(C) is an enlarged view of the main part of the pipe body when the female and male engagement sections and the uneven engagement sections complete being engaged with each other (a second deformation)

As shown in FIG. 15(A), the width of the projection 3n can get greater so that the opening angle of the divided pieces 3q by the engagement with the projection 3n can get greater. Accordingly, as shown in FIG. 15(B) and FIG. 15(C), the divided pieces 3q enter inside of the female engagement section 3k to open the engaging walls 3p, so that the sloped sides 3t and the sloped side 3u are engaged with each other. Therefore, the uneven engagement sections 3h, 3g can be engaged with each other.

These modified examples 1–6 can be appropriately adopted to the female and male engagement sections 1g, 1h, 2g, 2h in the first to the third aspects.

(Other Sheet Metals)

Figure 16:
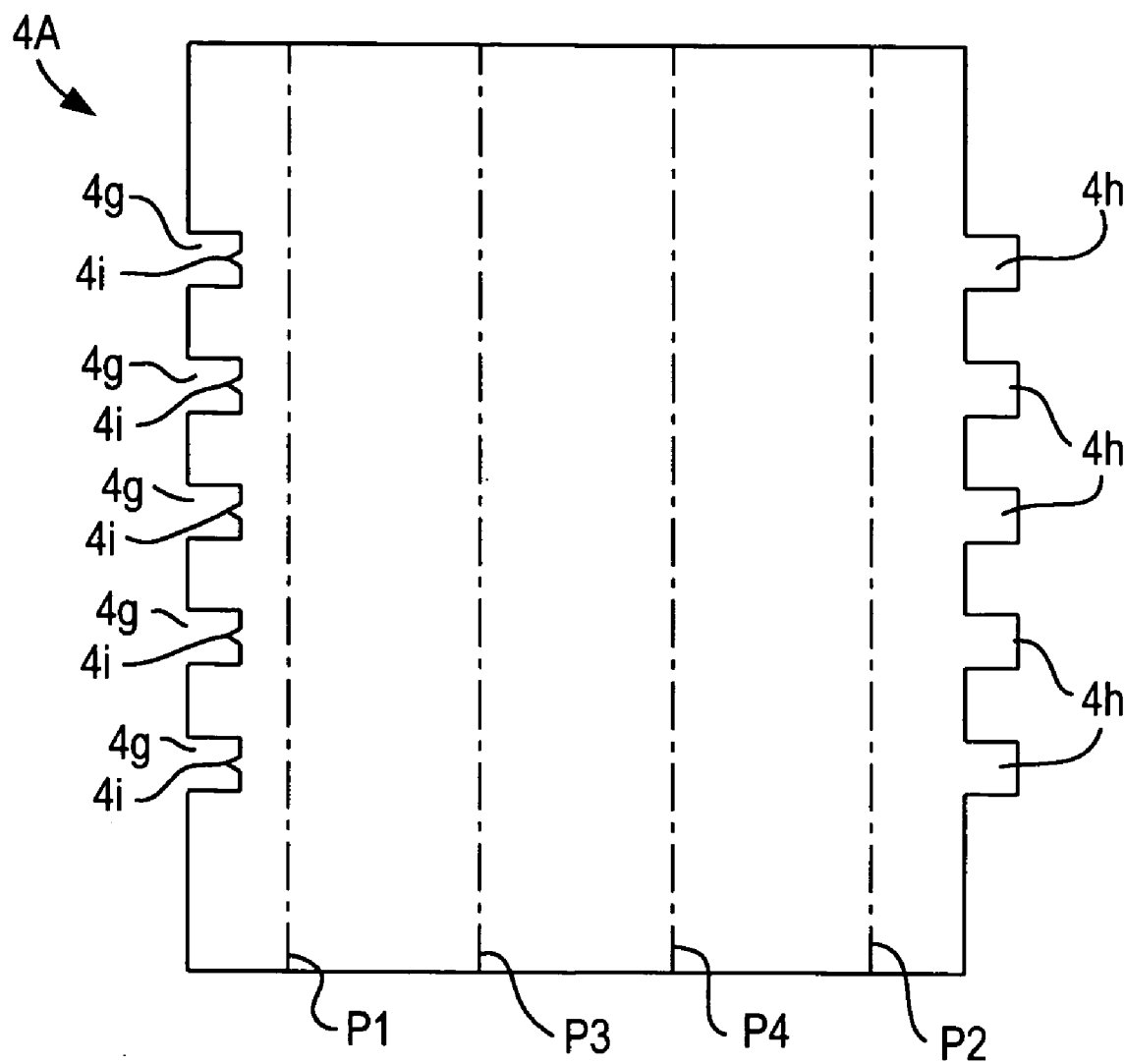
FIG. 16 is a plan view of an example 1 of the sheet metal.

In the sheet metals 1A and 2A used in the above examples, the sheet metals include one female engagement section 1g, 2g and one male engagement section 1h, 2h, respectively. However, for example, as shown in FIG. 16, a plurality of female engagement sections 4g and a plurality of male engagement sections 4h may be formed in the sheet metal 4A, and the same time, the projection 4i may be formed in the female engagement sections 4g (not in all the female engagement sections).

Figure 17:
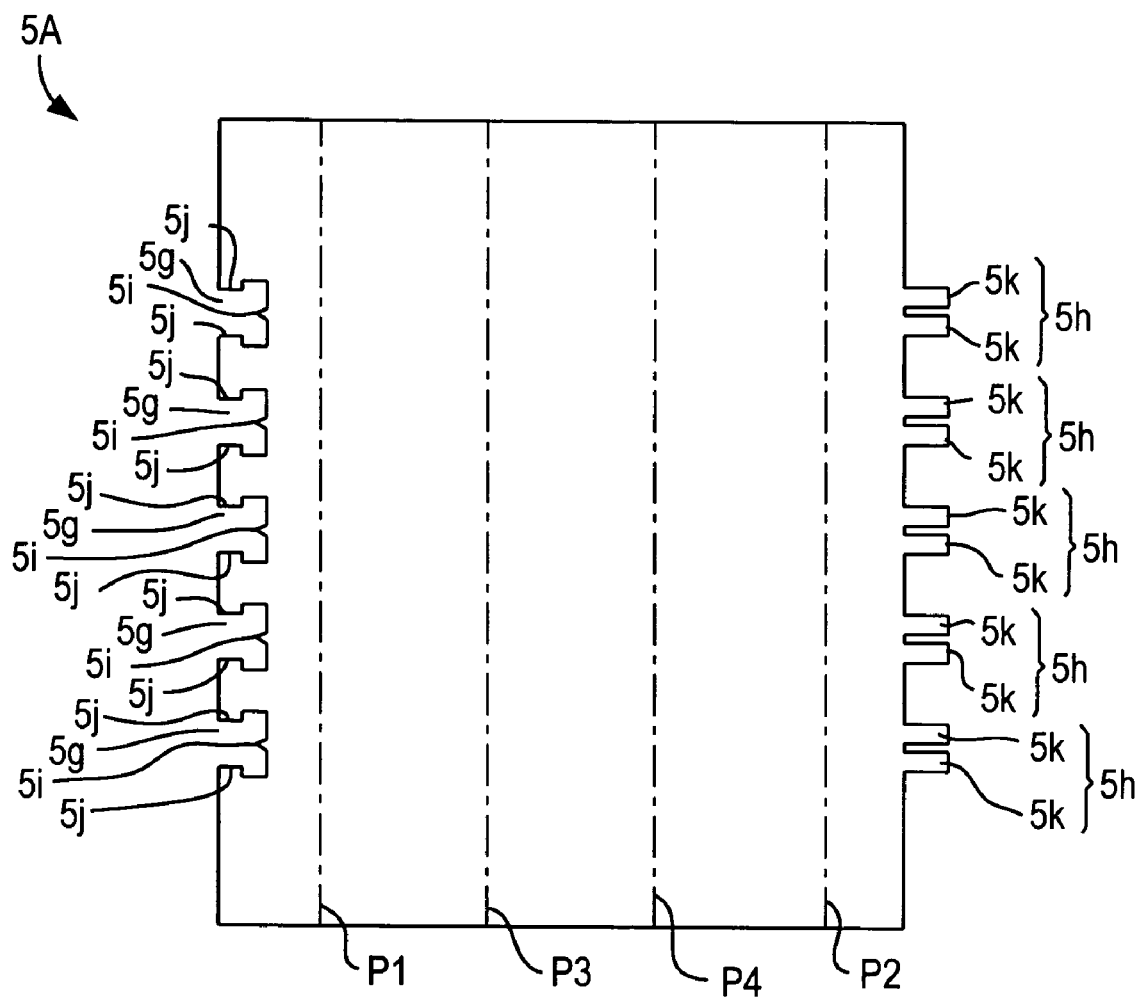
FIG. 17 is a plan view of an example 2 of the sheet metal.

As shown in FIG. 17, a plurality of female engagement sections 5g and a plurality of male engagement sections 5h may be formed in the sheet metal 5A, and at the same time, the projection 5i and the engaging walls 5j may be formed in the female engagement sections 5g (not in all the female engagement sections), and the male engagement sections 5h may be divided to form the divided pieces 5k.

Figure 18:
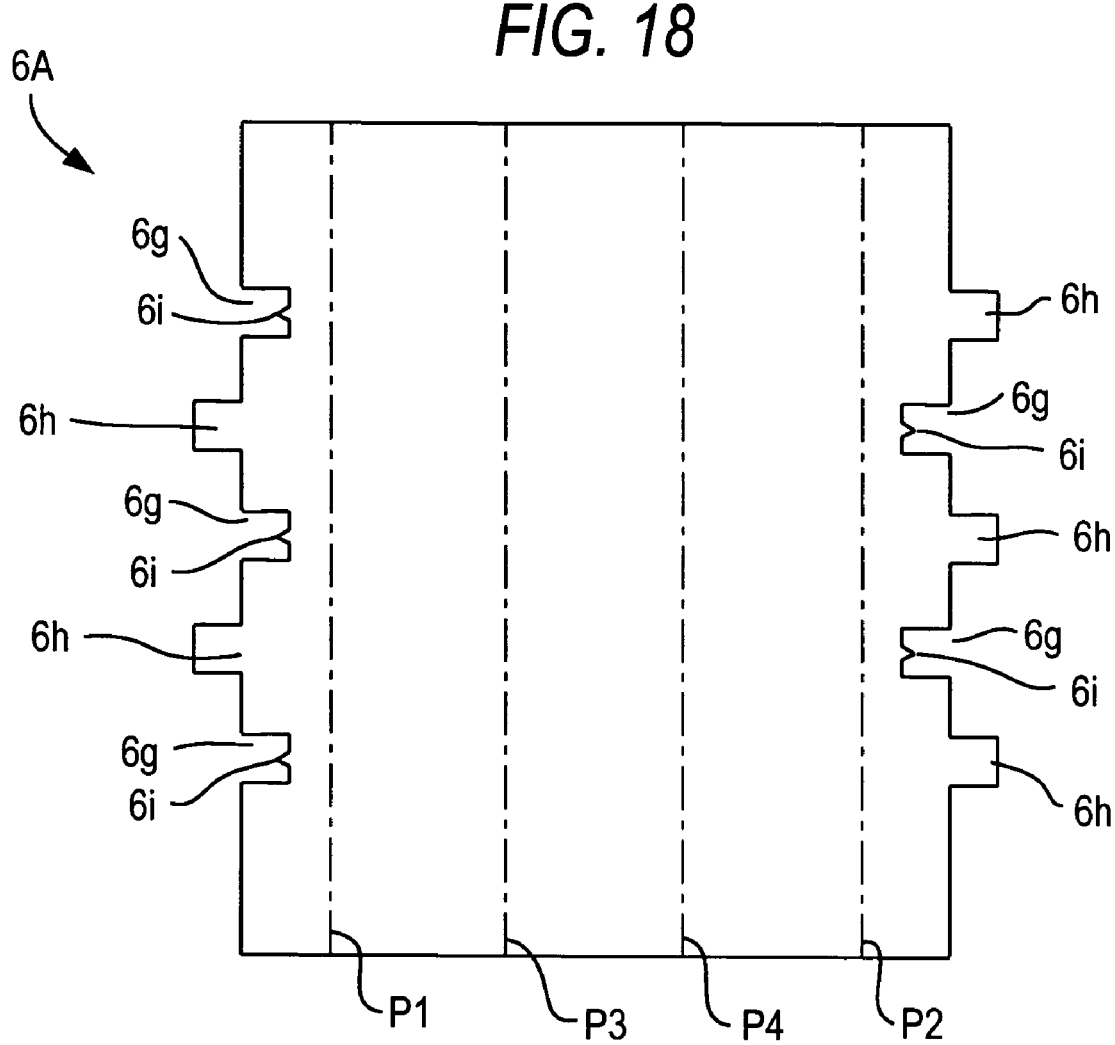
FIG. 18 is a plan view of an example 3 of the sheet metal.

As shown in FIG. 18, a plurality of female engagement sections 6g and a plurality of male engagement sections 6h may be formed in the sheet metal 6A in turn, and at the same time, the projection 6i may be formed in the female engagement sections 6g (not in all the female engagement sections).

Figure 19:
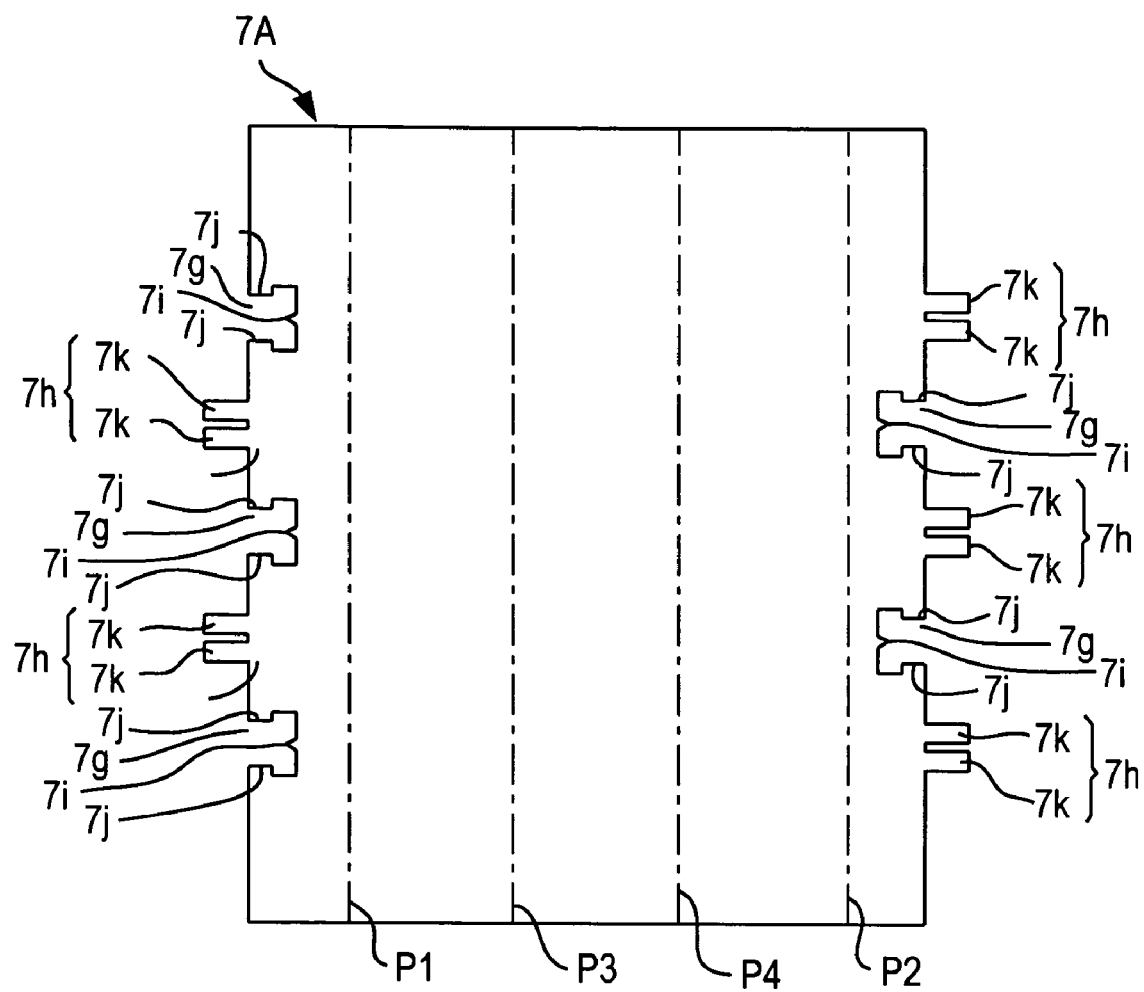
FIG. 19 is a plan view of an example 4 of the sheet metal.

Also, as shown in FIG. 19, a plurality of female engagement sections 7g and a plurality of male engagement sections 7h may be formed in the sheet metal 7A in turn, and at the same time, the projection 7i and the engaging walls 7j may be formed in the female engagement sections 7g (not in all the female engagement sections), and the male engagement sections 7h may be divided to form the divided pieces 7k.

The proper material in consideration of intensity according to the purpose for use, (for example, for use in a frame for fixing a body panel of a duplicator or in a frame for fixing parts) can be used as the sheet metal for forming the pipe body, and the position or the number of the engagement sections can be selected appropriately according to the purpose for use.

Also, as shown in FIG. 2, holes 1m for fixation to a machine (mold) in the press processing to be explained later can be formed in the sheet metal 1A, or screw holes 1n for fixation to the body panel of the duplicator or for fixation to parts can be formed in the sheet metal 1A including other planes 1b, 1d, so that the range for application thereof can be varied according to the purpose for use of the pipe body 1. At that time, the screw holes 1n may be used as clearance holes and the holes 1m may be used commonly as the screw holes and the holes for fixation to the mold. The position or the number of the holes is not limited, and also may be formed even when completing forming the pipe body.

<Forming Method of the Ends-Contact Type Pipe Body>

Now, the methods of forming the rectangular prism pipe body by use of the aforementioned sheet metals 1A–6A will be explained with reference to FIG. 20-31. As described above, various kinds of sheet metals 1A–6A can be considered for the pipe bodies in each figure, but, for the purpose of convenience of explanation, other female and male engagement sections will be omitted in parts of the figures. Also, for the purpose of convenience of explanation, only the case that the pipe body 1 is formed by use of the sheet metal 1A will be explained and the cases that the pipe body 1 is formed by use of the sheet metal 2A–6A will not be explained.

(Forming Method 1)

Figure 20A:
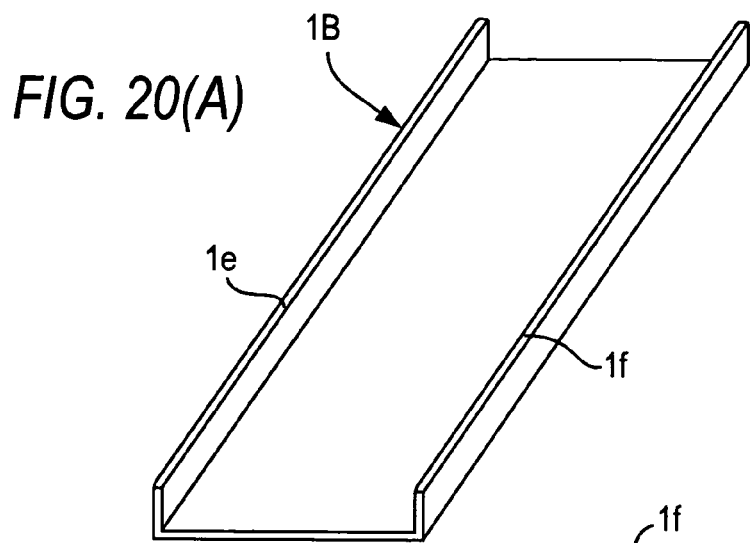
FIG. 20(A) is a perspective view of a first processed piece.

As shown in FIG. 20(A), the vicinity of the edge sections 1e, 1f of the sheet metal 1A are bent (the bent positions are the lines P1, P2) in the same direction along the edge sections 1e, 1f by means of the known press machine, to be set upright (in case of a rectangular prism, the angle of the plane 1a and the plane 1b and the angle of the plane 1a and the plane 1d are 90°), so that a first processed piece 1B is obtained.

Figure 20B:
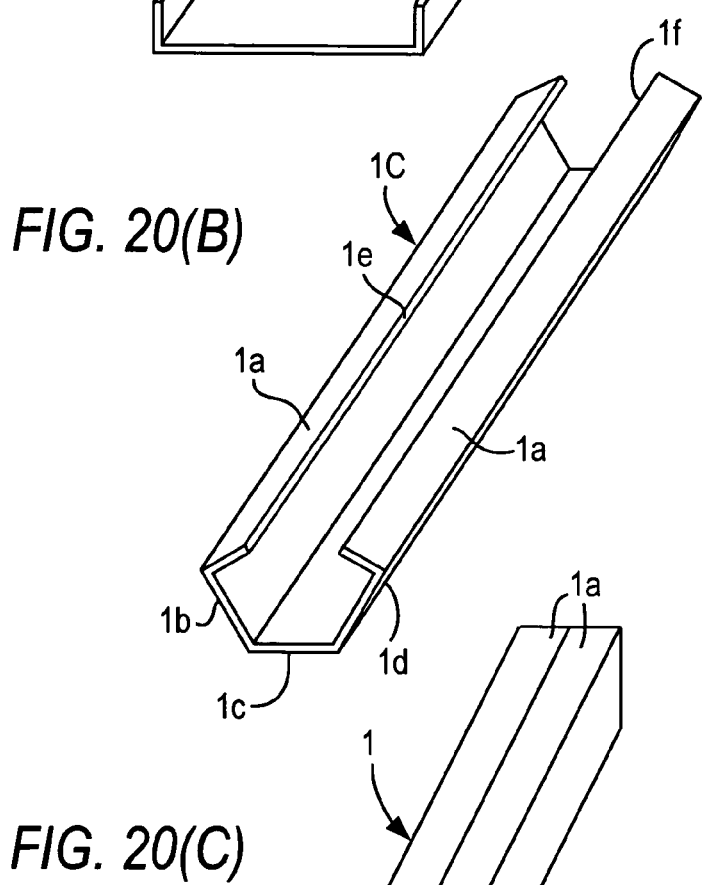
FIG. 20(B) is a perspective view of a second processed piece.

As shown in FIG. 20(B), the inner parts of the bent positions to be the plane 1a are further bent (the bent positions are the line P3, P4) along the edge sections 1e, 1f by means of the known press machine, so that the edge sections 1e, 1f are opposite to each other in the separated state. Thus, a second processed piece 1C is obtained. At that time, the gap between the edge sections 1e, 1f is set to be greater than the width of the plane 1c, so that the mold of the press machine and the second processed piece 1C can be separated easily.

Figure 21A:
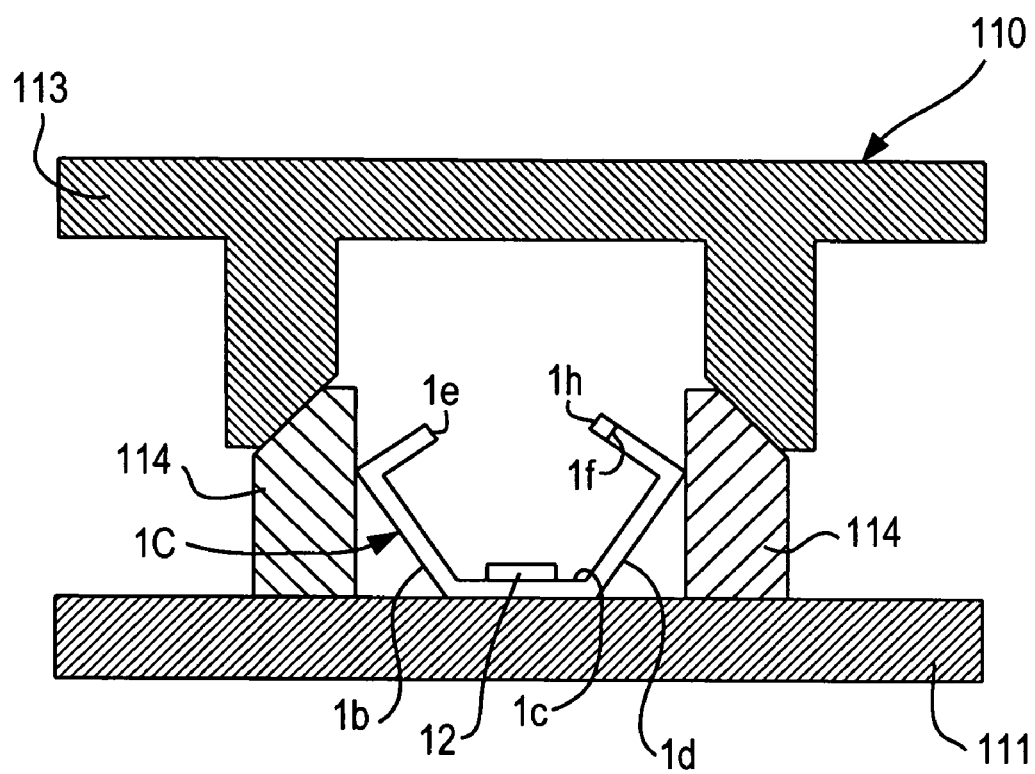
FIG. 21(A) is a cross-sectional view of a press machine when the second processed piece is set.

Then, as shown in FIG. 21(A), the second processed piece 1C is set in a lower mold 111 of a press machine 110. At that time, the plane 1c of the second processed piece 1C is fixed by means of a pushing member 12 provided at the lower mold 111.

In such state, as shown in FIG. 21(B), an upper mold 113 goes down, and the pressing members 114 of the lower mold 111 approach each other. Accordingly, the edge sections 1e, 1f approach each other.

Figure 20C:
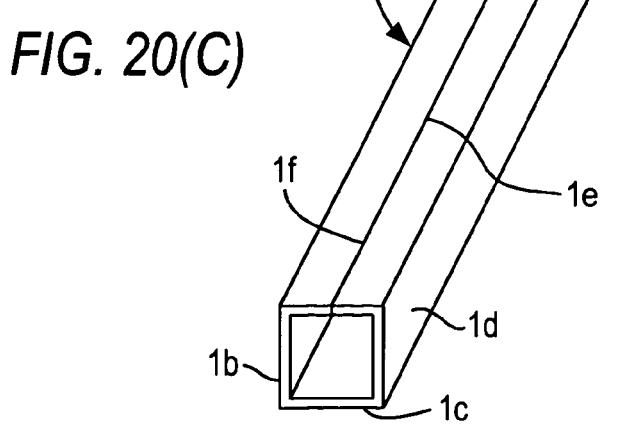
FIG. 20(C) is a perspective view of the pipe body.

Then, while the female engagement section 1g and the male engagement section 1h are engaged with each other, the front end of the male engagement section 1h is deformed by means of the projection 1i. This deformation make parts of the male engagement section 1h intensively contact with both edge sections of the female engagement section 1g (refer to FIG. 1(C)), and as a result, the female engagement section 1g and the male engagement section 1h are engaged with each other to maintain the close contact of the edge sections 1e, 1f. Also, because this engagement absorbs the spring back having a direction that the edge sections 1e, 1f are separated from each other, the forming of the pipe body 1 in which the edge sections 1e, 1f closely contact with each other is possible, as shown in FIG. 20(C).

(Modified Example of the Forming Method 1)

Figure 22A:
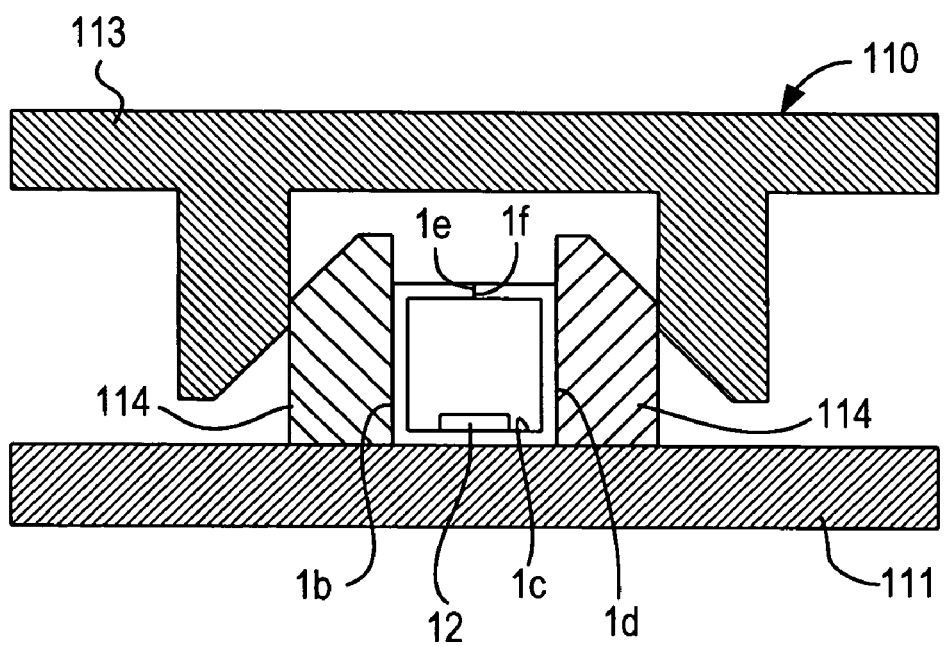
FIG. 22(A) is a cross-sectional view of a press machine when the second processed piece is set.
Figure 22A:
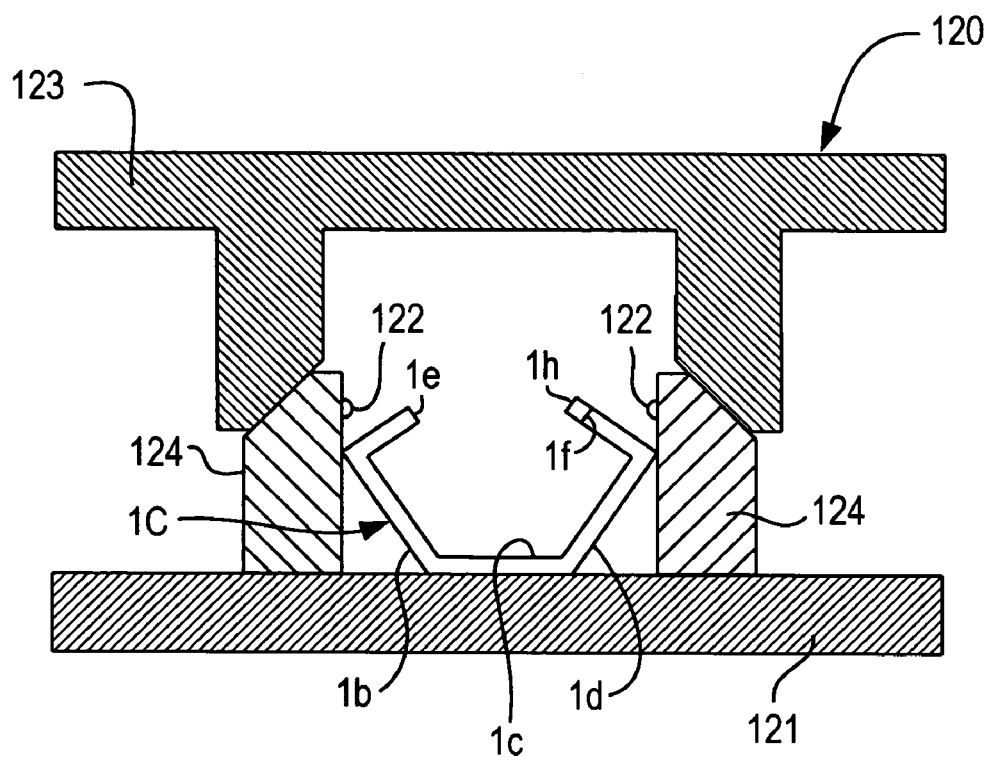

After the aforementioned second processed piece 1C is formed, the second processed piece 1C is set in the lower mold 121 of the press machine 120, as shown in FIG. 22(A).

Figure 22B:
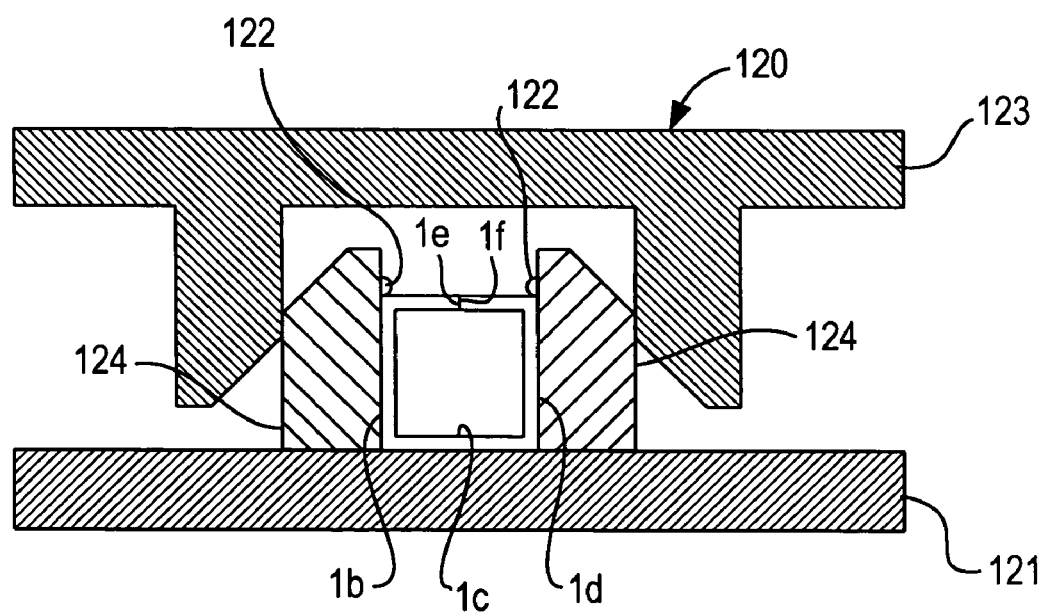
FIG. 22(B) is a cross-sectional view of the press machine when the forming process of the pipe body is completed.

In that state, as shown in FIG. 22(B), the upper mold 123 goes down, and the pressing members 124 of the lower mold 121 approach each other, so that the edge sections 1e, 1f approach each other.

Then, the connecting portion of the plane 1a and the plane 1b and the connecting portion of the plane 1a and the plane 1d contact with the pressing projection 122 projected from the lower mold 121, so that the plane 1c is not floated from the lower mold 121. At the same time, while the female engagement section 1g and the male engagement section 1h are engaged with each other, the front end of the male engagement section 1h is deformed by the projection 1i. This deformation makes parts of the male engagement section 1h intensively contact with both edge sections of the female engagement section 1g (refer to FIG. 1(C)), and as a result, the female engagement section 1g and the male engagement section 1h are engaged with each other to maintain the close contact of the edge sections 1e, 1f. Also, because this engagement absorbs the spring back having a direction that the edge sections 1e, 1f are separated from each other, the forming of the pipe body 1 in which the edge sections 1e, 1f closely contact with each other is possible.

(Forming Method 2)

Figure 23A:
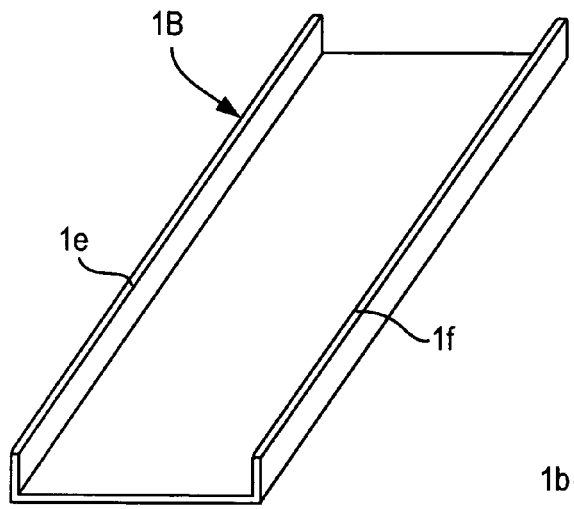
FIG. 23(A) is a perspective view of a first processed piece.

As shown in FIG. 23(A), the vicinity of the edge sections 1e, 1f of the sheet metal 1A are bent (the bent positions are the lines P1, P2) in the same direction along the edge sections 1e, 1f by means of the known press machine, to be set upright (in case of a rectangular prism, the angle of the plane 1a and the plane 1b and the angle of the plane 1a and the plane 1d are 90°), so that a first processed piece 1B is obtained.

Figure 23B:
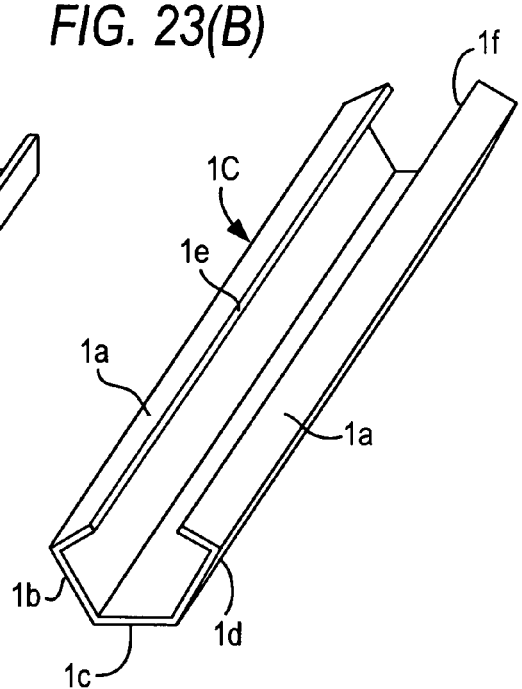
FIG. 23(B) is a perspective view of a second processed piece.

As shown in FIG. 23(B), the inner sides of the bent positions to be the plane 1a are further bent (the bent positions are the line P3, P4) along the edge sections 1e, 1f by means of the known press machine, so that the edge sections 1e, 1f are opposite to each other in the separated state. Thus, a second processed piece 1C is obtained. At that time, the gap between the edge sections 1e, 1f is set to be greater than the width of the plane 1c, so that the mold of the press machine and the second processed piece 1C can be separated easily.

Figure 24A:
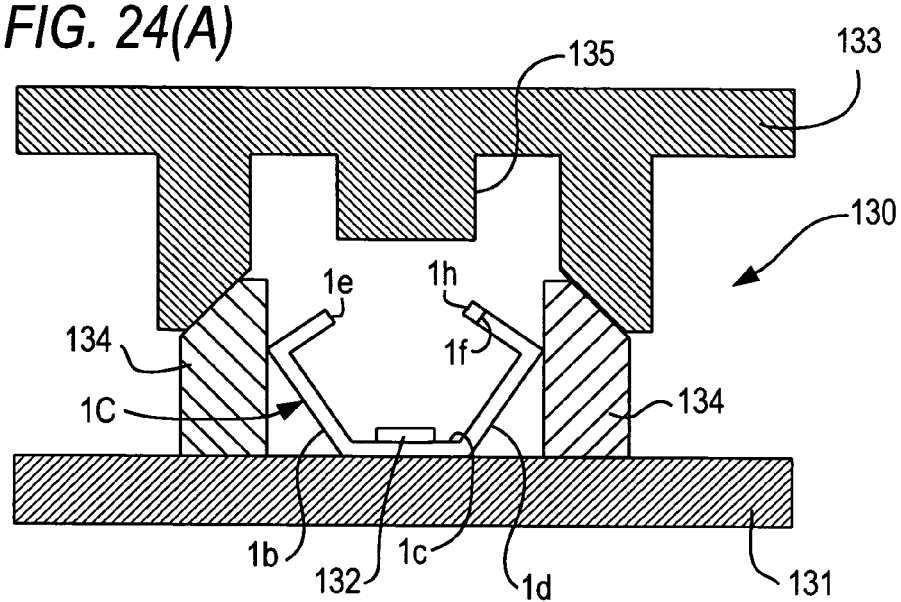
FIG. 24(A) is a cross-sectional view of a press machine when the second processed piece is set.

Then, as shown in FIG. 24(A), the second processed piece 1C is set in a press machine 130. At that time, the plane 1c of the second processed piece 1C is fixed by means of a pushing member 132 provided at a lower mold 131.

Figure 24B:
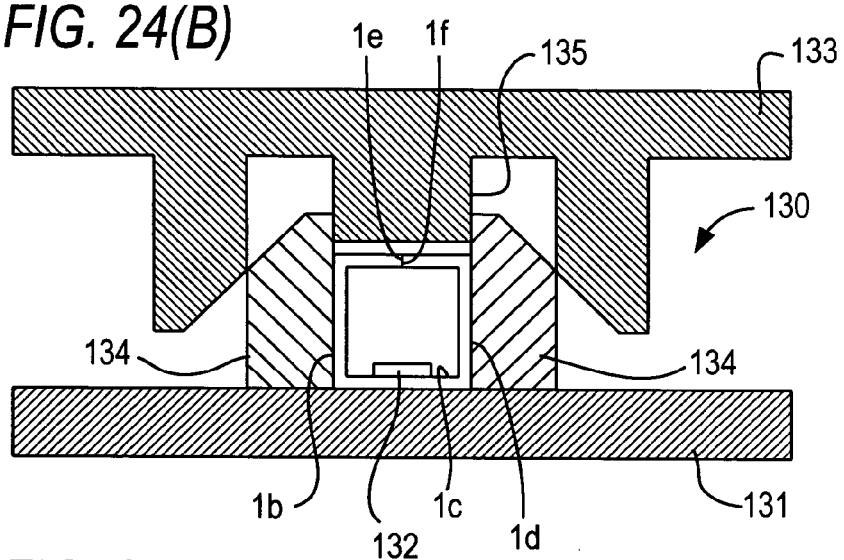
FIG. 24(B) is a cross-sectional view of the press machine when the third processed piece is formed.

In that state, as shown in FIG. 24(B), an upper mold 133 goes down, and the pressing members 134 of the lower mold 131 approach each other. Accordingly, the edge sections 1e, 1f approach each other.

Figure 23C:
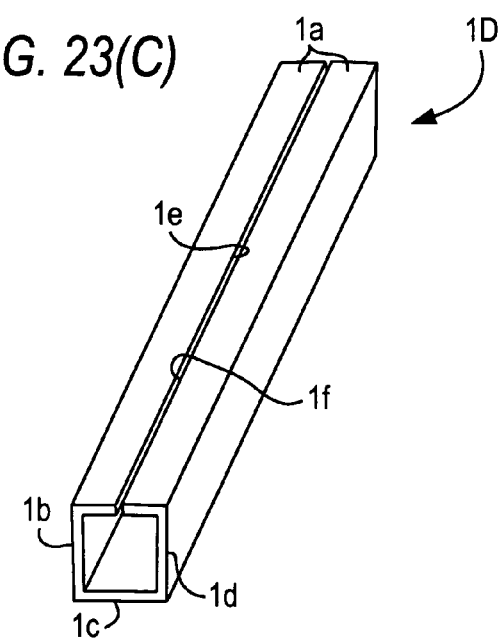
FIG. 23(C) is a perspective view of a third processed piece.
Figure 23D:
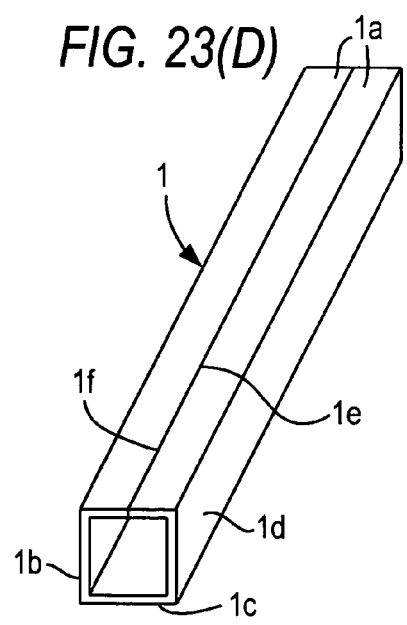
FIG. 23(D) is a perspective view of the pipe body.

Then, while the female engagement section 1g and the male engagement section 1h get to be engaged with each other, the front end of the male engagement section 1h is deformed by means of the projection 1i. This deformation make parts of the male engagement section 1h intensively contact with both edge sections of the female engagement section 1g (refer to FIG. 1(C)), and as a result, a third processed piece 1D can be obtained, in which the female engagement section 1g and the male engagement section 1h are engaged with each other to maintain the close contact of the edge sections 1e, 1f as shown in FIG. 23(C).

Figure 24C:
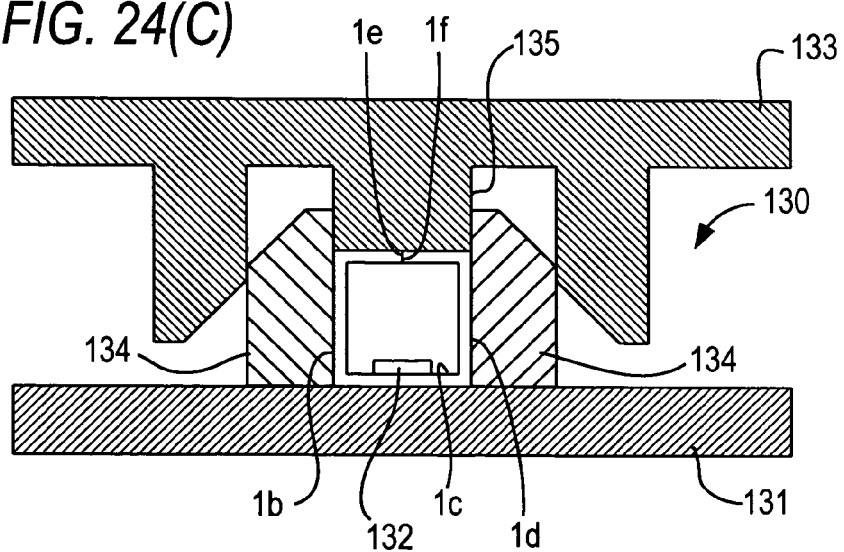
FIG. 24(C) is a cross-sectional view of the press machine when the forming process of the pipe body is completed.

Then, as shown in FIG. 24(C), in that state, an upper mold 133 further goes down. At that time, with approach positions of the pressing members 134 of the lower mold 131 fixed, a press member 135 of the upper mold 133 processes the third processed piece 1D in a direction perpendicular to the pressing direction of the pressing members 134.

Because the direction of such pressing is perpendicular to the pressing direction of the pressing members 134, restoration of the planes 1a–1d can be accomplished. Also, because such pressing generates a spring back in a direction opposite to the direction of the spring back generated by the engagement of the female engagement section 1g and the male engagement section 1h, both spring backs are cancelled. Therefore, the pipe body 1 in which the edge sections 1e, 1f is in almost complete contact with each other can be obtained.

In the aforementioned third processed piece 1D, a spring back occurs between the female engagement section 1g and the male engagement section 1h, so that a fine gap is generated between the edge sections 1e, 1f. Therefore, the explanation may be considered to be different from that of the forming method 1. However, it is for coping with a possibility that the gap is generated according to the conditions such as the shape or the size of the female engagement section 1g and the male engagement section 1h and the quality or the thickness of the sheet metal 1A. Also, the third processed pieces 1D is not the final processed piece but an interim piece. It is of course that the pressing of the pressing members 134 should not cause deformation (distortion) of the pipe body 1, in order to obtain the above advantages. The intensity of the pressing is set according to the above conditions such as the thickness of the sheet metal 1A.

(Forming Method 3)

Figure 25A:
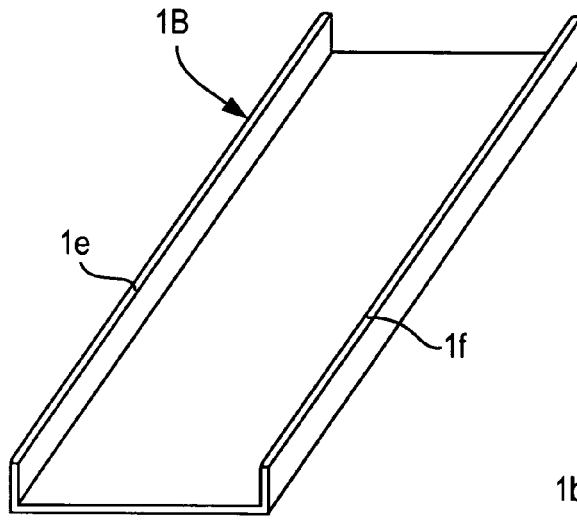
FIG. 25(A) is a perspective view of a first processed piece.

As shown in FIG. 25(A), the vicinity of the edge sections 1e, 1f of the sheet metal 1A are bent (the bent positions are the lines P1, P2) in the same direction along the edge sections 1e, 1f by means of the known press machine, to be set upright (in case of a rectangular prism, the angle of the plane 1a and the plane 1b and the angle of the plane 1a and the plane 1d are 90°), so that a first processed piece 1B is obtained.

Figure 25B:
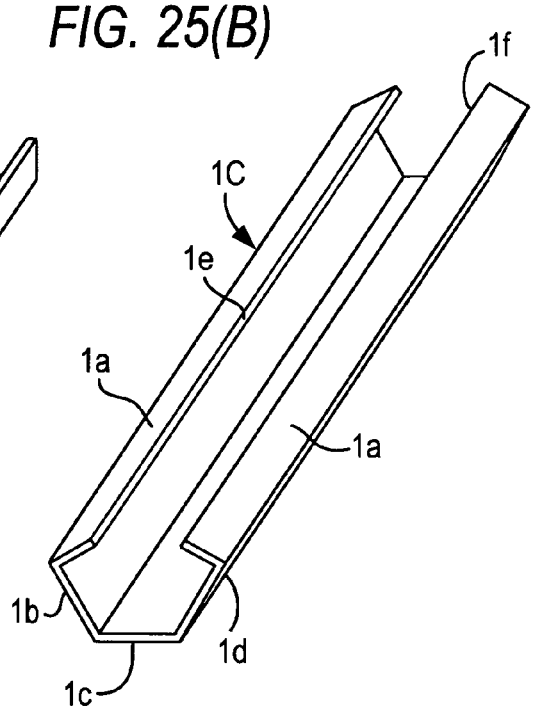
FIG. 25(B) is a perspective view of a second processed piece.

As shown in FIG. 25(B), the inner sides of the bent positions to be the plane 1a are further bent (the bent positions are the line P3, P4) along the edge sections 1e, 1f by means of the known press machine, so that the edge sections 1e, 1f are opposite to each other in the separated state. Thus, a second processed piece 1C is obtained. At that time, the gap between the edge sections 1e, 1f is set to be greater than the width of the plane 1c, so that the mold of the press machine and the second processed piece 1C can be separated easily.

Figure 26A:
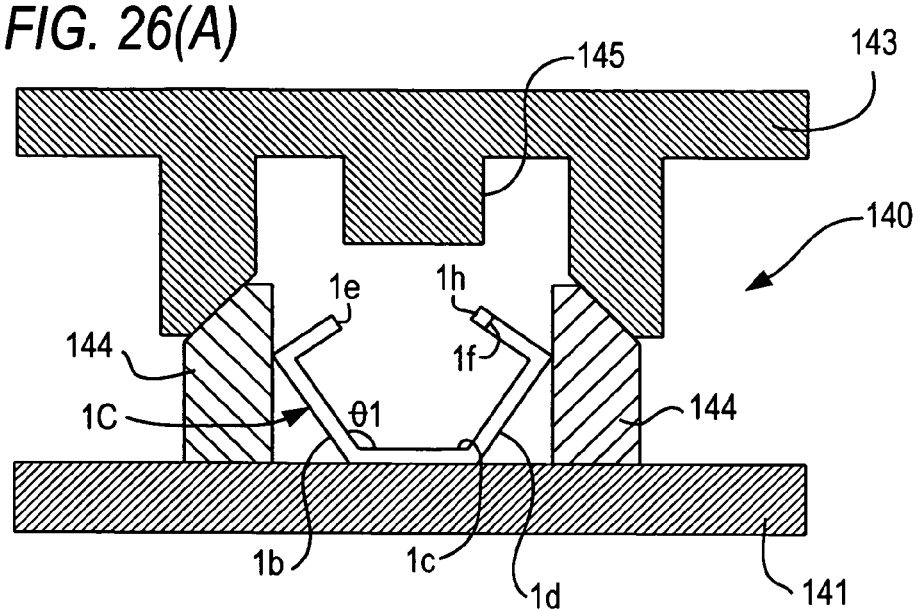
FIG. 26(A) is a cross-sectional view of a press machine when the second processed piece is set.

Then, as shown in FIG. 26(A), the second processed piece 1C is set in a lower mold 141 of the press machine 140.

Figure 26B:
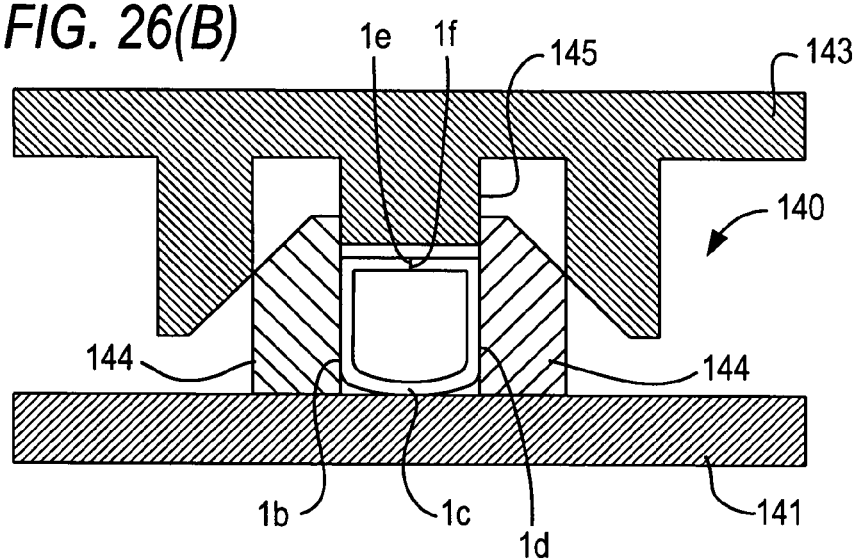
FIG. 26(B) is a cross-sectional view of the press machine when the third processed piece is formed.

In that state, as shown in FIG. 26(B), the upper mold 143 goes down and the pressing members 144 of the lower mold 141 approach each other. Accordingly, the edge sections 1e, 1f approach each other, and at the same time, the plane 1c is curved in a projected direction. This curving is made by means of movement of the pressing members 144 to each other, in a state that the plane 1c is not fixed unlike the forming methods 1 and 2 and the angle θ1 between the plane 1b and the plane 1c in the second processed piece 1C is set to be an obtuse angle greater than the angle at a substantially 90° in completion of the pipe body 1 as the forming methods 1 and 2.

Figure 25C:
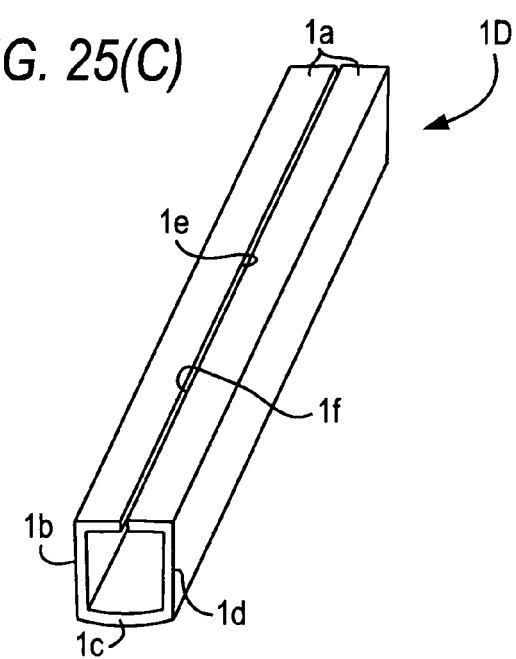
FIG. 25(C) is a perspective view of a third processed piece.

Then, while the female engagement section 1g and the male engagement section 1h get to be engaged with each other by means of pressing of the pressing members 144, the front end of the male engagement section 1h is deformed by means of the projection 1i. This deformation make parts of the male engagement section 1h intensively contact with both edge sections of the female engagement section 1g (refer to FIG. 1(C)), and as a result, a third processed piece 1D' can be obtained, in which the female engagement section 1g and the male engagement section 1h are engaged with each other to maintain the close contact of the edge sections 1e, 1f and the plane 1c is curved in the projected direction, as shown in FIG. 25(C).

Figure 26C:
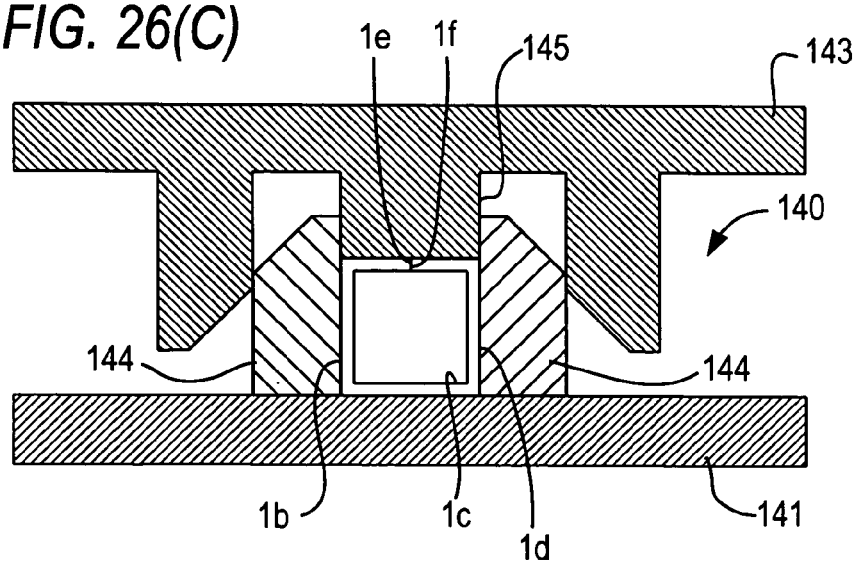
FIG. 26(C) is a cross-sectional view of the press machine when the forming process of the pipe body is completed.

Then, as shown in FIG. 26(C), in that state, the upper mold 143 further goes down. At that time, with approach positions of the pressing members 144 of the lower mold 141 fixed, the pressing member 145 of the upper mold 143 process the third processed piece 1D' in a direction perpendicular to the pressing direction of the pressing members 144.

Figure 25D:
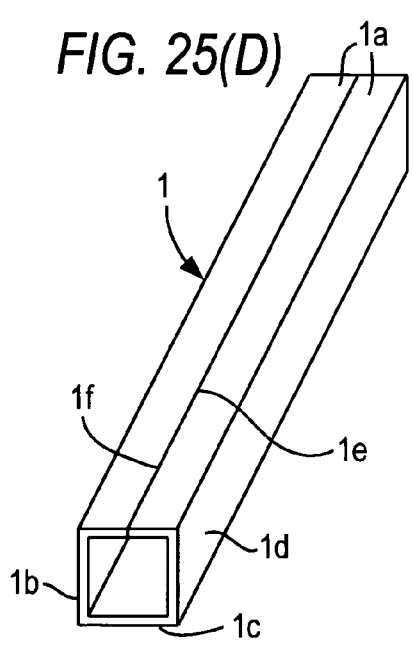
FIG. 25(D) is a perspective view of the pipe body.

Because such pressing direction of pressing member 145 is perpendicular to the pressing direction of the pressing members 144, the curved plane 1c can be spread, and restoration of the planes 1a–1d can be accomplished by means of the respective pressing members 144, 145. Also, because such pressing generates a spring back in a direction in which the plane 1c is convex and the spring back acts in the direction opposite to the direction of the spring back generated in engaging portion of the female engagement section 1g and the male engagement section 1h, both spring backs are cancelled. Therefore, as shown in FIG. 25(D), the pipe body 1 in which the edge sections 1e, 1f is in almost complete contact with each other and in which the plane qualities of the respective planes 1a–1d are maintained can be obtained.

(Modified Example of the Forming Method 3)

Figure 27A:
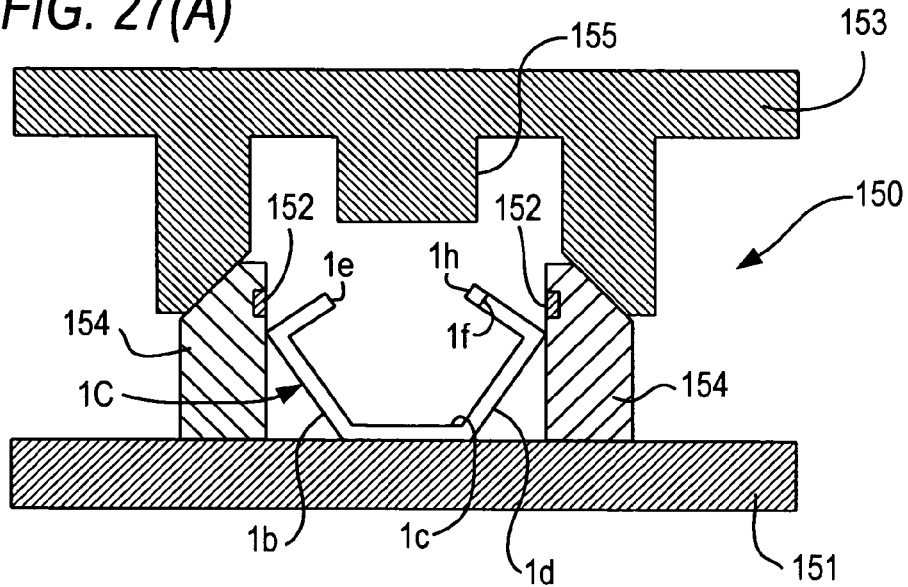
FIG. 27(A) is a cross-sectional view of a press machine when the second processed piece is set.

After the aforementioned second processed piece 1C is formed, the second processed piece 1C is set in the lower mold 151 of the press machine 150, as shown in FIG. 27(A).

Figure 27B:
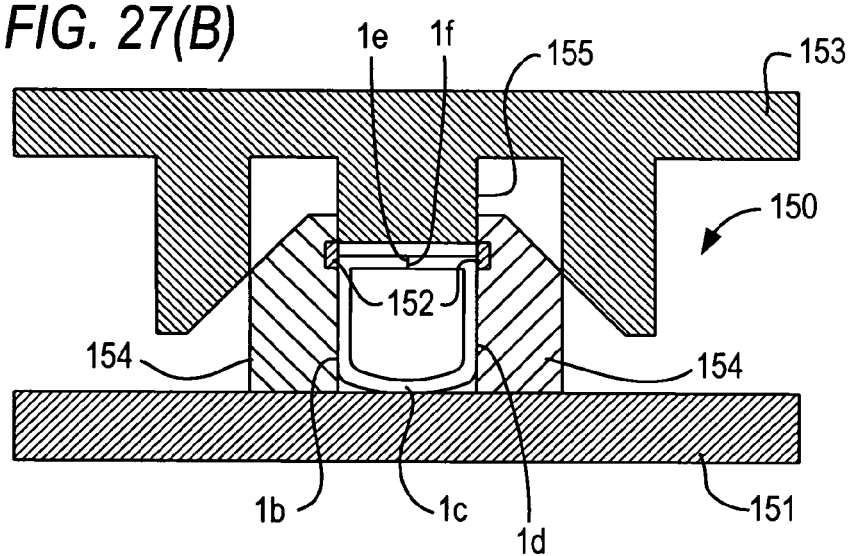
FIG. 27(B) is a cross-sectional view of the press machine when the third processed piece is formed.

In that state, as shown in FIG. 27(B), the upper mold 153 goes down, and the pressing members 154 of the lower mold 151 approach each other, so that the edge sections 1e, 1f approach each other and the plane 1c is curved in the convex direction.

This curving is made by means of movement of the pressing members 154 to each other, in a state that the plane 1c is not fixed unlike the forming method 1 and 2 and the angle θ1 between the plane 1b and the plane 1c in the second processed piece 1C is set to be an obtuse angle.

Also, by means of the pressing of the pressing members 154, while the female engagement section 1g and the male engagement section 1h are engaged with each other, the front end of the male engagement section 1h is deformed by the projection 1i. This deformation make parts of the male engagement section 1h intensively contact with both edge sections of the female engagement section 1g (refer to FIG. 1(C)), and as a result, a third processed piece 1D' can be obtained, in which the female engagement section 1g and the male engagement section 1h are engaged with each other to maintain the close contact of the edge sections 1e, 1f and the plane 1c is curved in the convex direction, as shown in FIG. 27(C).

At that time, by means of the friction-resistant type of the pushing members 152 that is provided at the lower mold 151 and slides with the angle parts formed by the plane 1a, the plane 1b and the plane 1d, the floating amount of the plane 1c from the lower mold 151 is controlled. The pushing members 152 can be applied to forming methods other than the modified example of the forming method 1, by setting the resistive fore thereof.

Figure 27C:
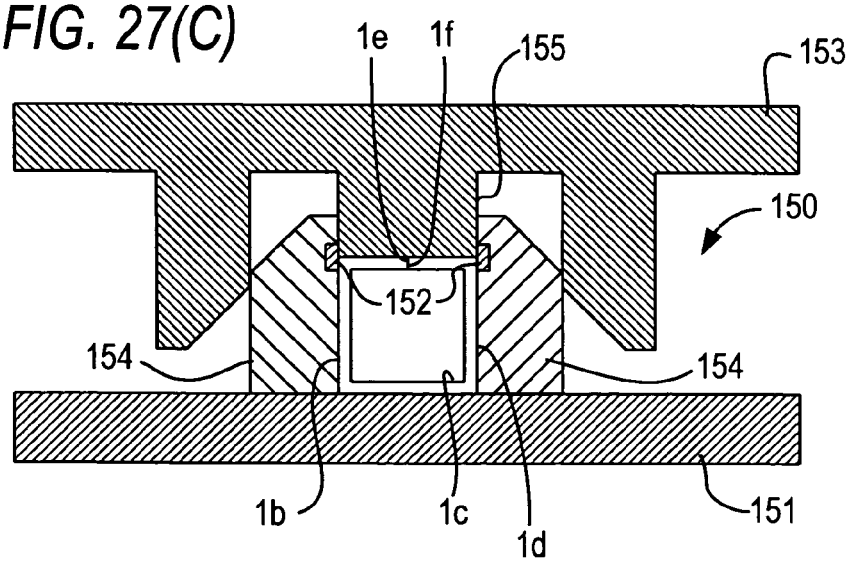
FIG. 27(C) is a cross-sectional view of the press machine when the forming process of the pipe body is completed.

Then, as shown in FIG. 27(C), in that state, the upper mold 153 further goes down. At that time, with approach positions of the pressing members 154 of the lower mold 151 fixed, the press member 155 of the upper mold 153 processes the third processed piece 1D' in a direction perpendicular to the pressing direction of the pressing members 154.

Because such pressing direction is perpendicular to the pressing direction of the pressing members 154, the curved plane 1c can be spread and then, restoration of the planes 1a–1d can be accomplished. Also, because such pressing generates a spring back in a direction in which the plane 1c is convex, and the spring back acts in the direction opposite to the direction of the spring back generated in engaging portion of the female engagement section 1g and the male engagement section 1h, both spring backs are cancelled. Therefore, as shown in FIG. 27(D), the pipe body 1 in which the edge sections 1e, 1f is in almost complete contact with each other can be obtained.

(Forming Method 4)

Figure 28A:
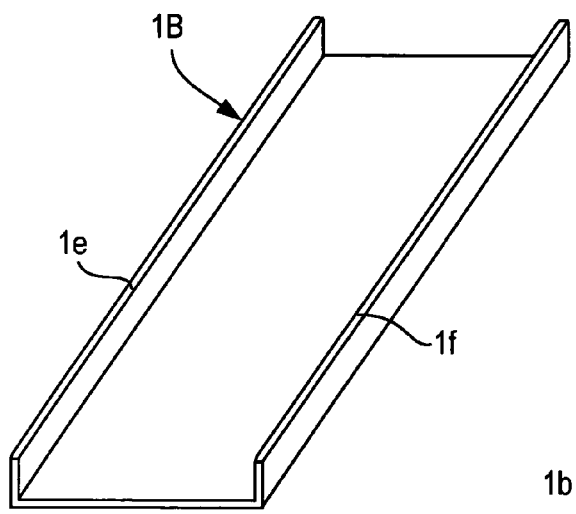
FIG. 28(A) is a perspective view of a first processed piece.

As shown in FIG. 28(A), the vicinity of the edge sections 1e, 1f of the sheet metal 1A are bent (the bent positions are the lines P1, P2) in the same direction along the edge sections 1e, 1f by means of the known press machine, to be set upright (in case of a rectangular prism, the angle of the plane 1a and the plane 1b and the angle of the plane 1a and the plane 1d are 90°), so that a first processed piece 1B is obtained.

Figure 28B:
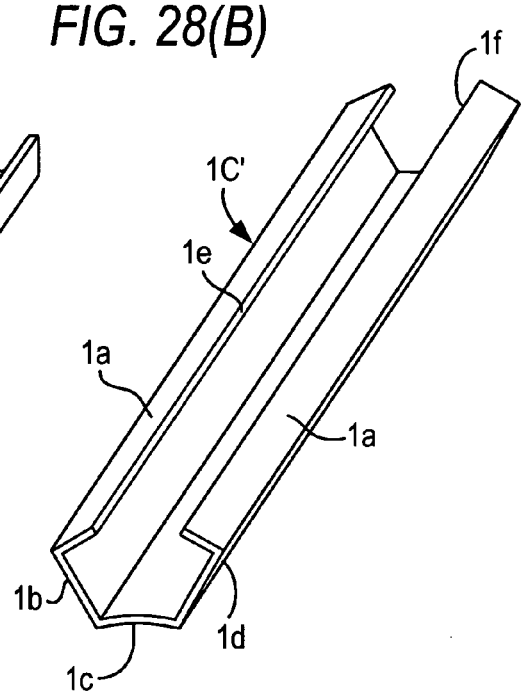
FIG. 28(B) is a perspective view of a second processed piece.

As shown in FIG. 28(B), the inner sides of the bent positions to be the plane 1a are further bent (the bent positions are the line P3, P4) along the edge sections 1e, 1f by means of the known press machine, so that the edge sections 1e, 1f are opposite to each other in the separated state. At the same time, a second processed piece 1C' in which the plane 1c is curved in the concave direction can be obtained. At that time, the gap between the edge sections 1e, 1f is set to be greater than the width of the plane 1c, so that the mold of the press machine and the second processed piece 1C' can be separated easily. Also, in curving the plane 1c, the angle θ2 between the plane 1b and the plane 1c and between the plane 1d and the plane 1c is set to be an almost right angle.

Then, as shown in FIG. 29(A), the second processed piece 1C' is set in a lower mold 161 of a press machine 160.

In that state, as shown in FIG. 29(B), an upper mold 163 goes down, and the pressing members 164 of the lower mold 161 approach each other. Accordingly, the edge sections 1e, 1f approach each other.

Figure 28C:
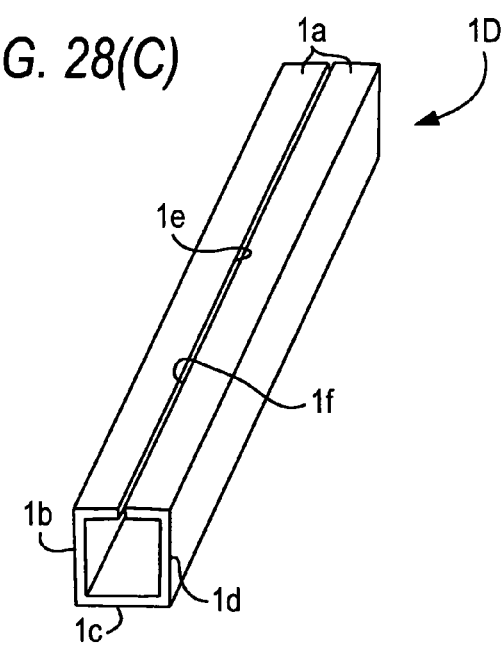
FIG. 28(C) is a perspective view of a third processed piece.

Also, while the female engagement section 1g and the male engagement section 1h get to be engaged with each other by means of the pressing of the pressing members 164, the front end of the male engagement section 1h is deformed by means of the projection 1i. This deformation make parts of the male engagement section 1h intensively contact with both edge sections of the female engagement section 1g (refer to FIG. 1(C)), and as a result, a third processed piece 1D can be obtained, in which the female engagement section 1g and the male engagement section 1h are engaged with each other to maintain the close contact of the edge sections 1e, 1f, as shown in FIG. 28(C).

Then, as shown in FIG. 29(C), in that state, the upper mold 163 further goes down. At that time, with approach positions of the pressing members 164 fixed, the press member 165 of the upper mold 163 presses the third processed piece 1D in a direction perpendicular to the pressing direction of the pressing members 164.

Figure 28D:
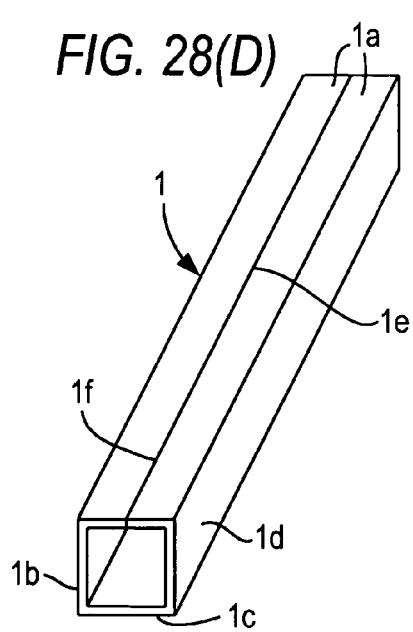
FIG. 28(D) is a perspective view of the pipe body.

Because such pressing direction is perpendicular to the pressing direction of the pressing members 164, the plane 1c is spread, and restoration of the planes 1a–1d can be accomplished. Also, because such pressing generates a spring back in a direction in which the plane 1c is projected again from the spread plane and the spring back acts in the direction opposite to the direction of the spring back generated in engaging portion of the female engagement section 1g and the male engagement section 1h, both spring backs are cancelled. Therefore, as shown in FIG. 28(D), the pipe body 1 in which the edge sections 1e, 1f is in almost complete contact with each other can be obtained.

(Forming Method 5)

Figure 30A:
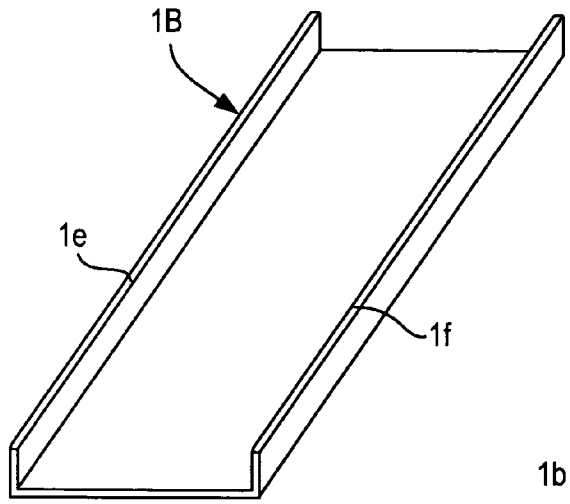
FIG. 30(A) is a perspective view of a first processed piece.

As shown in FIG. 30(A), the vicinity of the edge sections 1e, 1f of the sheet metal 1A are bent (the bent positions are the lines P1, P2) in the same direction along the edge sections 1e, 1f by means of the known press machine, to be set upright (in case of a rectangular prism, the angle of the plane 1a and the plane 1b and the angle of the plane 1a and the plane 1d are 90°), so that a first processed piece 1B is obtained.

Figure 30B:
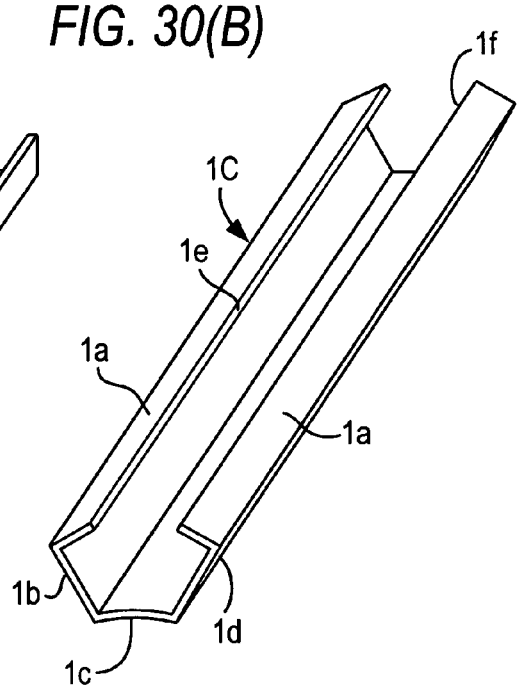
FIG. 30(B) is a perspective view of a second processed piece.

Then, as shown in FIG. 30(B), the inner sides of the bent positions to be the plane 1a are further bent (the bent positions are the line P3, P4) along the edge sections 1e, 1f by means of the known press machine, so that the edge sections 1e, 1f are opposite to each other in the separated state. At the same time, a second processed piece 1C" in which the plane 1c is curved in the concave direction can be obtained. At that time, the gap between the edge sections 1e, 1f is set to be greater than the width of the plane 1c, so that the mold of the press machine and the second processed piece 1C" can be separated easily. Also, in curving the plane 1c, the angle θ3 between the plane 1b and the plane 1c and between the plane 1d and the plane 1c is set to be an obtuse angle.

Figure 31A:
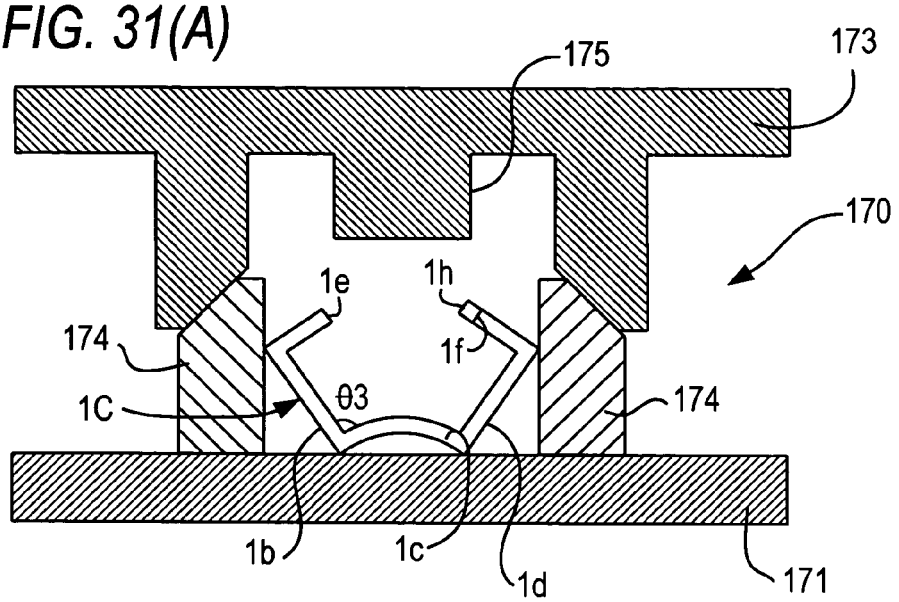
FIG. 31(A) is a cross-sectional view of a press machine when the second processed piece is set.

Then, as shown in FIG. 31(A), the second processed piece 1C" is set in a lower mold 171 of a press machine 170.

Figure 31B:
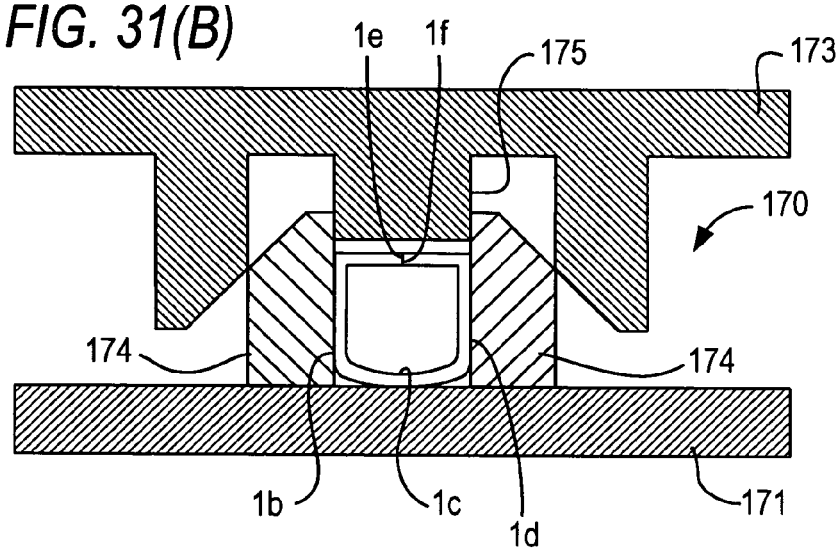
FIG. 31(B) is a cross-sectional view of the press machine when the third processed piece is formed.

In that state, as shown in FIG. 31(B), an upper mold 173 goes down and the pressing members 174 of the lower mold 171 approach each other. Accordingly, the edge sections 1e, 1f approach each other.

Figure 30C:
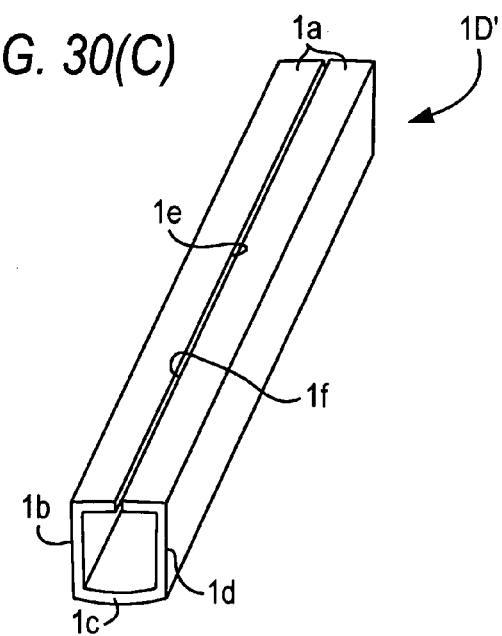
FIG. 30(C) is a perspective view of a third processed piece and FIG. 30(D) is a perspective view of the pipe body.
Figure 30D:
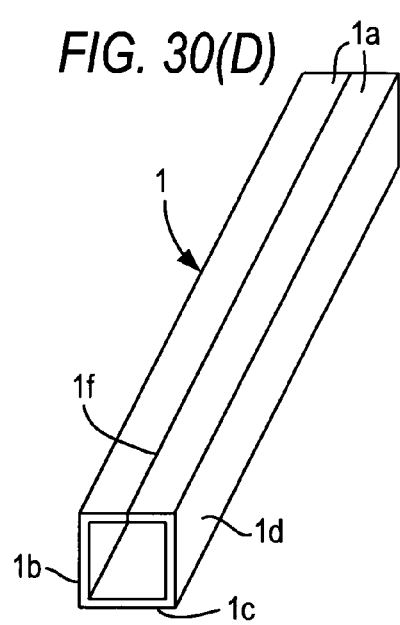

Also, while the female engagement section 1g and the male engagement section 1h get to be engaged with each other by means of the pressing of the pressing members 174, the front end of the male engagement section 1h is deformed by means of the projection 1i. This deformation make parts of the male engagement section 1h intensively contact with both edge sections of the female engagement section 1g (refer to FIG. 1(C)), and as a result, a third processed piece 1D' can be obtained, in which the female engagement section 1g and the male engagement section 1h are engaged with each other to maintain the close contact of the edge sections 1e, 1f and the plane 1c is curved in the concave direction, as shown in FIG. 30(C).

Figure 31C:
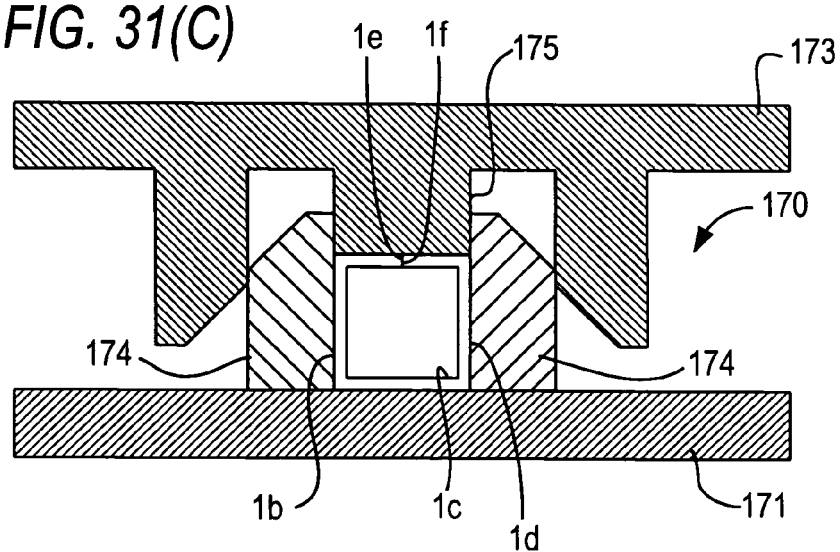
FIG. 31(C) is a cross-sectional view of the press machine when the forming process of the pipe body is completed.

Then, as shown in FIG. 31(C), in that state the upper mold 173 further goes down. At that time, with approach positions of the pressing members 174 of the lower mold 171 fixed, the press member 175 of the upper mold 173 presses the third processed piece 1D' in a direction perpendicular to the pressing direction of the pressing members 174.

Because such pressing direction is perpendicular to the pressing direction of the pressing members 174, the plane 1c is spread, and restoration of the planes 1a–1d can be accomplished. Also, because such pressing generates a spring back in a direction in which the plane 1c is projected again from the spread plane and the spring back acts in the direction opposite to the direction of the spring back generated in engaging portion of the female engagement section 1g and the male engagement section 1h, both spring backs are cancelled. Therefore, as shown in FIG. 31(D), the pipe body 1 in which the edge sections 1e, 1f is in almost complete contact with each other is obtained.

(Aspects of a Prism Pipe Body Other than Rectangular Prism)

Figure 32A:
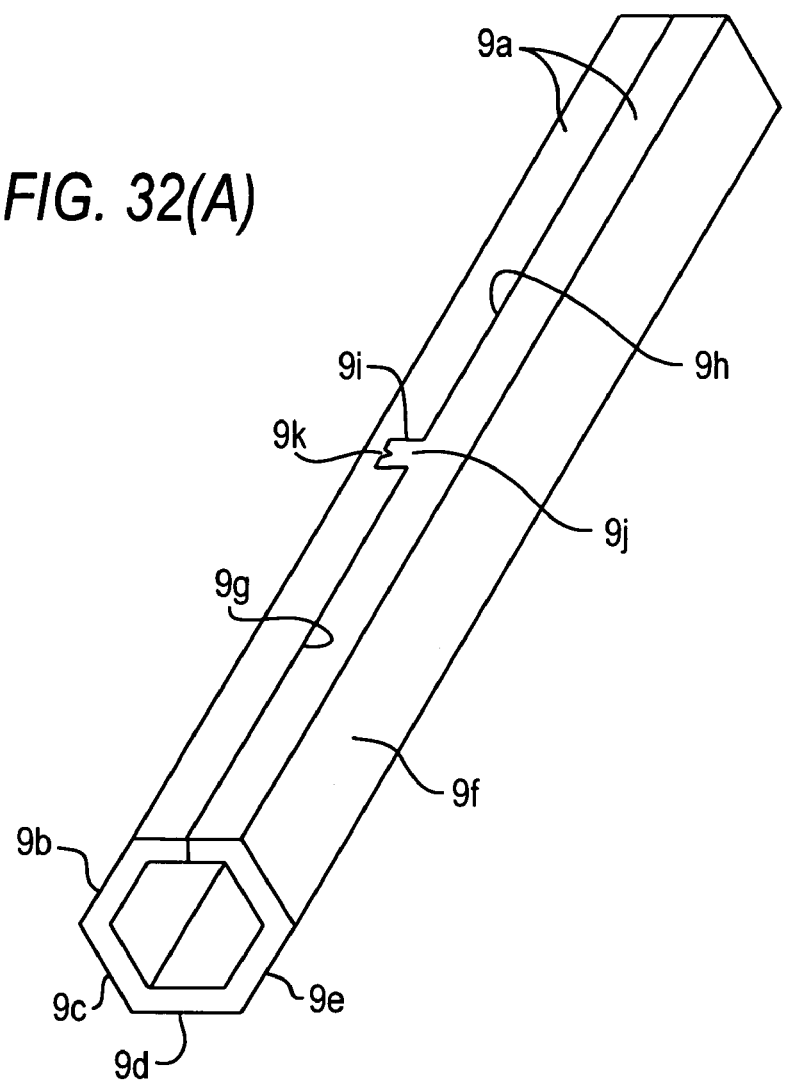
FIG. 32(A) is a perspective view of the exterior of the pipe body.
Figure 32B:
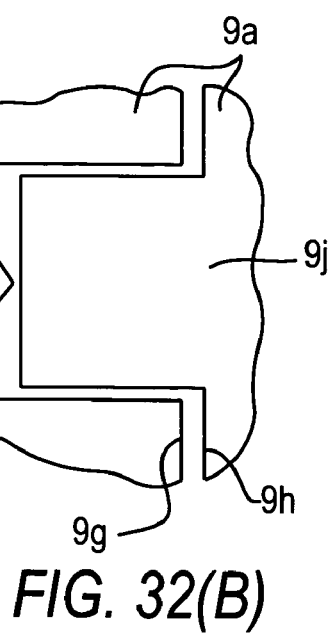
FIG. 32(B) is an enlarged view of a main part of the pipe body before completing forming the pipe body.
Figure 32C:
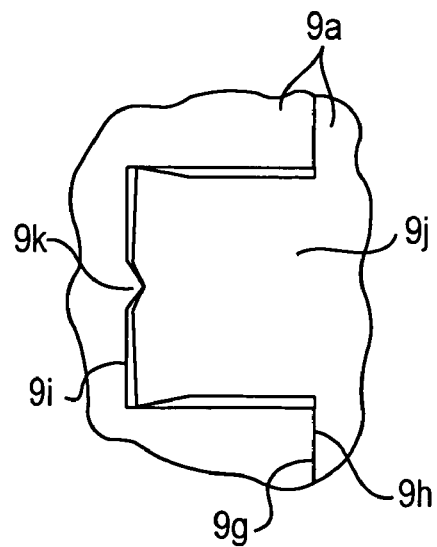
FIG. 32(C) is an enlarged view of the main part of the pipe body when completing forming the pipe body.
Figure 33:
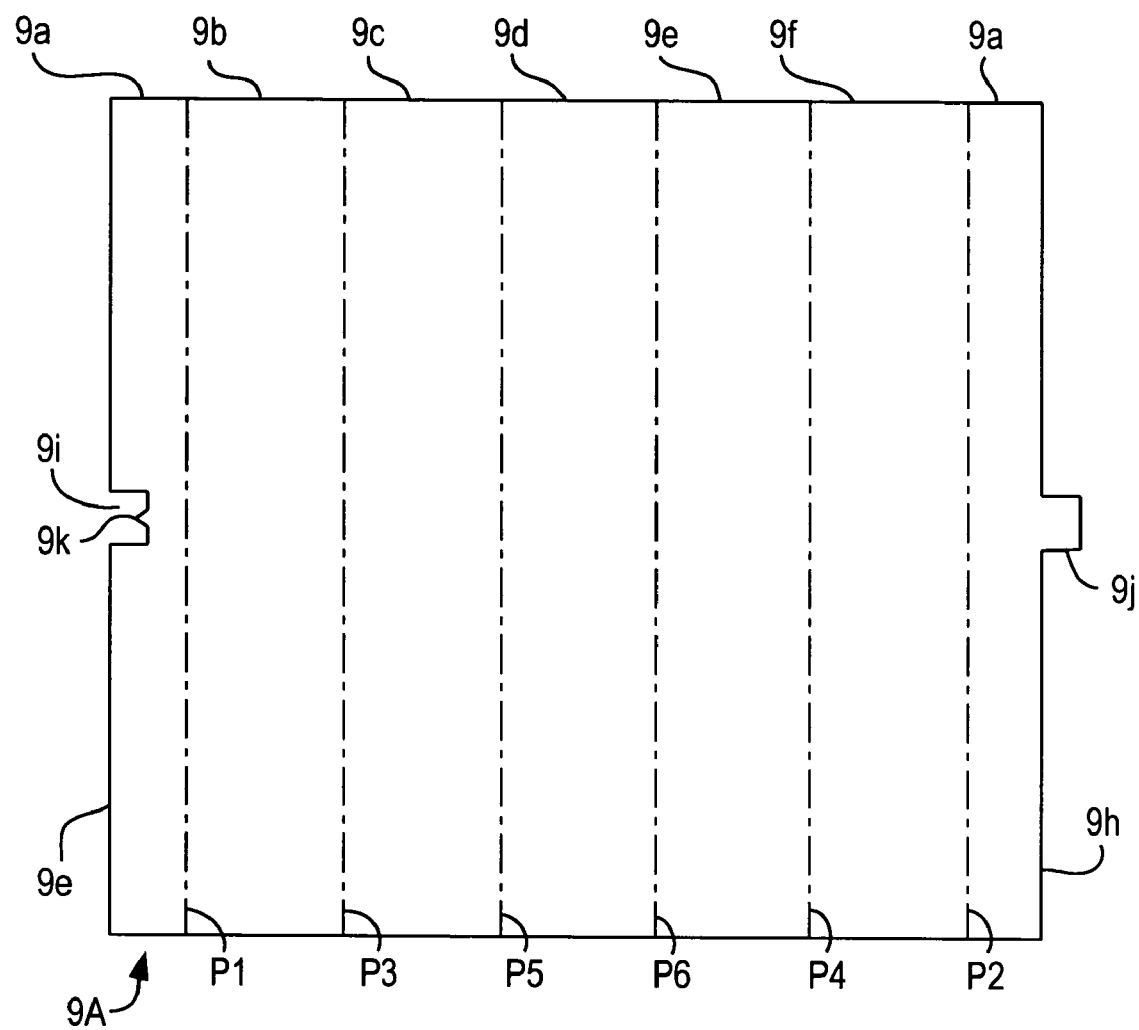
FIG. 33 is a plan view of a metal plate for the prism pipe body other than the rectangular prism according to the present invention.

FIG. 32 through FIG. 34 shows a hexagonal prism pipe body 9 as an example of a polygonal prism pipe body other than the above rectangular prism.

As shown in FIG. 32, the pipe body 9 has a hexagonal prism shape consisting of six planes 9a–9f. The plane 9a is formed jointly with the surroundings of the edge sections 9g, 9h, by way of contact of opposite edge sections 9g, 9h.

A female engagement section 9i and male engagement section 9j engaged with each other in the facing state are formed in the edge sections 9g, 9h, respectively. Also, at the center of the bottom edge section of the female engagement section 9i, a projection 9k having a mountain shape which is projected toward an open end is formed. As shown in FIG. 32(B) and FIG. 32(C), the structure and the operation of the female engagement section 9i, the male engagement section 9j and the projection 9k are equal to those of the female engagement section 1g, the male engagement section 1h and the projection 1i. Also, the constructions of the female engagement section 9i, the male engagement section 9j and the projection 9k may be equal to those of the female engagement section 2g, the male engagement section 2h and the projection 2i. Also, a metal plate having the same constructions as those of the above sheet metals 1A–6A can be used for forming the pipe body 9.

Here, explanation using a metal plate 9A shown in FIG. 33 will be described. First, the vicinity of the edge sections 9g, 9h of the sheet metal 9A are bent (the bent positions are the lines P1, P2) in the same direction along the edge sections 9g, 9h by means of the known press machine, to be set upright (in case of a hexagonal prism, the angle of the plane 9a and the plane 9b and the angle of the plane 9a and the plane 9f are 60°), so that a first processed piece is obtained.

Then, the inner sides of the bent positions to be the plane 9a are further bent (the bent positions are the line P3, P4, P5, P6) along the edge sections 9g, 9h sequentially by means of the known press machine, so that the edge sections 9g, 9h are opposite to each other in the separated state. Accordingly, a second processed piece 9C is obtained. At that time, the gap between the edge sections 9g, 9h is set to be greater than the width of the plane 9d, so that the mold of the press machine and the second processed piece 9C (refer to FIG. 34(A)) can be separated easily.

Figure 34A:
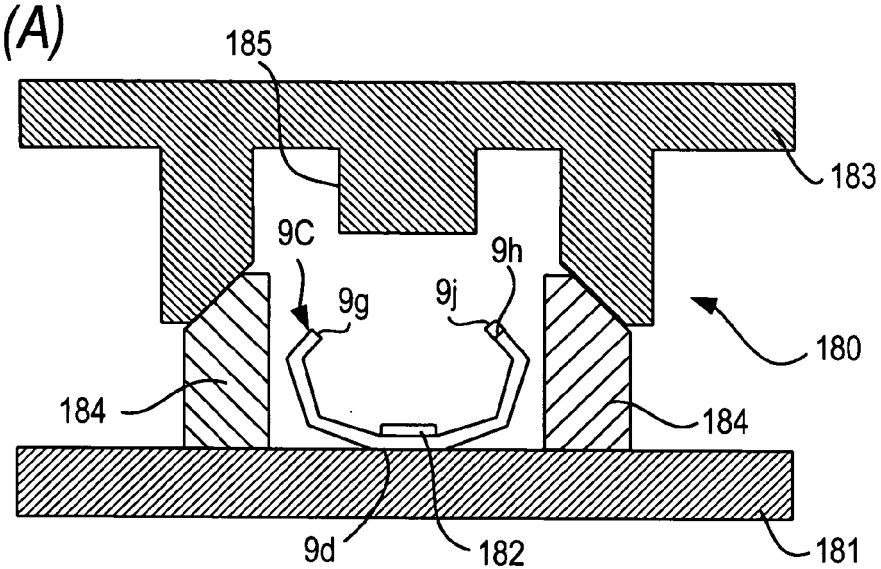
FIG. 34(A) is a cross-sectional view of a press machine when the second processed piece is set.

Then, as shown in FIG. 34(A), the second processed piece 9C is set in a lower mold 181 of a press machine 180. At that time, the plane 9d of the second processed piece 9C is fixed by a pushing member 182 provided at the lower mold 181.

Figure 34B:
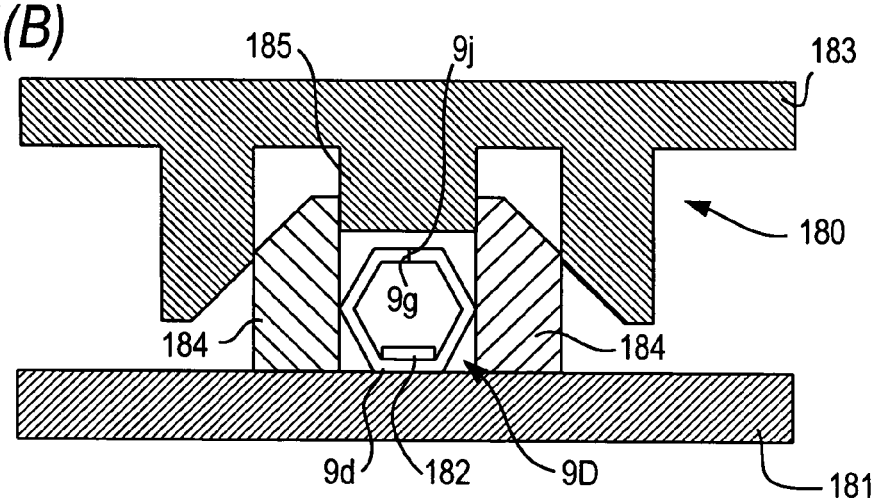
FIG. 34(B) is a cross-sectional view of the press machine when the third processed piece is formed.

In that state, as shown in FIG. 34(B), an upper mold 183 goes down and the pressing members 184 of the lower mold 181 approach each other. Accordingly, the edge sections 9g, 9h approach each other.

Then, while the female engagement section 9i and the male engagement section 9j get to be engaged with each other, the front end of the male engagement section 9j is deformed by means of the projection 9k. This deformation make parts of the male engagement section 91 intensively contact with both edge sections of the female engagement section 9i, and as a result, a third processed piece 9D can be obtained, in which the female engagement section 9i and the male engagement section 9j are engaged with each other to maintain the close contact of the edge sections 9g, 9h.

Figure 34C:
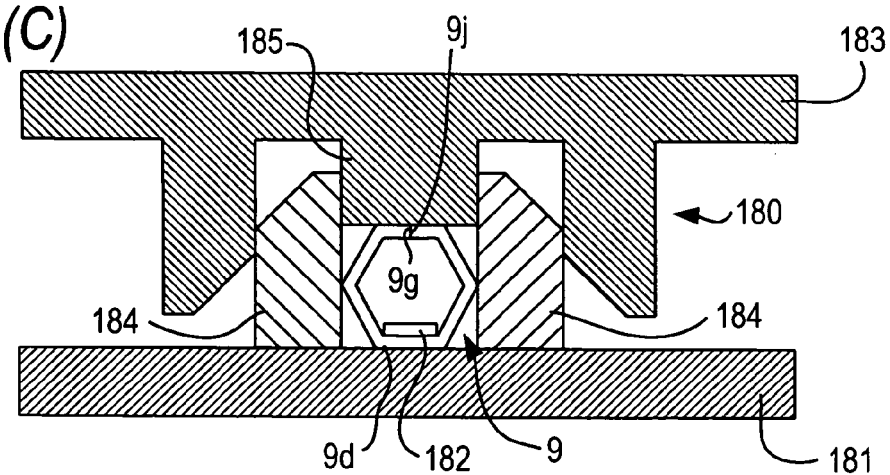
FIG. 34(C) is a cross-sectional view of the press machine when the forming process of the pipe body is completed.

Then, as shown in FIG. 34(C), in that state, the upper mold 183 further goes down. At that time, with positions of the pressing members 184 of the lower mold 181 fixed, the pressing member 185 of the upper mold 183 presses the third processed piece 9D in a direction perpendicular to the pressing direction of the pressing members 184.

Because such pressing direction is perpendicular to the pressing direction of the pressing members 184, restoration of the planes 9a–9f can be accomplished. Also, because such pressing generates a spring back in a opposite direction to the spring back generated in engaging portion of the female engagement section 9i and the male engagement section 9j, both spring backs are cancelled. Therefore, the pipe body 9 in which the edge sections 9g, 9h is in almost complete contact with each other can be obtained.

(Aspect of a Cylinder Pipe Body)

FIG. 35 through FIG. 37 shows a cylinder pipe body 10 as an example of a polygonal prism pipe body other than the above rectangular prism.

As shown in FIG. 35(A), the pipe body 10 has a cylinder shape consisting of one curved surface 10a. The surface 10a is formed jointly with the surroundings of the edge sections 10b, 10c, by way of contact of the opposite edge sections 10b, 10c.

Also, female engagement section 10d and male engagement section 10e engaged with each other in the facing state are formed in the edge sections 10b, 10c, respectively. Also, at the center of the bottom edge section of the female engagement section 10d, a projection 10f having a mountain shape that is projected toward an open end is formed. As shown in FIG. 35(B) and FIG. 35(C), the structure and the operation of the female engagement section 10d, the male engagement section 10e and the projection 10f are equal to those of the female engagement section 1g, the male engagement section 1h and the projection 1i. Also, the constructions of the female engagement section 10d, the male engagement section 10e and the projection 10f may be equal to those of the female engagement section 2g, the male engagement section 2h and the projection 2i. Also, a metal plate having the same structure as those of the above sheet metals 1A–6A can be used for forming the pipe body 10.

Here, explanation using a metal plate 10A shown in FIG. 36 will be described. First, the sheet metal 10A is curved by means of the known press machine to have an ellipse shape, in which the edge sections 10b, 10c are opposite to each other, thereby obtaining a first processed piece 10B as shown in FIG. 37(A).

Then, the first processed piece 10B is set in a lower mold 191 of a press machine 190. At that time, the lower side of the surface 10a is fixed by means of a pushing member 192 provided at the lower mold 191 of the press machine 190.

In that state, as shown in FIG. 37(B), an upper mold 193 goes down and the pressing members 194 of the lower mold 191 approach each other. Accordingly, the edge sections 10b, 10c approach each other.

Then, while the female engagement section 10d and the male engagement section 10e get to be engaged with each other, the front end of the male engagement section 10e is deformed by means of the projection 10f. This deformation make parts of the male engagement section 10e intensively contact with both ends of the female engagement section 10d, and as a result, the pipe body 10 can be obtained, in which the female engagement section 10d and the male engagement section 10e are engaged with each other to maintain the close contact of the edge sections 10b, 10c.

SECOND EMBODIMENT OF THE ENDS-CONTACT TYPE PIPE BODY (Fourth Aspect of the Pipe Body)

Figure 38A:
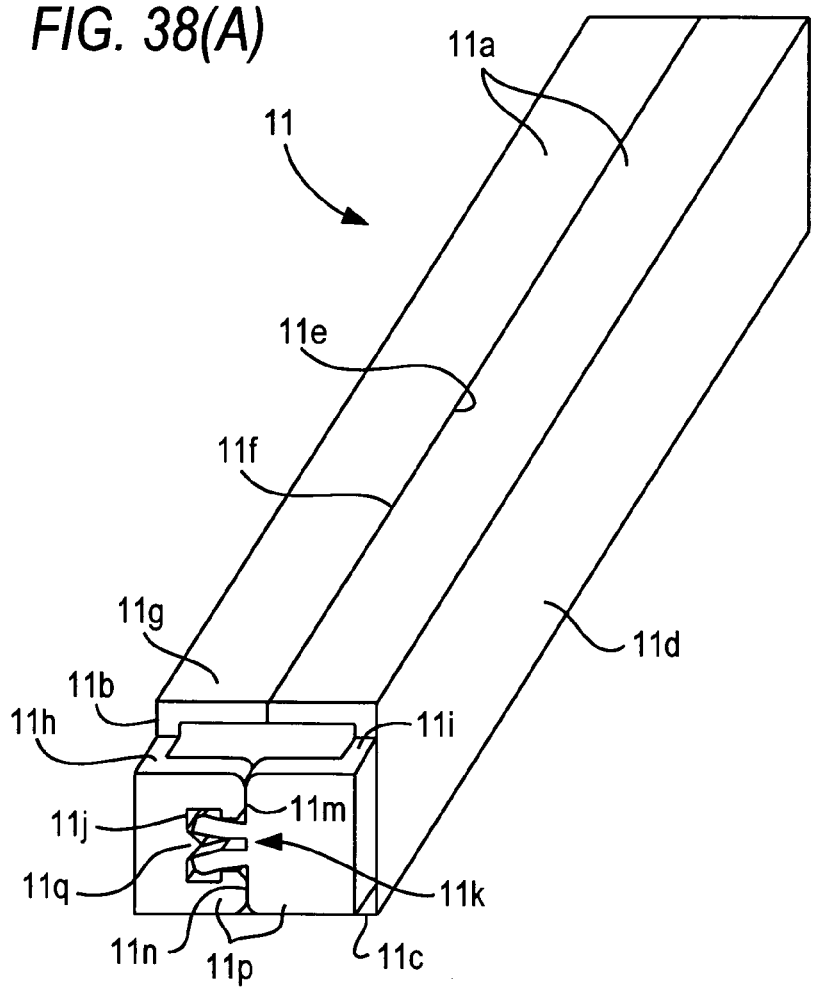
FIG. 38(A) is a perspective view of the exterior of the pipe body.

As shown in FIG. 38(A), 11 is a pipe body according to the fourth aspect of the present invention. The pipe body 11 has a rectangular prism shape consisting of four planes 11a, 11b, 11c, 11d. The plane 11a is formed jointly with the surroundings of the edge sections 11e, 11f, by way of contact of the parallel edge sections 11e, 11f opposite to each other.

Projected sections 11h, 11i capable of being opposite to each other are projected from an edge section 11g perpendicular to the parallel edge sections 11e, 11f.

Figure 38B:
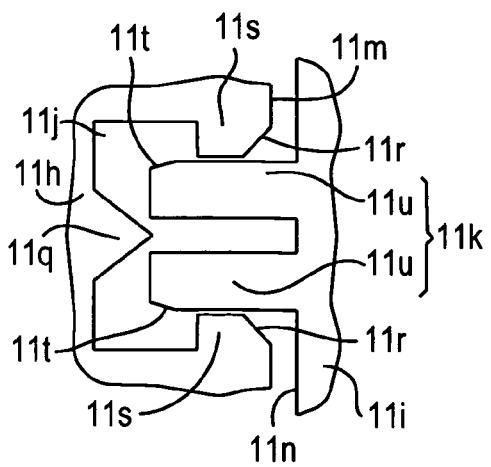
FIG. 38(B) is an enlarged view of a main part before completing forming the pipe body.

As shown in FIG. 38(B) which is an enlarged view of a main part before completing forming the pipe body 11, female engagement section 11j and male engagement section 11k engaged with each other in the facing state are formed in the projected sections 11h, 11i. Also, the projected sections 11h, 11i forms a supporting plane 11p jointly with the surroundings, with the edge sections 11m, 11n thereof in contact with each other.

At the center of the bottom edge section of the female engagement section 11j, a projection 11q having a mountain shape that is projected toward an open end is formed. Sloped guide sections 11r are formed at the open end side of the female engagement section 11j, to enlarge the diameter of the opening. Also, engaging walls 11s projected toward each other are formed at the female engagement section 11j, so that the diameter of the opening at the vicinity of the open end is smaller than that of the opening at the vicinity of the bottom of the female engagement section 11j.

Figure 38C:
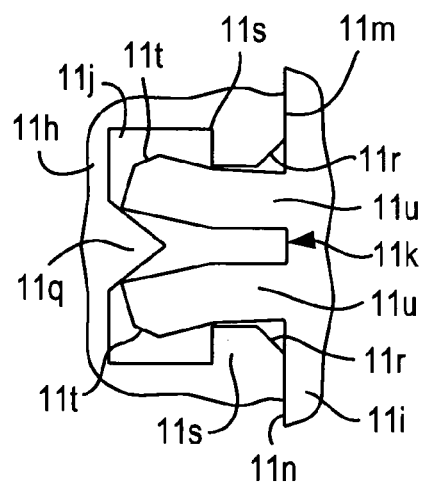
FIG. 38(C) is an enlarged view of the main part when completing forming the pipe body.

At the front end of the male engagement section 11k, the sloped guide sections 11t are formed, so that the width of the male engagement section thins toward the front end. The male engagement section 11k consists of a pair of divided pieces 11u in which the projected ends are divided to be guided by the projection 11q and to be bending-deformed in a direction distant from each other, as shown in FIG. 38(C) which is an enlarged view of the main part when completing forming the pipe body 11. The bending-deformation of the divided pieces 11u make parts thereof be in contact with the engaging walls 11s and thus, the female engagement section 11j and the male engagement section 11k are engaged with each other so that the edge sections 11m, 11n get in close contact with each other.

Figure 39:
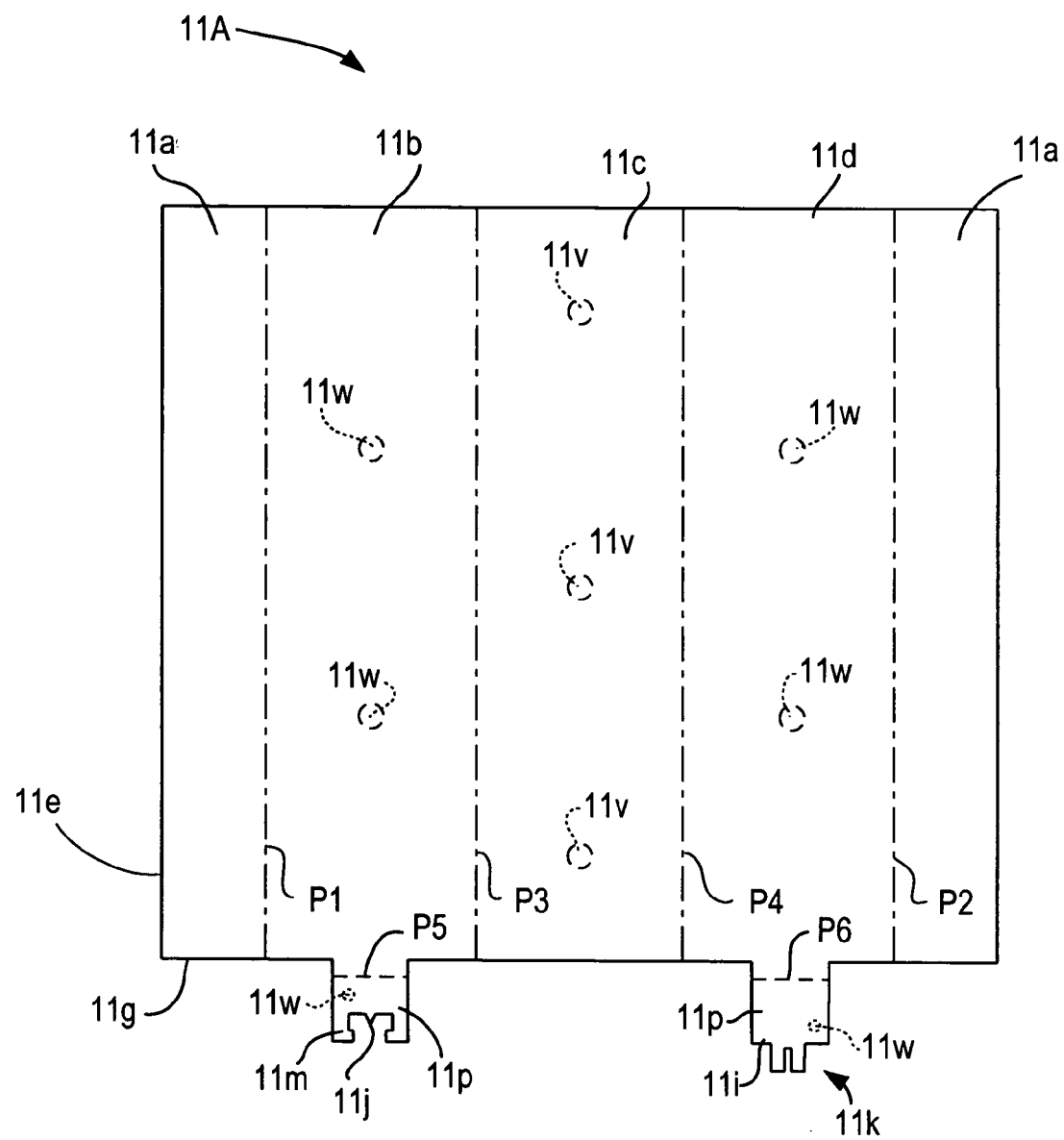
FIG. 39 is a plan view of a metal plate according to the fourth aspect of the present invention.

FIG. 39 shows a metal plate 11A for forming such pipe body 11. The sheet metal 11A is formed using a sheet shape of metal material as a source material by way of punching thereof. In FIG. 39, the same reference numerals given to elements of the pipe body 11 after forming are given to the corresponding elements, and explanation thereof will be omitted. Also, P1, P2, P3, P4 in FIG. 39 are lines representing positions to be bent by a press machine in order to form the planes 11a–11d, and P5, P6 are lines representing positions to be bent by the press machine in order to form the supporting plane 11p. The positions to be bent at the lines P1–P6 are designed in consideration of the amount of the sheet metal 11A to be expanded during press forming.

Also, holes 11v for fixation to a machine (mold) in the press processing to be explained later can be formed in, for example, the plane 11c of the sheet metal 11A. Also, screw holes 11w for fixation to the body panel of the duplicator or for fixation to parts can be formed in other planes 11b, 11d, 11p. The range for application thereof can be varied according to the purpose for use of the pipe body 11. At that time, the holes 11v may be used commonly as the screw holes and the holes for fixation to the mold. Also, the position or the number of the holes 11v, 11w is not limited, and may be formed even after forming the pipe body.

In forming the rectangular prism pipe body using such sheet metal 11A, the vicinity of the edge sections 11e, 11f of the sheet metal 11A are bent (the bent positions are the lines P1, P2) in the same direction along the edge sections 11e, 11f by means of the known press machine, to be set upright (in case of a rectangular prism, the angle of the plane 11a and the plane 11b and the angle of the plane 11a and the plane 11d are 90°), and at the same time, the projected sections 11h, 11i are bent (the bent positions are the lines P5, P6) in the same direction along the edge section 11g to be set upright (in case of a rectangular prism, the angle of the plane 11b and the plane 11p and the angle of the plane 11d and the plane 11p are 90°).

Figure 40A:
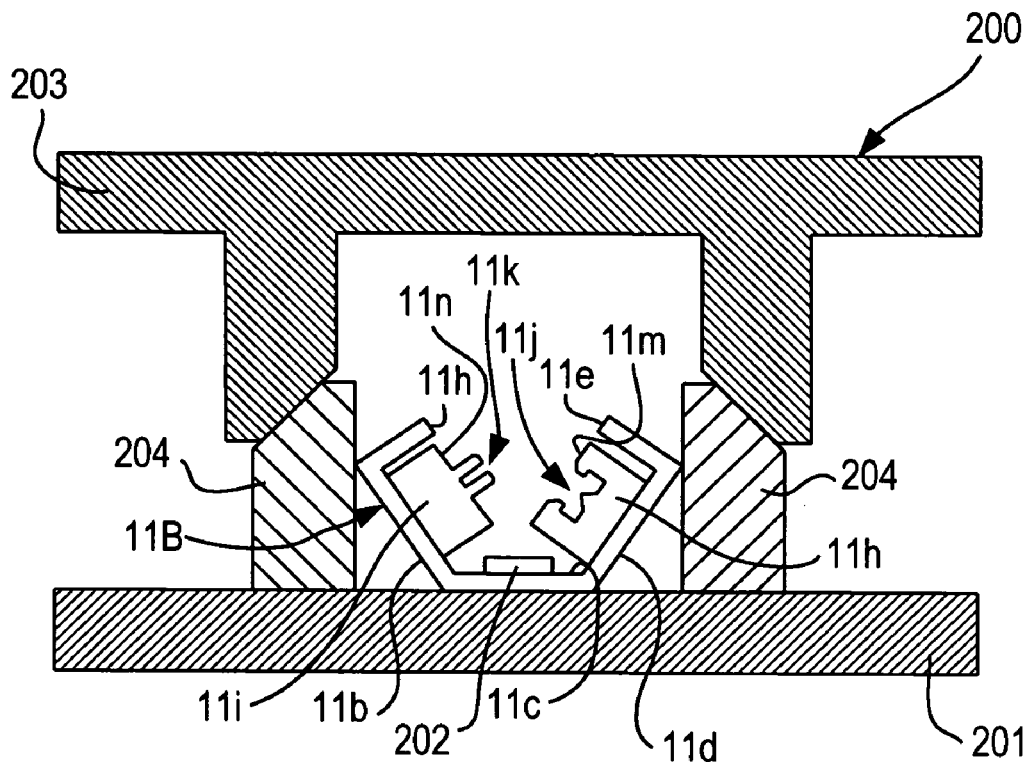
FIG. 40(A) is a cross-sectional view of a press machine when a first processed piece is set.

Then, the inner sides of the bent positions to be the plane 11a are further bent (the bent positions are the line P3, P4) along the edge sections 11e, 11f by means of the known press machine, so that the edge sections 11e, 11f are opposite to each other in the separated state. Accordingly, as shown in FIG. 40(A), a first processed piece 11B is obtained. At that time, the gap between the edge sections 11e, 11f is set to be greater than the width of the plane 11c, so that the mold of the press machine and the first processed piece 11B can be separated easily.

Then, as shown in FIG. 40(A), the first processed piece 11B is set in a lower mold 201 of a press machine 200. At that time, the plane 11c of the first processed piece 11B is fixed by means of a pushing member 202 provided at the lower mold 201.

Figure 40B:
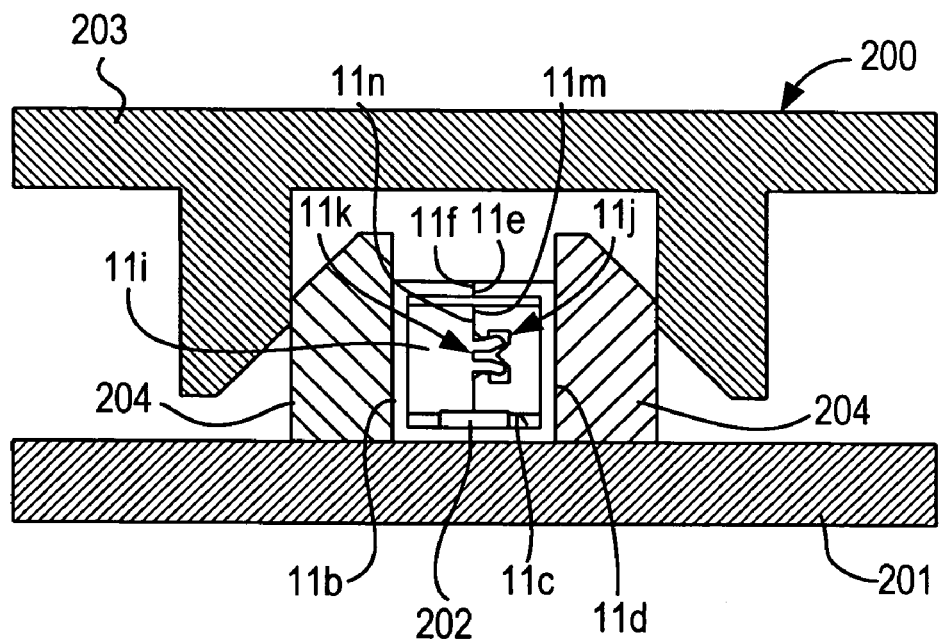
FIG. 40(B) is a cross-sectional view of the press machine when the forming process of the pipe body is completed.

In that state, as shown in FIG. 40(B), an upper mold 203 goes down, and the pressing members 204 of the lower mold 201 approach each other. Accordingly, the edge sections 11e, 11f and the edge sections 11m, 11n approach each other, respectively.

Then, while the female engagement section 11j and the male engagement section 11k get to be engaged with each other, the front ends of the divided pieces 11u are bending-deformed by means of the projection 11q to be separated from each other. This bending-deformation of the divided pieces 11u make parts thereof get in contact with engaging walls 11s, and the female engagement section 11j and the male engagement section 11k are engaged with each other to maintain the close contact of the edge sections 11m, 11n. At the same time, separation thereof is prevented. Also, the engagement absorbs the spring back in a direction in which the edge sections 11m, 11n and the edge sections 11e, 11f are separated from each other, respectively. Therefore, by way of matching the width of the supporting plane 11p with the width of the plane 11a, the pipe body 11 can be formed, in which the female engagement section 11j and the male engagement section 11k are engaged with each other and at the same time, the edge sections 11e, 11f of the plane 11a are in close contact with each other.

Figure 41A:
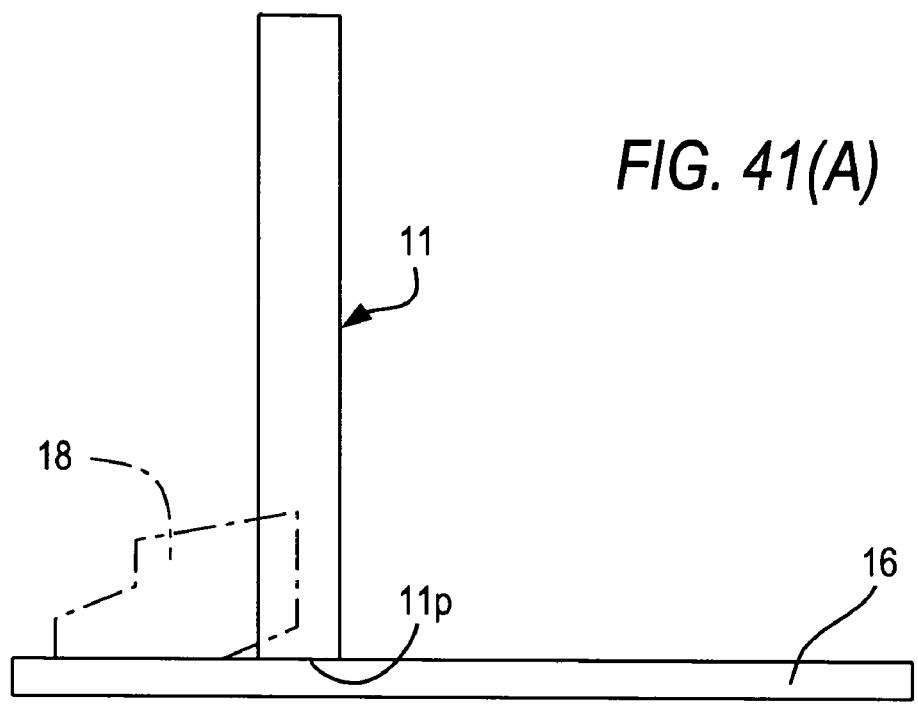
FIG. 41(A) is a side view of the structure in which the pipe body is joined and fixed to a base frame.
Figure 41B:
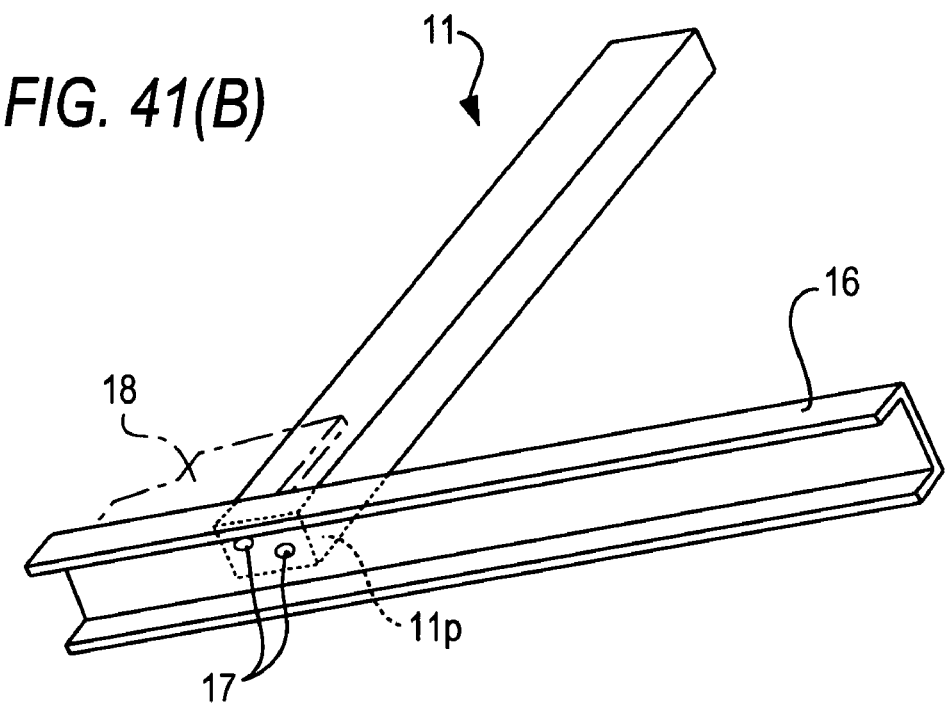
FIG. 41(B) is a perspective view of the structure shown from the bottom side in which the pipe body is joined and fixed to the base frame.

When the pipe body 11 is jointed to form a frame structure, the supporting plane 11p provided at an end of the pipe body is in contact with a base frame F1, as shown in FIG. 41(A), and the base frame F1 and the pipe body 11 are jointed together, as shown in FIG. 41(B), by means of screws N that pass through the base frame F1 and that are inserted into and coupled to the screw holes 11w (refer to FIG. 39) provided at the supporting plane 11p. Accordingly, the supporting plane 11p can be closely jointed to the base frame F1. Also, according to the kinds of the frame structure or positions, a fixed (integrated) bracket F2 may be provided at the base frame F1.

(Fifth Aspect of the Pipe Body)

Figure 42A:
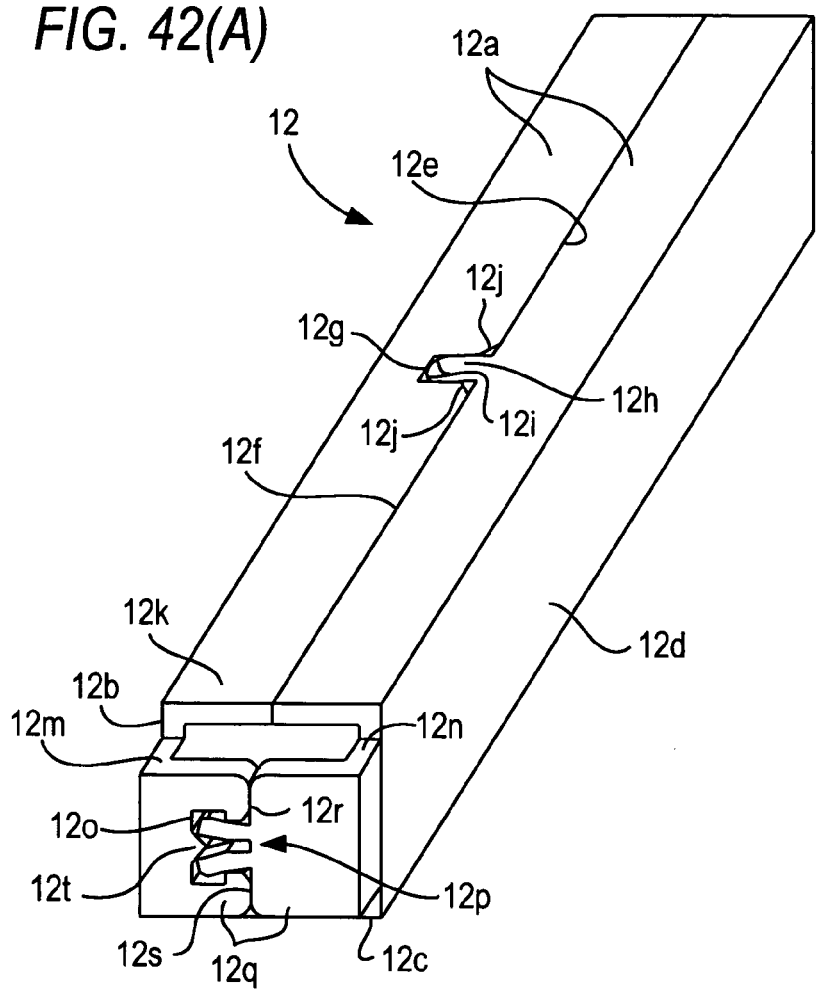
FIG. 42(A) is a perspective view of the exterior of the pipe body.

As shown in FIG. 42(A), 12 is a pipe body according to the fifth aspect of the present invention. The pipe body 12 has a rectangular prism shape consisting of four planes 12a, 12b, 12c, 12d. The plane 12a is formed jointly with the surroundings, by way of contact of a pair of parallel edge sections 12e, 12f opposite to each other. At the pair of the parallel edge sections 12e, 12f, a second female engagement section 12g and a second male engagement section 12h capable of being engaged with each other are provided. The width of the second female engagement section 12g and the width of the second male engagement section 12h are the same to be engaged with each other in their close contact state.

Also, the guide sections 12i are formed at the open end of the female engagement section 12g, to enlarge the diameter of the opening end thereof. Also, at the front end of the male engagement section 12h, the sloped guide sections 12j are formed such that the width of the male engagement section thins toward the front end.

Projected sections 12m, 12n capable of being opposite to each other are projected from an edge section 12k perpendicular to the parallel edge sections 12e, 12f.

Figure 42B:
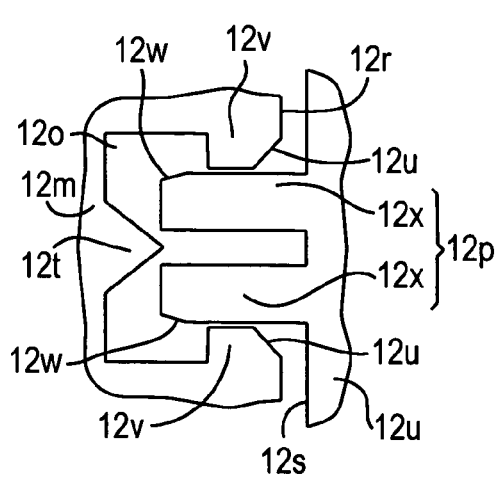
FIG. 42(B) is an enlarged view of a main part before completing forming the pipe body.

As shown in FIG. 42(B) which is an enlarged view of a main part before completing forming the pipe body 12, female engagement section 12o and male engagement section 12p engaged with each other in the facing state are formed in the projected sections 12m, 12n. Also, the projected sections 12m, 12n forms a supporting plane 12q jointly with the surroundings, with the edge sections 12r, 12s thereof in contact with each other.

At the center of the bottom edge section of the female engagement section 12o, a projection 12t having a mountain shape that is projected toward an open end is formed. Also, the sloped guide sections 12u are formed at the open end of the female engagement section 12o, to enlarge the diameter of the opening thereof. Also, engaging walls 12v projected toward each other are formed at the female engagement section 12o, such that the diameter of the opening at the open end is smaller than that of the vicinity of the opening at the bottom edge section of the female engagement section 12o.

Figure 42C:
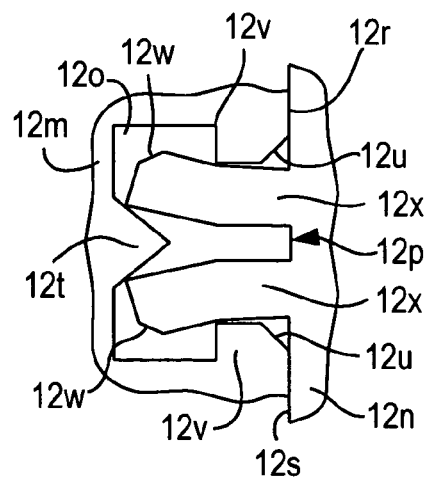
FIG. 42(C) is an enlarged view of the main part when completing forming the pipe body.

At the front end of the male engagement section 12p, the sloped guide sections 12w is formed such that the width of the male engagement section thins toward the front end. The male engagement section 12p consists of a pair of divided pieces 12x of which the projected ends are divided to be guided by the projection 12t and to be bending-deformed in a direction distant from each other, as shown in FIG. 42(C) which is an enlarged view of the main part when completing forming the pipe body 12. The bending-deformation of the divided pieces 12x make parts thereof be in contact with engaging walls 12v and thus, the female engagement section 12o and the male engagement section 12p are engaged with each other so that the edge sections 12r, 12s get in close contact with each other.

Figure 43:
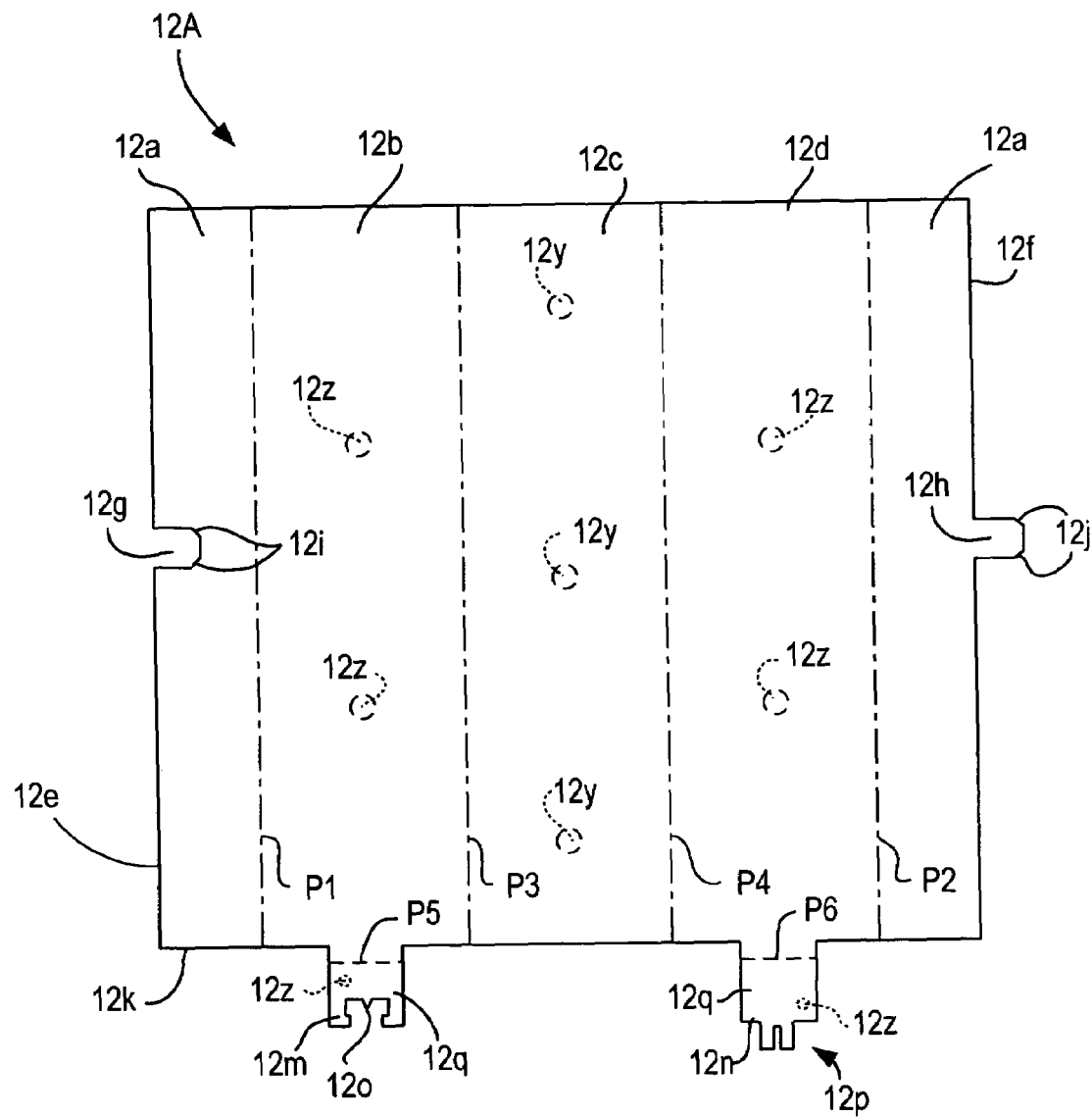
FIG. 43 is a plan view of a metal plate according to the fifth aspect of the present invention.

FIG. 43 shows a metal plate 12A for forming such pipe body 12. The sheet metal 12A is formed using a sheet shape of metal material as a source material by way of punching thereof. In FIG. 43, the same reference numerals given to elements of the pipe body 12 after forming are given to the corresponding elements, and explanation thereof will be omitted. Also, P1, P2, P3, P4 in FIG. 43 are lines representing positions to be bent by a press machine in order to form the planes 12a–12d, and P5, P6 are lines representing positions to be bent by the press machine in order to form the supporting plane 12q. The positions to be bent at the lines P1–P6 are designed in consideration of the amount of the sheet metal 12A to be expanded during press forming.

Also, holes 12y for fixation to a machine (mold) in the press processing to be explained later can be formed, for example, in the plane 12c of the sheet metal 12A. Also, screw holes 12z for fixation to the body panel of the duplicator or for fixation to parts can be formed in other planes 12b, 12d, 12q. The range for application thereof can be varied according to the purpose for use of the pipe body 12. At that time, the holes 12y may be used commonly as the screw holes and the holes for fixation to the mold. Also, the position or the number of the holes 12y, 12z is not limited, and may be formed even when completing forming the pipe body.

In forming the rectangular prism pipe body using such sheet metal 12A, the vicinity of the edge sections 12e, 12f of the sheet metal 12A are bent (the bent positions are the lines P1, P2) in the same direction along the edge sections 12e, 12f by means of the known press machine, to be set upright (in case of a rectangular prism, the angle of the plane 12a and the plane 12b and the angle of the plane 12a and the plane 12d are 90°), and at the same time, the projected sections 12m, 12n are bent (the bent positions are the lines P5, P6) in the same direction along the edge section 12k to be set upright (in case of a rectangular prism, the angle of the plane 12b and the plane 12q and the angle of the plane 12d and the plane 12q are 90°).

Figure 44A:
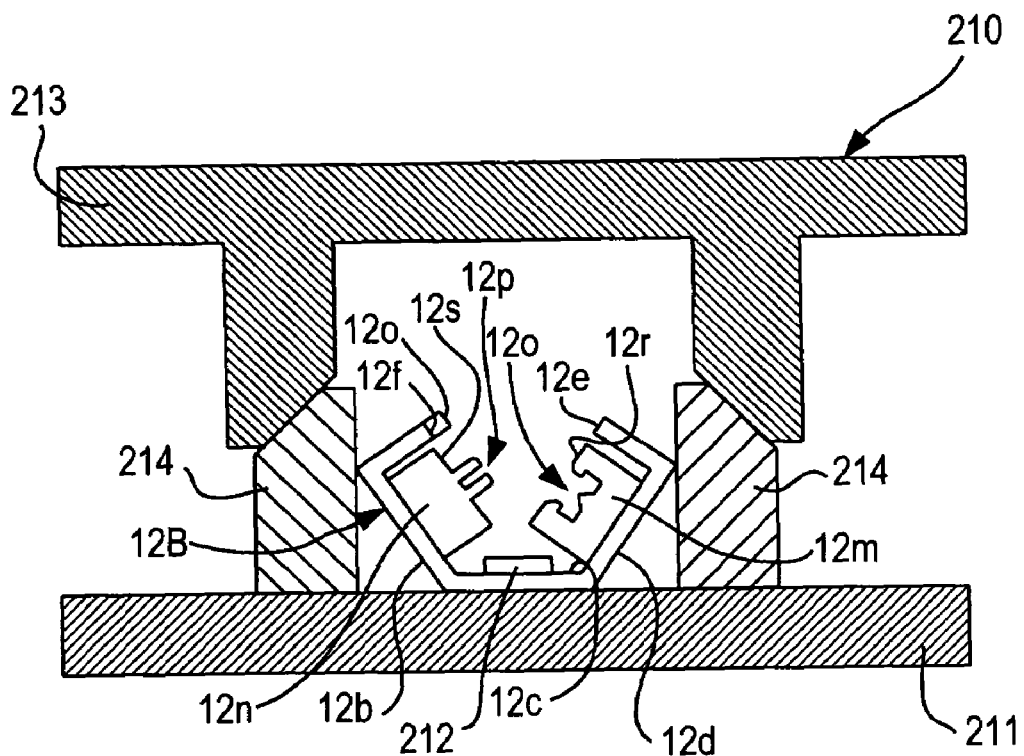
FIG. 44(A) is a cross-sectional view of a press machine when a first processed piece is set.

Then, the inner sides of the bent positions to be the plane 12a are further bent (the bent positions are the line P3, P4) along the edge sections 12e, 12f by means of the known press machine, so that the edge sections 12e, 12f are opposite to each other in the separated state. Accordingly, as shown in FIG. 44(A), a first processed piece 12B is obtained. At that time, the gap between the edge sections 12e, 12f is set to be greater than the width of the plane 12c, so that the mold of the press machine and the first processed piece 12B can be separated easily.

Then, as shown in FIG. 44(A), the first processed piece 12B is set in a lower mold 211 of a press machine 210. At that time, the plane 12c of the first processed piece 12B is fixed by means of a pushing member 212 provided at the lower mold 211.

Figure 44B:
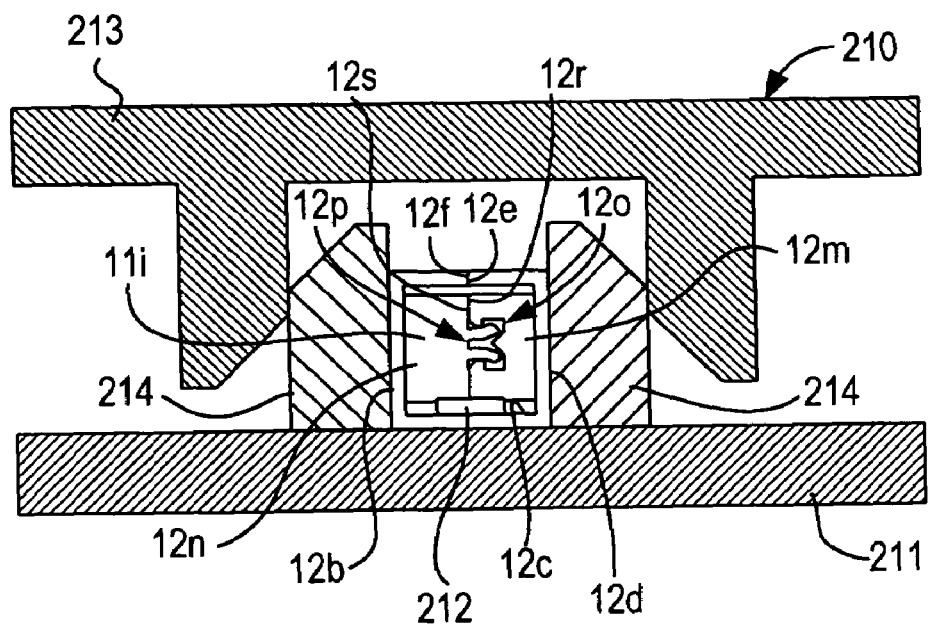
FIG. 44(B) is a cross-sectional view of the press machine when the forming process of the pipe body is completed.

In that state, as shown in FIG. 44(B), an upper mold 213 goes down and the pressing members 214 of the lower mold 211 approach each other. Accordingly, the edge sections 12e, 12f and the edge sections 12r, 12s approach each other, respectively.

Then, while the female engagement section 12g and the male engagement section 12h get to be engaged with each other, and at the same time, the female engagement section 12o and the male engagement section 12p get to be engaged with each other, the front ends of the divided pieces 12x are bending-deformed by means of the projection 12t to be separated from each other. This bending-deformation of the pair of the divided pieces 12x make parts thereof get in contact with engaging walls 12v, and the female engagement section 12o and the male engagement section 12p are engaged with each other to maintain the close contact of the edge sections 12r, 12s. At the same time, separation thereof is prevented. Also, the engagement absorbs the spring back in a direction in which the edge sections 12r, 12s and the edge sections 12e, 12f are separated from each other, respectively. Therefore, by way of matching the width of the supporting plane 12q with the width of the plane 12a, the pipe body 12 can be formed, in which the female engagement section 12o and the male engagement section 12p are engaged with each other and at the same time, the edge sections 12e, 12f of the plane 12a are in close contact with each other.

Also, when the pipe body 12 is jointed to form a frame structure its construction is equal to that of the fourth aspect and thus, explanation thereof will be omitted. In the pipe body 12, by way of the close engagement of the female engagement section 12g and the male engagement section 12h, weight in a direction of the relative parallel movement of the edge sections 12e, 12f, that is, weight in a direction of distortion of the pipe body 12 is absorbed, thereby improving the intensity.

(Sixth Aspect of the Pipe Body)

As shown in FIG. 45(A), 13 is a pipe body according to the sixth aspect of the present invention. The pipe body 13 has a rectangular prism shape consisting of four planes 13a, 13b, 13c, 13d. The plane 13a is formed jointly with the surroundings, by way of contact of a pair of parallel edge sections 13e, 13f opposite to each other. At the pair of the parallel edge sections 13e, 13f, a second female engagement section 13g and a second male engagement section 13h capable of being engaged with each other are provided. The second female engagement section 13g and the second male engagement section 13h have substantially the same structure as the female engagement section 13m (corresponding to the female engagement section 13g) and the male engagement section 13n (corresponding to the male engagement section 13h) to be explained later, and thus, explanation of the female engagement section 13m and the male engagement section 13n will be quoted.

Projected sections 13j, 13k capable of being opposite to each other are projected from an edge section 13i perpendicular to the parallel edge sections 13e, 13f.

A female engagement section 13m and male engagement section 13n engaged with each other in the facing state are formed in the projected sections 13j, 13k. Also, the projected sections 13j, 13k forms a supporting plane 13p jointly with the surroundings of the edge sections 13q, 13r in contact with each other.

As shown in FIG. 45(B) which is an enlarged view of a main part before completing forming the pipe body 13, a projection 13s having a mountain shape that is projected toward an open end is formed at the center of the bottom edge section of the female engagement section 13m. Also, the sloped guide sections 13t are formed at the open end of the female engagement section 13m, to enlarge the diameter of the opening thereof. Also, engaging walls 13u projected toward each other are formed at the female engagement section 13m, such that the diameter of the opening at the vicinity of the open end is smaller than that of the opening at the vicinity of the bottom edge section of the female engagement section 13m.

At the front end of the male engagement section 13n, sloped guide sections 13v is formed such that the width of the male engagement section thins toward the front end. The male engagement section 13n consists of a pair of divided pieces 13w of which the projected ends are divided to be guided by the projection 13s and to be bending-deformed in a direction distant from each other, as shown in FIG. 45(C) which is an enlarged view of the main part when completing forming the pipe body 13. The bending-deformation of the divided pieces 13w make parts thereof be in contact with the engaging walls 13u and thus, the female engagement section 13m and the male engagement section 13n are engaged with each other so that the edge sections 13q, 13r get in close contact with each other.

FIG. 46 shows a metal plate 13A for forming such pipe body 13. The sheet metal 13A is formed using a sheet shape of metal material as a source material by way of punching thereof. In FIG. 46, the same reference numerals given to elements of the pipe body 13 after forming are given to the corresponding elements, and explanation thereof will be omitted. Also, P1, P2, P3, P4 in FIG. 46 are lines representing positions to be bent by a press machine in order to form the planes 13a–13d, and P5, P6 are lines representing positions to be bent by the press machine in order to form the supporting plane 13p. The positions to be bent at the lines P1–P6 are designed in consideration of the amount of the sheet metal 13A to be expanded during press forming.

Also, holes 13x for fixation to a machine (mold) in the press processing to be explained later can be formed, for example, in the plane 13c of the sheet metal 13A. Also, screw holes 13y for fixation to the body panel of the duplicator or for fixation to parts are formed in other planes 13b, 13d, 13p. The range for application thereof can be varied according to the purpose for use of the pipe body 13. At that time, the holes 13x may be used commonly as the screw holes and the holes for fixation to the mold. Also, the position or the number of the holes 13x, 13y is not limited, and may be formed even when completing forming the pipe body.

In forming the rectangular prism pipe body using such sheet metal 13A, the vicinity of the edge sections 13e, 13f of the sheet metal 13A are bent (the bent positions are the lines P1, P2) in the same direction along the edge sections 13e, 13f by means of the known press machine, to be set upright (in case of a rectangular prism, the angle of the plane 13a and the plane 13b and the angle of the plane 13a and the plane 13d are 90°), and at the same time, the projected sections 13j, 13k are bent (the bent positions are the lines P5, P6) in the same direction along the edge section 13i to be set upright (the angle of the plane 13b and the plane 13p and the angle of the plane 13d and the plane 13p are 90°).

Figure 47A:
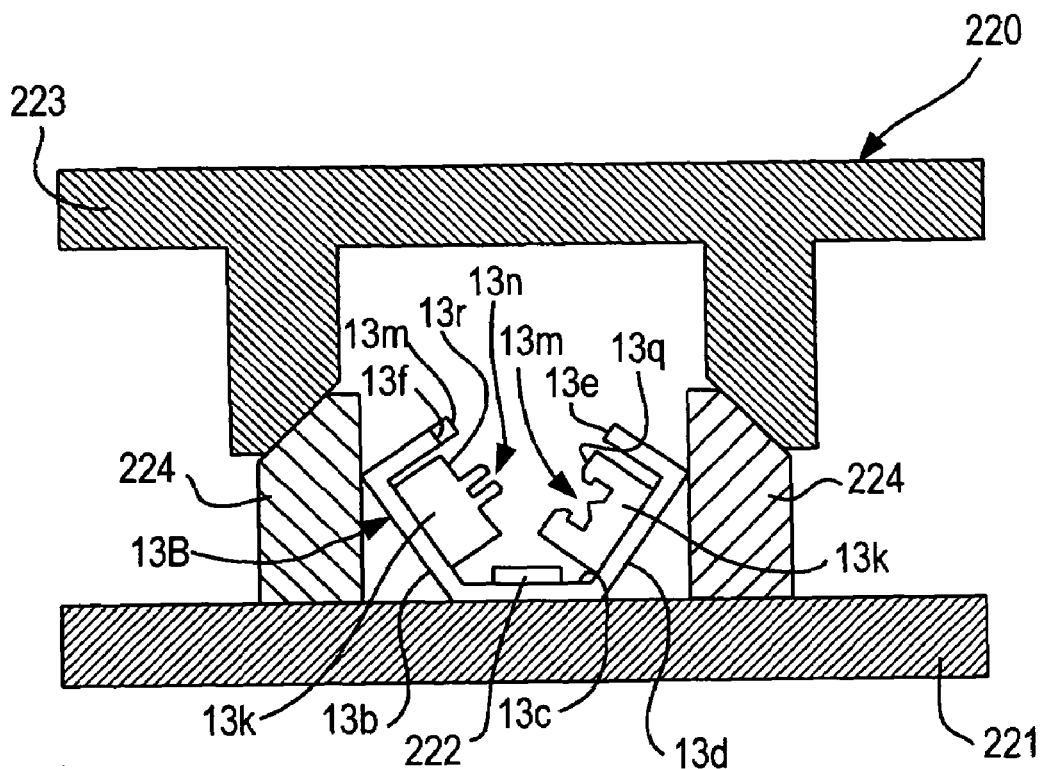
FIG. 47(A) is a cross-sectional view of a press machine when a first processed piece is set, and FIG. 47(B)

Then, the inner sides of the bent positions to be the plane 13a are further bent (the bent positions are the line P3, P4) along the edge sections 13e, 13f by means of the known press machine, so that the edge sections 13e, 13f are opposite to each other in the separated state. Accordingly, as shown in FIG. 47(A), a first processed piece 13B is obtained. At that time, the gap between the edge sections 13e, 13f is set to be greater than the width of the plane 13c, so that the mold of the press machine and the first processed piece 13B can be separated easily.

Then, as shown in FIG. 47(A), the first processed piece 13B is set in a lower mold 221 of a press machine 220. At that time, the plane 13c of the first processed piece 13B is fixed by means of a pushing member 222 provided at the lower mold 221.

Figure 47B:
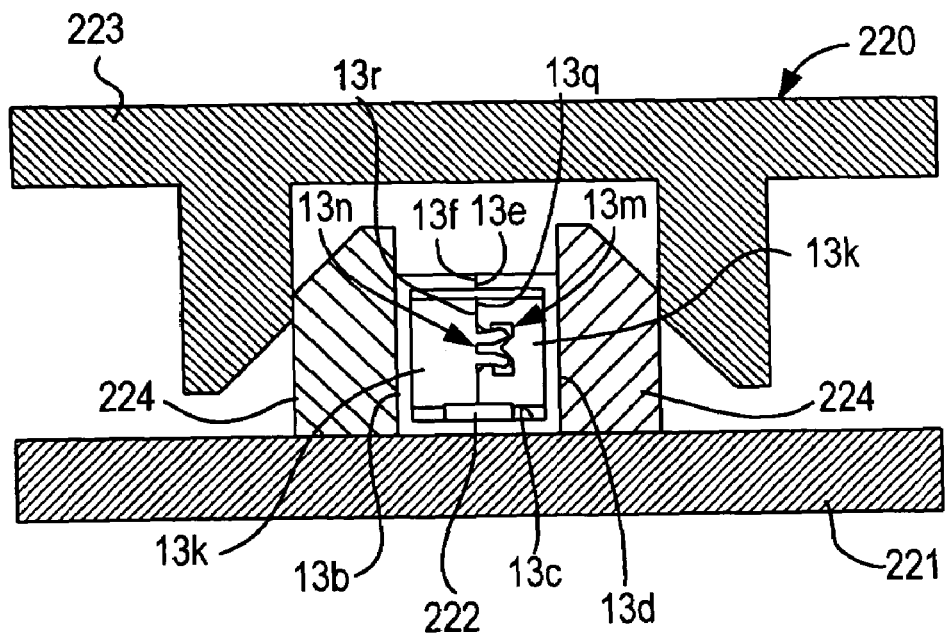
FIG. 47 illustrates the time series of a forming method of the pipe body according to the sixth aspect of the present invention.

In that state, as shown in FIG. 47(B), an upper mold 223 goes down, and the pressing members 224 of the lower mold 221 approach each other. Accordingly, the edge sections 13e, 13f and the edge sections 13q, 13r approach each other, respectively.

Then, while the female engagement section 13g and the male engagement section 13h get to be engaged with each other and the female engagement section 13m and the male engagement section 13n get to be engaged with each other, the front ends of the divided pieces 13w are bending-deformed by means of the projection 13s to be separated from each other. This bending-deformation of the divided pieces 13w make parts thereof get in contact with engaging walls 13u, and the female engagement section 13m and the male engagement section 13n are engaged with each other to maintain the close contact of the edge sections 13q, 13r. At the same time, separation thereof is prevented. Also, the engagement absorbs the spring back in a direction in which the edge sections 13q, 13r and the edge sections 13e, 13f are separated from each other, respectively. Therefore, by way of matching the width of the supporting plane 13p with the width of the plane 13a, the pipe body 13 can be formed, in which the female engagement section 13m and the male engagement section 13n are engaged with each other and at the same time, the edge sections 13e, 13f of the plane 13a are in close contact with each other.

Also, when the pipe body 13 is jointed to form a frame structure, its construction is equal to that of the fourth aspect, and thus, explanation thereof will be omitted. In the pipe body 13, by way of the engagement of the female engagement section 13g and the male engagement section 13h, weight in a direction of the relative parallel movement of the edge sections 13e, 13f, that is, weight in a direction of distortion of the pipe body 13 is absorbed. Thereby, the intensity is improved, and in addition, the close contact of the edge sections 13i, 13j with each other can be maintained, regardless of the accuracy of the female engagement section 13m and the male engagement section 13n.

(Seventh Aspect of the Pipe Body)

As shown in FIG. 48(A), 14 is a pipe body according to the seventh aspect of the present invention. The pipe body 14 has a rectangular prism shape consisting of four planes 14a, 14b, 14c, 14d. The respective edge sections 14e, 14f of the plane 14a and the plane 14d crossing each other (in this case, perpendicular to each other) meet each other such that a back surface 14g of the edge section 14e contacts with an end surface 14h of the edge section 14f, thereby forming a joint 14i.

As shown in FIGS. 48(B) and (C) which are enlarged views of the main part before completing forming the pipe body 14, female engagement section 14j and male engagement section 14k are provided at the edge sections 14e, 14f, to be opposite to each other in a direction crossing (perpendicular to) each other. As shown in FIGS. 48(D) and (E) which are enlarged views of the main part when completing forming the pipe body 14, the male engagement section 14k are engaged with the female engagement section 14j by means of deformation of the male engagement section 14k. Accordingly, the back surface 14g of the plane 14a and the end surface 14h of the plane 14d get in close contact with each other to form the joint 14i.

Figure 49A:
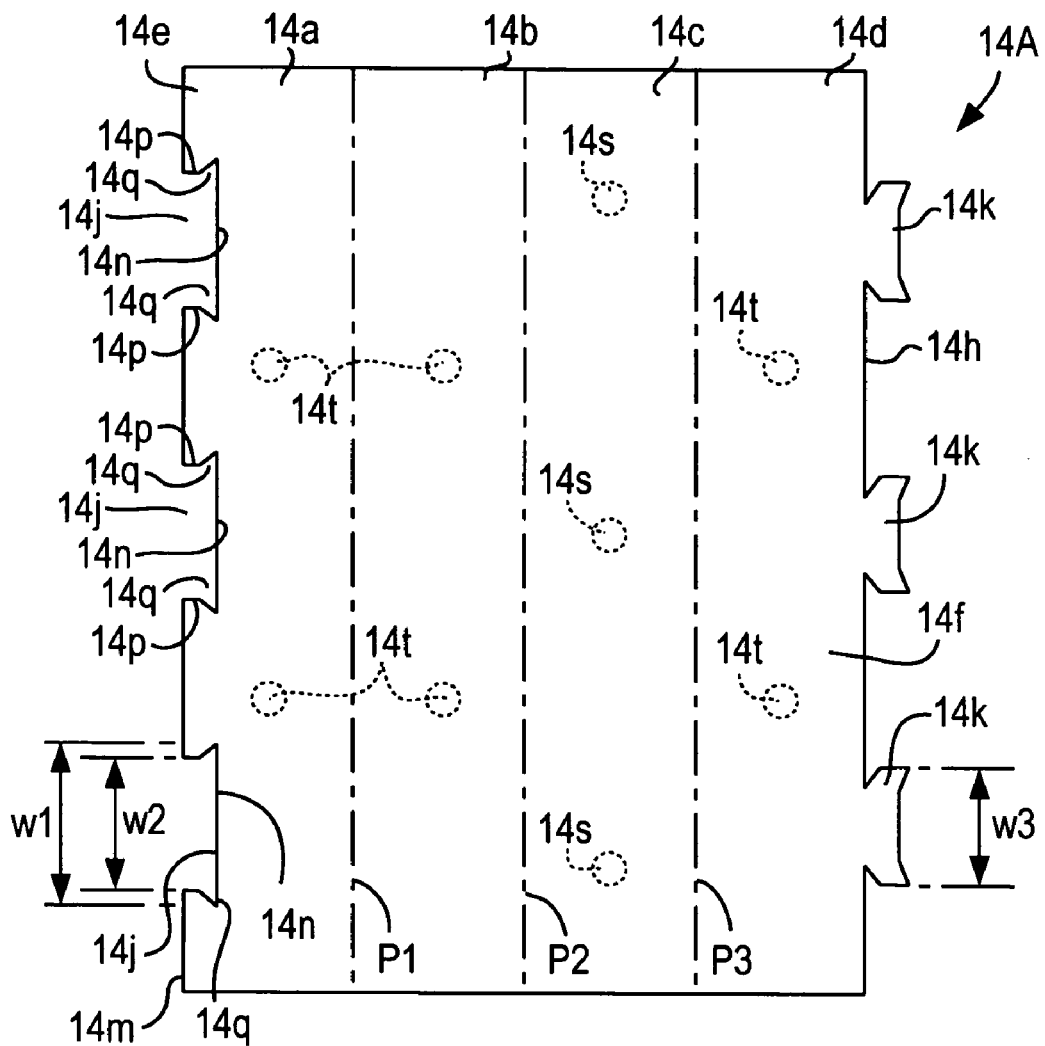

FIGS. 49(A) and (B) show a metal plate 14A for forming such pipe body 14. The sheet metal 14A is formed by using a sheet shape of metal material as a source material by way of punching thereof.

The female engagement section 14j is open at an end surface 14m of the plane 14a. Also, the width W1 of the female engagement section 14j at a bottom wall 14n side is set to be broader than the width W2 of the opening at the end surface 14m side as shown in FIG. 49(A). Accordingly, at both sides of the bottom wall 14n, the female engagement section 14q having the sloped surfaces 14p formed such that the gap gets smaller toward the end surface 14m.

Figure 49B:
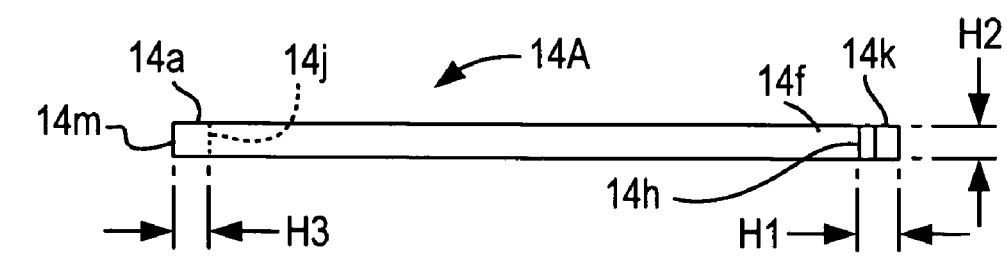

The width W3 of the male engagement section 14k along the length direction of the end surface 14h is set to be smaller than the width W2 of the opening. Both ends of the male engagement section 14k in the length direction are projected more than the center. Also, as shown in FIG. 49(B), the maximum projected amount H1 of the male engagement section 14k is greater than the thickness H2 of the sheet metal 14A and the recessed length H3 of the female engagement section 14j is equal to the thickness H2 of the sheet metal 14A.

Thus, as shown in FIG. 48(B), in the state that the female engagement section 14j and the male engagement section 14k are engaged with each other, both ends of the male engagement section 14k are projected from the surface 14r of the plane 14a. Also, in FIG. 49, the same reference numerals given to elements of the pipe body 14 after forming are given to the corresponding elements, and explanation thereof will be omitted. Also, P1, P2, P3 in FIG. 49 are lines representing positions to be bent by a press machine. The positions to be bent at the lines P1–P3 are designed in consideration of the amount of the sheet metal 14A to be expanded during press forming.

Also, holes 14s for fixation to a machine (mold) in the press processing to be explained later can be formed, for example, in the plane 14c of the sheet metal 14A, and screw holes 14t for fixation to the body panel of the duplicator or for fixation to parts are formed in other planes 14a, 14b, 14d. The range for application thereof can be varied according to the purpose for use of the pipe body 14. At that time, the screw holes 14t may be what is called clearance holes; and the holes 14s may be used commonly as the screw holes and the holes for fixation to the mold. Also, the positions or the numbers of the holes 14s, 14t is not limited, and may be formed even when completing forming the pipe body.

The method of forming the rectangular prism pipe body using such sheet metal 14A will be described with reference to FIG. 50.

First, the sheet metal 14A is bent by the known press machine at the lines P1–P3 (in case of a rectangular prism, the angle of the plane 14a and the plane 14b and the angle of the plane 14b and the plane 14c are 90°, and the angle of the plane 14c and the plane 14d is an obtuse angle) to form a first processed piece 14B, as shown in FIG. 50(A).

Then, the first processed piece 14B is set in a lower mold 231 of a press machine 230. At that time, the plane 14c of the first processed piece 14B is fixed by means of a pushing member 232 provided at the lower mold 231.

In that state, as shown in FIG. 50(B), an upper mold 233 goes down, and the pressing members 234 of the lower mold 231 approach each other. Accordingly, the edge sections 14e, 14f approach each other and then, the female engagement section 14j and the male engagement section 14k are engaged with each other, thereby obtaining a second processed piece 14C.

Figure 48E:
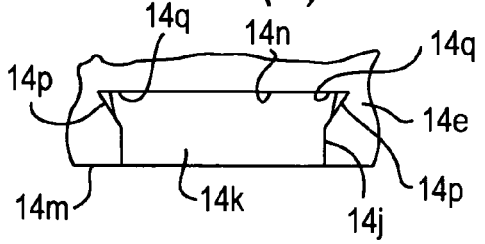

Then, as shown in FIG. 50(C), in that state, the upper mold 233 further goes down. That is, while with the pressing members 234 of the lower mold 231 fixed, the pressing member 235 of the upper mold 233 presses the second processed piece 14C in a direction perpendicular to the pressing direction of the pressing members 234, both ends of the male engagement section 14k are deformed. This deformation makes distorted parts of the male engagement section 14k enter the female engagement section 14q of the female engagement section 14j, and as a result, the female engagement section 14j and the male engagement section 14k are engaged with each other, as shown in FIG. 48(E).

At that time, because the pressing direction of the pressing member 235 is perpendicular to the pressing direction of the pressing members 234, restoration of the planes 14a–14d can be accomplished. Also, by means of the engagement of the female engagement section 14j and the male engagement section 14k, the pipe body 14 in which a back surface 14g of the plane 14a and an end surface 14h of the plane 14d are in almost complete contact with each other can be obtained.

However, the second processed piece 14C is an interim piece between the first processed piece 14B and the pipe body 14, and is not the final pipe body. It is of course that the pressing of the pressing members 234 should not cause deformation (distortion) of the pipe body 14, in order to obtain the above advantages. The intensity of the pressing is set according to the conditions such as the thickness H2 and the quality of the sheet metal 14A.

(Eighth Aspect of the Pipe Body)

As shown in FIG. 51(A), 15 is a pipe body according to the eighth aspect of the present invention. The pipe body 15 has a rectangular prism shape consisting of four planes 15a, 15b, 15c, 15d. The respective edge sections 15e, 15f of the plane 15a and the plane 15d crossing each other (in this case, perpendicular to each other) meet each other, such that a back surface 15g of the edge section 15e is in contact with an end surface 15h of the edge section 15, thereby forming a joint 15i.

As shown in FIGS. 51(B) and (C) which are enlarged views of the main part before completing forming the pipe body 15, female engagement section 15j and male engagement section 15k are provided at the edge sections 15e, 15, to be opposite to each other in a direction crossing perpendicular to) each other. As shown in FIGS. 51(D) and (E) which are enlarged views of the main part when completing forming the pipe body 15, the male engagement section 15k is engaged with the female engagement section 15j by means of deformation of the male engagement section 15k. Accordingly, the back surface 15g of the plane 15a and the end surface 15h of the plane 15d get in close contact with each other to form the joint 15i.

Figure 52A:
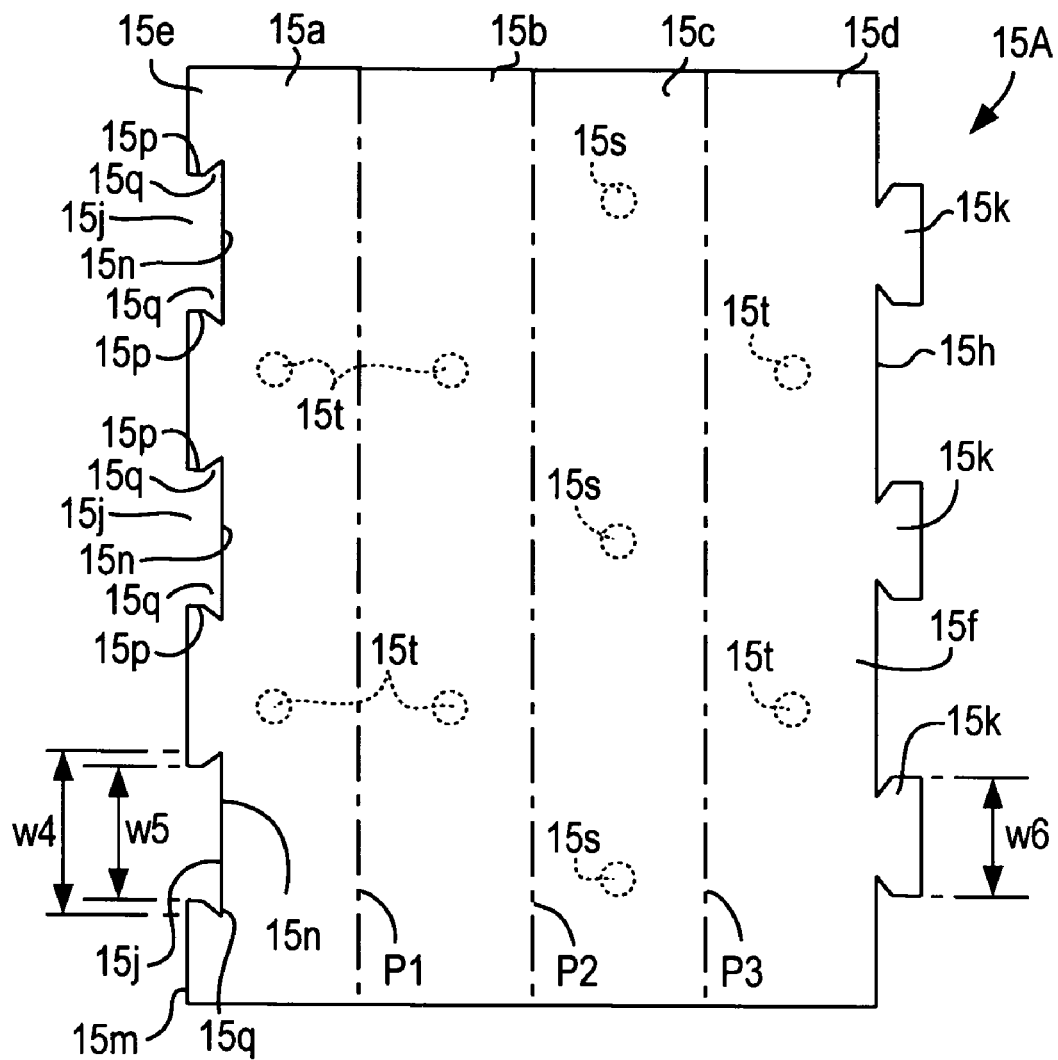

FIGS. 52(A) and (B) show a metal plate 15A for forming such pipe body 15. The sheet metal 15A is formed using a sheet shape of metal material as a source material by way of punching thereof.

The female engagement section 15j is open at an end surface 15m of the plane 15a. Also, the width W4 of the female engagement section 15j at a bottom wall 15n side is set to be broader than the width W5 of the opening at the end surface 15m side, as shown in FIG. 52(A). Accordingly, at the both sides of the bottom wall 15n, the female engagement section 15q having the sloped surfaces 15p, such that the width thereof gets smaller toward the end surface 15m.

Figure 52B:
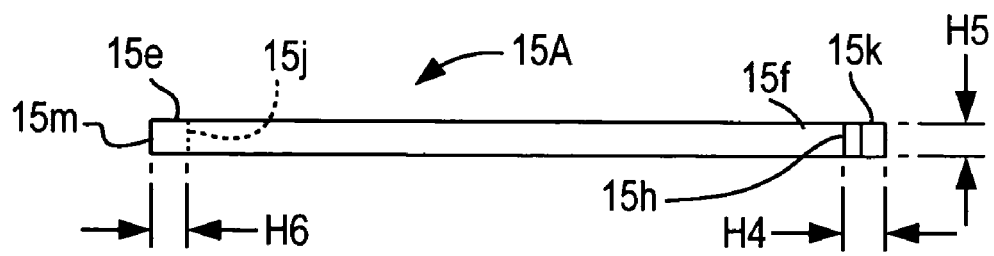

The width W6 of the male engagement section 15k along the length direction of the end surface 15h is set to be smaller than the width W5 of the opening. Also, as shown in FIG. 52(B), the maximum projected amount H4 of the male engagement section 15k is greater than the thickness H5 of the sheet metal 15A and the recessed length H6 of the female engagement section 15j is roughly equal to the thickness H5 of the sheet metal 15A.

Thus, as shown in FIG. 51(B), in the state that the female engagement section 15j and the male engagement section 15k are engaged with each other, the male engagement section 15k and a surface 15r of the plane 15a form roughly a plane. Also, in FIG. 52, the same reference numerals given to elements of the pipe body 15 after forming are given to the corresponding elements, and explanation thereof will be omitted. Also, P1, P2, P3 in FIG. 52 are lines representing positions to be bent by a press machine. The positions to be bent at the lines P1–P3 are designed in consideration of the amount of the sheet metal 15A to be expanded during press forming.

Also, holes 15s for fixation to a machine (mold) in the press processing to be explained later can be formed in plural, for example, in the plane 15c of the sheet metal 15A, and screw holes 15t for fixation to the body panel of the duplicator or for fixation to parts are formed in other planes 15a, 15b, 15d. The range for application thereof can be varied according to the purpose for use. At that time, the screw holes 15t may be what is called clearance holes, and the holes 15s may be used commonly as the screw holes and the holes for fixation to the mold. Also, the positions or the numbers of the holes 15s, 15t is not limited, and may be formed even when completing forming the pipe body.

The method of forming the rectangular prism pipe body 15 using such sheet metal 15A will be described with reference to FIG. 53.

First, the sheet metal 15A is bent by the known press machine at the lines P1–P3 (in case of a rectangular prism, the angle of the plane 15a and the plane 15b and the angle of the plane 15b and the plane 15c are 90°, and the angle of the plane 15c and the plane 15d is an obtuse angle) to form a first processed piece 15B, as shown in FIG. 53(A).

Then, the first processed piece 15B is set in a lower mold 241 of a press machine 240. At that time, the plane 15c of the first processed piece 15B is fixed by means of a pushing member 242 provided at the lower mold 241.

In that state, as shown in FIG. 53(B), an upper mold 243 goes down, and the pressing members 244 of the lower mold 241 approach each other. Accordingly, the edge sections 15e, 15f approach each other and then, the female engagement section 15j and the male engagement section 15k are engaged with each other, thereby obtaining a second processed piece 15C.

Then, as shown in FIG. 53(C), the upper mold 243 further goes down. That is, with the pressing members 244 of the lower mold 241 fixed, the pressing member 245 of the upper mold 243 presses the second processed piece 15C in a direction perpendicular to the pressing direction of the pressing members 244.

Figure 51E:
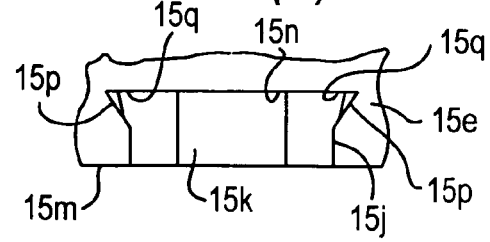

At that time, as shown in FIG. 54, a punch member 246 is projected from a position of the pressing member 245 opposite to the male engagement section 15k and the male engagement section 15k is deformed by the punch member 246. This deformation makes parts of the male engagement section 15k enter the female engagement section 15q of the female engagement section 15j, and as a result, the female engagement section 15j and the male engagement section 15k are engaged with each other, as shown in FIG. 51(E).

At that time, because the pressing direction of the pressing member 245 is perpendicular to the pressing direction of the pressing members 244, restoration of the planes 15a–15d can be accomplished. Also, by means of the engagement of the female engagement section 15j and the male engagement section 15k, the pipe body 15 in which the back surface 15g of the plane 15a and the end surface 15h of the plane 15d are in almost complete contact with each other can be obtained.

However, the second processed piece 15C is an interim piece between the first processed piece 15B and the pipe body 15, and is not the final pipe body. It is of course that the pressing of the pressing members 244 should not cause deformation (distortion) of the pipe body 15, in order to obtain the above advantages. The intensity of the pressing is set according to the conditions such as the thickness H5 and the quality of the sheet metal 15A.

As described above, according to the present invention, a pipe body in which separation-prevented engagement due to deformation of at least one of the respective engagement sections absorbs the spring back in press forming so that the respective edge sections are in close contact with each other, is provided.

In the pipe body according to the present invention, double engagement of the female and male engagement sections and the uneven engagement sections provides a strong engagement, and projected parts from the edge section of the male engagement section are absorbed by the concave engagement section. Therefore, even in a pipe body of which the width crossing the edge sections of a jointly formed plane is small, the female engagement section and the male engagement section can be engaged with each other, in which the male engagement section is not inserted into the female engagement section side.

In the pipe body according to the present invention, engagements are sequentially carried out by means of deformation of the uneven engagement sections according to the deformation of the female and male engagement sections, and thus, the deformation and the engagement can be secured safely.

In the pipe body according to the present invention, intensity of the engaging parts can be secured in the contacting edge sections.

According to the construction of the present invention, the pipe body of which the edge sections closely contact with each other can be formed only by means of a simple press processing, the engagement of a pair of the female engagement section and the male engagement section due to deformation of at least one engagement section thereof can be carried out by means of the press processing, and further, in the final press process, the restoration of the pipe body and the absorption of the spring back generated in the last press process can be carried out.

What is claimed is:

1. A metal pipe comprising a bent metal plate having parallel first and second edge sections in opposed and engaged position; and a male portion and a female portion respectively formed on said first and second edge sections, said male and female portions engaging each other and being locked together in a caulked portion formed by caulking with deformation of at least one of said male and female portions; wherein said metal pipe has a rectangular shape in section having four flat surfaces and four corners, and said caulked portion is formed on one of said four flat surfaces, and wherein one of said four flat surfaces has established therein a spring back force acting in a direction for urging said first and second edge sections to approach each other.

2. A metal pipe according to claim 1, wherein said spring back force is established in a surface on which said caulked portion is provided.

3. A metal pipe according to claim 2, wherein a plurality of male portions are formed on said first edge section and a plurality of female portions are formed on said second edge section, and wherein the male portions are respectively inserted into the female portions to engage them.

4. A metal pipe according to claim 1, wherein a plurality of male portions are formed on said first edge section and a plurality of female portions are formed on said second edge section, and wherein the male portions are respectively inserted into the female portions to engage them.

* * * * *